US009681705B2

(12) United States Patent
Trudel et al.

(10) Patent No.: US 9,681,705 B2
(45) Date of Patent: Jun. 20, 2017

(54) FAILURE COMPENSATING LACE TENSION DEVICES AND METHODS

(71) Applicant: Boa Technology Inc., Denver, CO (US)

(72) Inventors: Thomas Trudel, Denver, CO (US); Eric Craig Irwin, Denver, CO (US); Eric Whewell, Denver, CO (US)

(73) Assignee: Boa Technology Inc., Denver, CO (US)

( * ) Notice: Subject to any disclaimer, the term of this patent is extended or adjusted under 35 U.S.C. 154(b) by 199 days.

(21) Appl. No.: 14/487,024

(22) Filed: Sep. 15, 2014

(65) Prior Publication Data

US 2015/0076272 A1   Mar. 19, 2015

Related U.S. Application Data

(60) Provisional application No. 61/877,628, filed on Sep. 13, 2013, provisional application No. 61/937,372, filed on Feb. 7, 2014.

(51) Int. Cl.
*A43C 7/00* (2006.01)
*A43C 11/16* (2006.01)
*F16G 11/12* (2006.01)

(52) U.S. Cl.
CPC .............. *A43C 7/00* (2013.01); *A43C 11/165* (2013.01); *F16G 11/12* (2013.01); *Y10T 29/49826* (2015.01)

(58) Field of Classification Search
CPC ................................ A43C 7/00; A43C 11/165
(Continued)

(56) References Cited

U.S. PATENT DOCUMENTS

| 59,332 A | 10/1866 | White et al. |
| 80,834 A | 8/1868 | Prussia |

(Continued)

FOREIGN PATENT DOCUMENTS

| AT | 127075 | 2/1932 |
| AT | 244804 | 1/1966 |

(Continued)

OTHER PUBLICATIONS

ASOLO® Boot Brochure Catalog upon information and belief date is as early as Aug. 22, 1997.
(Continued)

*Primary Examiner* — Sang Kim
(74) *Attorney, Agent, or Firm* — Kilpatrick Townsend & Stockton LLP

(57) ABSTRACT

A reel for tightening an article includes a housing and a spool positioned within the housing. A knob is coupled with the spool to cause the spool to rotate within the housing and thereby wind a tension member about a central post of the spool. A load holding mechanism is coupled with the spool and the housing and includes a first friction element and a second friction element that are frictionally engageable to prevent rotation of the spool in a second direction to prevent unwinding of the tension member from the spool's central post. Rotation of the knob in a first direction reduces frictional engagement of the friction elements to enable rotation of the spool in the first direction and tension in the tension member biases the spool toward rotation in the second direction which increases the frictional engagement of the friction elements.

23 Claims, 53 Drawing Sheets

(58) Field of Classification Search
USPC .................................................. 36/23; 24/712
See application file for complete search history.

(56) References Cited

U.S. PATENT DOCUMENTS

| | | | |
|---|---|---|---|
| 117,530 A | 8/1871 | Foote | |
| 228,946 A | 6/1880 | Schulz | |
| 230,759 A | 8/1880 | Drummond | |
| 379,113 A | 3/1888 | Hibberd | |
| 746,563 A | 12/1903 | McMahon | |
| 819,993 A | 5/1906 | Haws et al. | |
| 908,704 A | 1/1909 | Sprinkle | |
| 1,060,422 A | 4/1913 | Bowdish | |
| 1,062,511 A | 5/1913 | Short | |
| 1,083,775 A | 1/1914 | Thomas | |
| 1,090,438 A | 3/1914 | Worth et al. | |
| 1,170,472 A | 2/1916 | Barber | |
| 1,288,859 A | 12/1918 | Feller et al. | |
| 1,390,991 A | 9/1921 | Fotchuk | |
| 1,393,188 A | 10/1921 | Whiteman | |
| 1,469,661 A | 2/1922 | Migita | |
| 1,412,486 A | 4/1922 | Paine | |
| 1,416,203 A | 5/1922 | Hobson | |
| 1,429,657 A | 9/1922 | Trawinski | |
| 1,481,903 A | 4/1923 | Hart | |
| 1,466,673 A | 9/1923 | Solomon et al. | |
| 1,530,713 A | 2/1924 | Clark | |
| 1,502,919 A | 7/1924 | Seib | |
| 1,862,047 A | 6/1932 | Boulet et al. | |
| 1,995,243 A | 6/1934 | Clarke | |
| 2,088,851 A | 8/1937 | Gantenbein | |
| 2,109,751 A | 3/1938 | Matthias et al. | |
| 2,124,310 A | 9/1938 | Murr, Jr. | |
| 2,316,102 A | 4/1943 | Preston | |
| 2,539,026 A | 1/1951 | Mangold | |
| 2,611,940 A | 9/1952 | Cairns | |
| 2,673,381 A | 3/1954 | Dueker | |
| 2,907,086 A | 10/1959 | Ord | |
| 2,991,523 A | 7/1961 | Del Conte | |
| 3,028,602 A | 4/1962 | Miller | |
| 3,035,319 A | 5/1962 | Wolff | |
| 3,106,003 A | 10/1963 | Herdman | |
| 3,112,545 A | 12/1963 | Williams | |
| 3,122,810 A | 3/1964 | Lawrence et al. | |
| 3,163,900 A | 1/1965 | Martin | |
| D200,394 S | 2/1965 | Hakim | |
| 3,169,325 A | 2/1965 | Fesl | |
| 3,193,950 A | 7/1965 | Shu-Lien Liou | |
| 3,197,155 A | 7/1965 | Chow | |
| 3,221,384 A | 12/1965 | Aufenacker | |
| 3,276,090 A | 10/1966 | Nigon | |
| D206,146 S | 11/1966 | Hendershot | |
| 3,345,707 A | 10/1967 | Rita | |
| D210,649 S | 4/1968 | Getgay | |
| 3,401,437 A | 9/1968 | Christpohersen | |
| 3,430,303 A | 3/1969 | Perrin et al. | |
| 3,491,465 A | 1/1970 | Martin | |
| 3,545,106 A | 12/1970 | Martin | |
| 3,618,232 A | 11/1971 | Shnuriwsky | |
| 3,668,791 A | 6/1972 | Salzman et al. | |
| 3,678,539 A | 7/1972 | Graup | |
| 3,703,775 A | 11/1972 | Gatti | |
| 3,729,779 A | 5/1973 | Porth | |
| 3,738,027 A | 6/1973 | Schoch | |
| 3,793,749 A | 2/1974 | Gertsch et al. | |
| 3,808,644 A | 5/1974 | Schoch | |
| 3,934,346 A | 1/1976 | Sasaki et al. | |
| 3,975,838 A | 8/1976 | Martin | |
| 4,084,267 A | 4/1978 | Zadina | |
| 4,130,949 A | 12/1978 | Seidel | |
| 4,142,307 A | 3/1979 | Martin | |
| 4,227,322 A | 10/1980 | Annovi | |
| 4,261,081 A | 4/1981 | Lott | |
| 4,267,622 A | 5/1981 | Burnett-Johnston | |
| 4,408,403 A | 10/1983 | Martin | |
| 4,417,703 A | 11/1983 | Weinhold | |
| 4,433,456 A | 2/1984 | Baggio | |
| 4,463,761 A | 8/1984 | Pols et al. | |
| 4,480,395 A | 11/1984 | Schoch | |
| 4,507,878 A | 4/1985 | Semouha | |
| 4,516,576 A | 5/1985 | Kirchner | |
| 4,551,932 A | 11/1985 | Schoch | |
| 4,555,830 A | 12/1985 | Petrini et al. | |
| 4,574,500 A | 3/1986 | Aldinio et al. | |
| 4,616,432 A | 10/1986 | Bunch et al. | |
| 4,616,524 A | 10/1986 | Bidoia | |
| 4,619,057 A | 10/1986 | Sartor et al. | |
| 4,620,378 A | 11/1986 | Sartor | |
| 4,631,839 A | 12/1986 | Bonetti et al. | |
| 4,631,840 A | 12/1986 | Gamm | |
| 4,633,599 A * | 1/1987 | Morell | A43C 11/16 24/68 SK |
| 4,644,938 A | 2/1987 | Yates et al. | |
| 4,654,985 A | 4/1987 | Chalmers | |
| 4,660,300 A | 4/1987 | Morell et al. | |
| 4,660,302 A | 4/1987 | Arieh et al. | |
| 4,680,878 A | 7/1987 | Pozzobon et al. | |
| 4,719,670 A | 1/1988 | Kurt | |
| 4,719,709 A | 1/1988 | Vaccari | |
| 4,719,710 A | 1/1988 | Pozzobon | |
| 4,722,477 A | 2/1988 | Floyd | |
| 4,741,115 A | 5/1988 | Pozzobon | |
| 4,748,726 A | 6/1988 | Schoch | |
| 4,760,653 A | 8/1988 | Baggio | |
| 4,780,969 A | 11/1988 | White, Jr. | |
| 4,787,124 A | 11/1988 | Pozzobon et al. | |
| 4,790,081 A | 12/1988 | Benoit et al. | |
| 4,796,829 A | 1/1989 | Pozzobon et al. | |
| 4,799,297 A | 1/1989 | Baggio et al. | |
| 4,802,291 A | 2/1989 | Sartor | |
| 4,811,503 A | 3/1989 | Iwama | |
| 4,826,098 A | 5/1989 | Pozzobon et al. | |
| 4,841,649 A | 6/1989 | Baggio et al. | |
| 4,856,207 A | 8/1989 | Datson | |
| 4,862,878 A | 9/1989 | Davison | |
| 4,870,723 A | 10/1989 | Pozzobon et al. | |
| 4,870,761 A | 10/1989 | Tracy | |
| 4,884,760 A | 12/1989 | Baggio et al. | |
| 4,901,938 A | 2/1990 | Cantley et al. | |
| 4,924,605 A | 5/1990 | Spademan | |
| D308,282 S | 6/1990 | Bergman et al. | |
| 4,937,953 A | 7/1990 | Walkhoff | |
| 4,961,544 A | 10/1990 | Biodia | |
| 4,979,953 A | 12/1990 | Spence | |
| 4,989,805 A | 2/1991 | Burke | |
| 5,001,817 A | 3/1991 | De Bortoli et al. | |
| 5,016,327 A | 5/1991 | Klausner | |
| 5,042,177 A | 8/1991 | Schoch | |
| 5,062,225 A | 11/1991 | Gorza | |
| 5,065,480 A | 11/1991 | DeBortoli | |
| 5,065,481 A | 11/1991 | Walkhoff | |
| 5,108,216 A | 4/1992 | Geyer et al. | |
| 5,117,567 A | 6/1992 | Berger | |
| 5,152,038 A | 10/1992 | Schoch | |
| 5,157,813 A | 10/1992 | Carroll | |
| 5,158,428 A | 10/1992 | Gessner et al. | |
| 5,177,882 A | 1/1993 | Berger | |
| 5,181,331 A | 1/1993 | Berger | |
| 5,184,378 A | 2/1993 | Batra | |
| D333,552 S | 3/1993 | Berger et al. | |
| 5,205,055 A | 4/1993 | Harrell | |
| 5,233,767 A | 8/1993 | Kramer | |
| 5,249,377 A | 10/1993 | Walkhoff | |
| 5,259,094 A | 11/1993 | Zepeda | |
| 5,315,741 A | 5/1994 | Dubberke | |
| 5,319,868 A | 6/1994 | Hallenbeck | |
| 5,319,869 A | 6/1994 | McDonald et al. | |
| 5,325,613 A | 7/1994 | Sussmann | |
| 5,327,662 A | 7/1994 | Hallenbeck | |
| 5,335,401 A | 8/1994 | Hanson | |
| 5,341,583 A | 8/1994 | Hallenbeck | |
| 5,345,697 A | 9/1994 | Quellais | |
| 5,355,596 A | 10/1994 | Sussmann | |
| 5,357,654 A | 10/1994 | Hsing-Chi | |

(56) References Cited

U.S. PATENT DOCUMENTS

| | | |
|---|---|---|
| 5,371,957 A | 12/1994 | Gaudio |
| 5,381,609 A | 1/1995 | Hieblinger |
| 5,392,535 A | 2/1995 | Van Noy et al. |
| D357,576 S | 4/1995 | Steinweis |
| 5,425,161 A | 6/1995 | Schoch |
| 5,425,185 A | 6/1995 | Gansler |
| 5,430,960 A | 7/1995 | Richardson |
| 5,433,648 A | 7/1995 | Frydman |
| 5,463,822 A | 11/1995 | Miller |
| 5,477,593 A | 12/1995 | Leick |
| D367,755 S | 3/1996 | Jones |
| D367,954 S | 3/1996 | Dion |
| 5,502,902 A | 4/1996 | Sussmann |
| 5,511,325 A | 4/1996 | Hieblinger |
| 5,526,585 A | 6/1996 | Brown et al. |
| 5,535,531 A | 7/1996 | Karabed et al. |
| 5,537,763 A | 7/1996 | Donnadieu et al. |
| 5,557,864 A | 9/1996 | Marks |
| 5,566,474 A | 10/1996 | Leick et al. |
| D375,831 S | 11/1996 | Perry |
| 5,596,820 A | 1/1997 | Edauw et al. |
| 5,599,000 A | 2/1997 | Bennett |
| 5,599,288 A | 2/1997 | Shirley et al. |
| 5,600,874 A | 2/1997 | Jungkind |
| 5,606,778 A | 3/1997 | Jungkind |
| 5,607,448 A | 3/1997 | Stahl et al. |
| D379,113 S | 5/1997 | McDonald et al. |
| 5,638,588 A | 6/1997 | Jungkind |
| 5,640,785 A | 6/1997 | Egelja |
| 5,647,104 A | 7/1997 | James |
| 5,651,198 A | 7/1997 | Sussmann |
| 5,669,116 A | 9/1997 | Jungkind |
| 5,692,319 A | 12/1997 | Parker et al. |
| 5,718,021 A | 2/1998 | Tatum |
| 5,718,065 A | 2/1998 | Locker |
| 5,720,084 A | 2/1998 | Chen |
| 5,732,483 A | 3/1998 | Cagliari |
| 5,732,648 A | 3/1998 | Aragon |
| 5,736,696 A | 4/1998 | Del Rosso |
| 5,737,854 A | 4/1998 | Sussmann |
| 5,755,044 A | 5/1998 | Veylupek |
| 5,756,298 A | 5/1998 | Burczak |
| 5,761,777 A | 6/1998 | Leick |
| 5,772,146 A | 6/1998 | Kawamoto et al. |
| 5,784,809 A | 7/1998 | McDonald |
| 5,791,068 A | 8/1998 | Bernier et al. |
| 5,819,378 A | 10/1998 | Doyle |
| 5,833,640 A | 11/1998 | Vazquez, Jr. et al. |
| 5,839,210 A | 11/1998 | Bernier et al. |
| 5,845,371 A | 12/1998 | Chen |
| 5,909,946 A | 6/1999 | Okajima |
| D413,197 S | 8/1999 | Faye |
| 5,934,599 A | 8/1999 | Hammerslag |
| 5,937,542 A | 8/1999 | Bourdeau |
| 5,956,823 A | 9/1999 | Borel |
| 5,971,946 A | 10/1999 | Quinn et al. |
| 6,015,110 A | 1/2000 | Lai |
| 6,038,791 A | 3/2000 | Cornelius et al. |
| 6,052,921 A | 4/2000 | Oreck |
| 6,070,886 A | 6/2000 | Cornelius et al. |
| 6,070,887 A | 6/2000 | Cornelius et al. |
| 6,083,857 A | 7/2000 | Bottger |
| 6,088,936 A | 7/2000 | Bahl |
| 6,102,412 A | 8/2000 | Staffaroni |
| D430,724 S | 9/2000 | Matis et al. |
| 6,119,318 A | 9/2000 | Maurer |
| 6,119,372 A | 9/2000 | Okajima |
| 6,128,835 A | 10/2000 | Ritter et al. |
| 6,128,836 A | 10/2000 | Barret |
| 6,148,489 A | 11/2000 | Dickie et al. |
| 6,202,953 B1 | 3/2001 | Hammerslag |
| 6,219,891 B1 | 4/2001 | Maurer et al. |
| 6,240,657 B1 | 6/2001 | Weber et al. |
| 6,256,798 B1 | 7/2001 | Egolf et al. |
| 6,267,390 B1 | 7/2001 | Maravetz et al. |
| 6,286,233 B1 | 9/2001 | Gaither |
| 6,289,558 B1 | 9/2001 | Hammerslag |
| 6,311,633 B1 | 11/2001 | Keire |
| D456,130 S | 4/2002 | Towns |
| 6,370,743 B2 | 4/2002 | Choe |
| 6,401,364 B1 | 6/2002 | Burt |
| 6,416,074 B1 | 7/2002 | Maravetz et al. |
| 6,467,195 B2 | 10/2002 | Pierre et al. |
| 6,477,793 B1 | 11/2002 | Pruitt et al. |
| 6,502,286 B1 | 1/2003 | Dubberke |
| 6,543,159 B1 | 4/2003 | Carpenter et al. |
| 6,568,103 B2 | 5/2003 | Durocher |
| 6,606,804 B2 | 8/2003 | Kaneko et al. |
| 6,694,643 B1 | 2/2004 | Hsu |
| 6,708,376 B1 | 3/2004 | Landry |
| 6,711,787 B2 | 3/2004 | Jungkind et al. |
| 6,735,829 B2 | 5/2004 | Hsu |
| 6,757,991 B2 | 7/2004 | Sussmann |
| 6,775,928 B2 | 8/2004 | Grande et al. |
| 6,792,702 B2 | 9/2004 | Borsoi et al. |
| 6,802,439 B2 | 10/2004 | Azam et al. |
| 6,823,610 B1 | 11/2004 | Ashley |
| 6,871,812 B1 | 3/2005 | Chang |
| 6,877,256 B2 | 4/2005 | Martin et al. |
| 6,899,720 B1 | 5/2005 | McMillan |
| 6,922,917 B2 | 8/2005 | Kerns et al. |
| 6,938,913 B2 | 9/2005 | Elkington |
| 6,945,543 B2 | 9/2005 | De Bertoli et al. |
| D510,183 S | 10/2005 | Tresser |
| 6,976,972 B2 | 12/2005 | Bradshaw |
| 6,993,859 B2 | 2/2006 | Martin et al. |
| D521,226 S | 5/2006 | Douglas et al. |
| 7,073,279 B2 | 7/2006 | Min |
| 7,076,843 B2 | 7/2006 | Sakabayashi |
| 7,082,701 B2 | 8/2006 | Dalgaard et al. |
| 7,096,559 B2 | 8/2006 | Johnson et al. |
| 7,134,224 B2 | 11/2006 | Elkington et al. |
| 7,266,911 B2 | 9/2007 | Holzer et al. |
| 7,281,341 B2 | 10/2007 | Reagan et al. |
| 7,293,373 B2 | 11/2007 | Reagan et al. |
| 7,331,126 B2 | 2/2008 | Johnson |
| 7,343,701 B2 | 3/2008 | Pare et al. |
| 7,367,522 B2 | 5/2008 | Chen |
| 7,386,947 B2 | 6/2008 | Martin et al. |
| 7,392,602 B2 | 7/2008 | Reagan et al. |
| 7,401,423 B2 | 7/2008 | Reagan et al. |
| 7,490,458 B2 | 2/2009 | Ford |
| 7,568,298 B2 | 8/2009 | Kerns |
| 7,582,102 B2 | 9/2009 | Heinz et al. |
| 7,584,528 B2 | 9/2009 | Hu |
| 7,591,050 B2 | 9/2009 | Hammerslag |
| 7,597,675 B2 | 10/2009 | Ingimundarson et al. |
| 7,600,660 B2 | 10/2009 | Kasper et al. |
| 7,617,573 B2 | 11/2009 | Chen |
| 7,624,517 B2 | 12/2009 | Smith |
| 7,648,404 B1 | 1/2010 | Martin |
| 7,650,705 B2 | 1/2010 | Donnadieu et al. |
| 7,694,354 B2 | 4/2010 | Philpott et al. |
| 7,752,774 B2 | 7/2010 | Ussher |
| 7,757,412 B2 | 7/2010 | Farys |
| 7,774,956 B2 | 8/2010 | Dua et al. |
| D626,322 S | 11/2010 | Servettaz |
| 7,841,106 B2 | 11/2010 | Farys |
| 7,871,334 B2 | 1/2011 | Young et al. |
| 7,877,845 B2 | 2/2011 | Signori |
| 7,900,378 B1 | 3/2011 | Busse |
| 7,908,769 B1 | 3/2011 | Pellegrini |
| 7,947,061 B1 | 5/2011 | Reis |
| 7,950,112 B2 | 5/2011 | Hammerslag et al. |
| 7,954,204 B2 | 6/2011 | Hammerslag et al. |
| 7,963,049 B2 | 6/2011 | Messmer |
| 7,992,261 B2 | 8/2011 | Hammerslag et al. |
| D646,790 S | 10/2011 | Castillo et al. |
| 8,056,150 B2 | 11/2011 | Stokes et al. |
| 8,074,379 B2 | 12/2011 | Robinson, Jr. et al. |
| 8,091,182 B2 | 1/2012 | Hammerslag et al. |
| 8,109,015 B2 | 2/2012 | Signori |
| D663,850 S | 7/2012 | Joseph |
| D663,851 S | 7/2012 | Joseph |

(56) References Cited

U.S. PATENT DOCUMENTS

| | | |
|---|---|---|
| 8,215,033 B2 | 7/2012 | Carboy et al. |
| 8,231,074 B2 | 7/2012 | Hu et al. |
| D665,088 S | 8/2012 | Joseph |
| 8,235,321 B2 | 8/2012 | Chen |
| 8,245,371 B2 | 8/2012 | Chen |
| 8,257,293 B2 | 9/2012 | Ingimundarson et al. |
| 8,266,827 B2 | 9/2012 | Dojan et al. |
| 8,277,401 B2 | 10/2012 | Hammerslag et al. |
| 8,302,329 B2 | 11/2012 | Hurd et al. |
| 8,303,527 B2 | 11/2012 | Joseph |
| 8,308,098 B2 | 11/2012 | Chen |
| 8,353,087 B2 | 1/2013 | Chen |
| 8,353,088 B2 | 1/2013 | Ha |
| D677,045 S | 3/2013 | Voskuil |
| D679,019 S | 3/2013 | Siddle et al. |
| 8,434,200 B2 | 5/2013 | Chen |
| 8,490,299 B2 | 7/2013 | Dua et al. |
| 8,516,662 B2 | 8/2013 | Goodman et al. |
| 8,578,632 B2 | 11/2013 | Bell et al. |
| 8,652,164 B1 | 2/2014 | Aston |
| 8,713,820 B2 | 5/2014 | Kerns et al. |
| 8,984,719 B2 | 3/2015 | Soderberg et al. |
| 9,072,341 B2 | 7/2015 | Jungkind |
| D735,987 S | 8/2015 | Hsu |
| 9,101,181 B2 | 8/2015 | Soderberg et al. |
| 9,125,455 B2 | 9/2015 | Kerns et al. |
| 9,138,030 B2 | 9/2015 | Soderberg et al. |
| 2002/0050076 A1 | 5/2002 | Borsoi et al. |
| 2002/0062579 A1 | 5/2002 | Caeran |
| 2002/0095750 A1 | 7/2002 | Hammerslag |
| 2002/0129518 A1 | 9/2002 | Borsoi et al. |
| 2002/0148142 A1 | 10/2002 | Oorei et al. |
| 2002/0166260 A1 | 11/2002 | Borsoi |
| 2002/0178548 A1 | 12/2002 | Freed |
| 2003/0079376 A1 | 5/2003 | Oorei et al. |
| 2003/0144620 A1 | 7/2003 | Sieller |
| 2003/0150135 A1 | 8/2003 | Liu |
| 2003/0177662 A1 | 9/2003 | Elkington et al. |
| 2003/0204938 A1 | 11/2003 | Hammerslag |
| 2004/0041452 A1 | 3/2004 | Williams |
| 2004/0211039 A1 | 10/2004 | Livingston |
| 2004/0221433 A1* | 11/2004 | Wolfberg ............ A43B 3/0005 24/712.5 |
| 2005/0054962 A1 | 3/2005 | Bradshaw |
| 2005/0060912 A1 | 3/2005 | Holzer et al. |
| 2005/0081339 A1 | 4/2005 | Sakabayashi |
| 2005/0081403 A1 | 4/2005 | Mathieu |
| 2005/0087115 A1 | 4/2005 | Martin |
| 2005/0098673 A1 | 5/2005 | Huang |
| 2005/0102861 A1 | 5/2005 | Martin |
| 2005/0126043 A1 | 6/2005 | Reagan et al. |
| 2005/0172463 A1 | 8/2005 | Rolla |
| 2005/0184186 A1 | 8/2005 | Tsoi et al. |
| 2005/0198866 A1 | 9/2005 | Wiper et al. |
| 2006/0135901 A1 | 6/2006 | Ingimundarson et al. |
| 2006/0156517 A1 | 7/2006 | Hammerslag et al. |
| 2006/0179685 A1 | 8/2006 | Borel et al. |
| 2006/0185193 A1 | 8/2006 | Pellegrini |
| 2006/0287627 A1 | 12/2006 | Johnson |
| 2007/0006489 A1 | 1/2007 | Case, Jr. et al. |
| 2007/0063459 A1 | 3/2007 | Kavarsky |
| 2007/0068040 A1 | 3/2007 | Farys |
| 2007/0084956 A1* | 4/2007 | Chen ..................... A43C 7/00 242/388.6 |
| 2007/0113524 A1 | 5/2007 | Lander |
| 2007/0128959 A1 | 6/2007 | Cooke |
| 2007/0169378 A1 | 7/2007 | Sodeberg et al. |
| 2008/0016717 A1 | 1/2008 | Ruban |
| 2008/0060167 A1 | 3/2008 | Hammerslag et al. |
| 2008/0060168 A1 | 3/2008 | Hammerslag et al. |
| 2008/0066272 A1 | 3/2008 | Hammerslag et al. |
| 2008/0066345 A1 | 3/2008 | Hammerslag et al. |
| 2008/0066346 A1 | 3/2008 | Hammerslag et al. |
| 2008/0068204 A1 | 3/2008 | Carmen et al. |
| 2008/0083135 A1 | 4/2008 | Hammerslag et al. |
| 2008/0092279 A1 | 4/2008 | Chiang |
| 2008/0172848 A1 | 7/2008 | Chen |
| 2008/0196224 A1 | 8/2008 | Hu |
| 2009/0019734 A1 | 1/2009 | Reagan et al. |
| 2009/0071041 A1 | 3/2009 | Hooper |
| 2009/0090029 A1 | 4/2009 | Kishino |
| 2009/0172928 A1 | 7/2009 | Messmer et al. |
| 2009/0184189 A1 | 7/2009 | Soderberg et al. |
| 2009/0272007 A1 | 11/2009 | Beers et al. |
| 2009/0277043 A1 | 11/2009 | Graser et al. |
| 2010/0064547 A1 | 3/2010 | Kaplan |
| 2010/0101061 A1 | 4/2010 | Ha |
| 2010/0139057 A1 | 6/2010 | Soderberg et al. |
| 2010/0154254 A1 | 6/2010 | Fletcher |
| 2010/0175163 A1 | 7/2010 | Litke |
| 2010/0251524 A1 | 10/2010 | Chen |
| 2010/0299959 A1 | 12/2010 | Hammerslag |
| 2010/0319216 A1 | 12/2010 | Grenzke et al. |
| 2011/0000173 A1 | 1/2011 | Lander |
| 2011/0071647 A1 | 3/2011 | Mahon |
| 2011/0162236 A1 | 7/2011 | Voskuil et al. |
| 2011/0167543 A1 | 7/2011 | Kovacevich et al. |
| 2011/0191992 A1 | 8/2011 | Chen |
| 2011/0197362 A1 | 8/2011 | Chella et al. |
| 2011/0225843 A1 | 9/2011 | Kerns et al. |
| 2011/0258876 A1 | 10/2011 | Baker et al. |
| 2011/0266384 A1 | 11/2011 | Goodman et al. |
| 2012/0000091 A1 | 1/2012 | Cotterman et al. |
| 2012/0004587 A1 | 1/2012 | Nickel et al. |
| 2012/0005995 A1 | 1/2012 | Emery |
| 2012/0023717 A1 | 2/2012 | Chen |
| 2012/0101417 A1 | 4/2012 | Joseph |
| 2012/0102783 A1 | 5/2012 | Swigart et al. |
| 2012/0138882 A1 | 6/2012 | Moore et al. |
| 2012/0157902 A1 | 6/2012 | Castillo et al. |
| 2012/0167290 A1 | 7/2012 | Kovacevich et al. |
| 2012/0174437 A1 | 7/2012 | Heard |
| 2012/0228419 A1 | 9/2012 | Chen |
| 2012/0246974 A1 | 10/2012 | Hammerslag et al. |
| 2012/0310273 A1 | 12/2012 | Thorpe |
| 2013/0012856 A1 | 1/2013 | Hammerslag et al. |
| 2013/0014359 A1 | 1/2013 | Chen |
| 2013/0019501 A1 | 1/2013 | Gerber |
| 2013/0025100 A1 | 1/2013 | Ha |
| 2013/0091667 A1 | 4/2013 | Chen |
| 2013/0092780 A1 | 4/2013 | Soderberg et al. |
| 2013/0269219 A1 | 10/2013 | Burns et al. |
| 2013/0277485 A1 | 10/2013 | Soderberg et al. |
| 2013/0340283 A1 | 12/2013 | Bell et al. |
| 2013/0345612 A1 | 12/2013 | Bannister et al. |
| 2014/0082963 A1 | 3/2014 | Beers |
| 2014/0094728 A1 | 4/2014 | Soderberg et al. |
| 2014/0117140 A1 | 5/2014 | Goodman et al. |
| 2014/0123440 A1 | 5/2014 | Capra et al. |
| 2014/0123449 A1 | 5/2014 | Soderberg et al. |
| 2014/0208550 A1 | 7/2014 | Neiley |
| 2014/0221889 A1 | 8/2014 | Burns et al. |
| 2014/0290016 A1 | 10/2014 | Lovett et al. |
| 2014/0359981 A1 | 12/2014 | Cotterman et al. |
| 2015/0007422 A1 | 1/2015 | Cavanagh et al. |
| 2015/0014463 A1 | 1/2015 | Converse et al. |
| 2015/0026936 A1 | 1/2015 | Kerns et al. |
| 2015/0033519 A1 | 2/2015 | Hammerslag et al. |
| 2015/0059206 A1 | 3/2015 | Lovett et al. |
| 2015/0076272 A1 | 3/2015 | Trudel et al. |
| 2015/0089779 A1 | 4/2015 | Lawrence et al. |
| 2015/0089835 A1 | 4/2015 | Hammerslag et al. |
| 2015/0101160 A1 | 4/2015 | Soderberg et al. |
| 2015/0150705 A1 | 6/2015 | Capra et al. |
| 2015/0151070 A1 | 6/2015 | Capra et al. |
| 2015/0190262 A1 | 7/2015 | Capra et al. |
| 2015/0223608 A1 | 8/2015 | Capra et al. |
| 2015/0237962 A1 | 8/2015 | Soderberg et al. |
| 2015/0335458 A1 | 11/2015 | Romo |

FOREIGN PATENT DOCUMENTS

| | | |
|---|---|---|
| AT | 361808 | 4/1981 |
| CA | 2114387 | 1/1994 |

(56) References Cited

FOREIGN PATENT DOCUMENTS

| | | |
|---|---|---|
| CA | 2112789 | 8/1994 |
| CA | 2114387 | 8/1994 |
| CH | 41765 | 9/1907 |
| CH | 111341 | 11/1925 |
| CH | 199766 | 9/1938 |
| CH | 199766 | 11/1938 |
| CH | 204 834 A | 5/1939 |
| CH | 204 834 A | 8/1939 |
| CH | 523 669 | 7/1972 |
| CH | 562 015 | 5/1975 |
| CH | 577 282 | 7/1976 |
| CH | 612 076 | 7/1979 |
| CH | 537 164 | 7/1981 |
| CH | 624 001 | 7/1981 |
| CH | 471 553 | 12/1984 |
| CN | 2613167 | 4/2004 |
| CN | 201015448 | 2/2008 |
| DE | 555211 | 7/1932 |
| DE | 641976 | 2/1937 |
| DE | 1 661 668 | 8/1953 |
| DE | 7043154.8 | 11/1970 |
| DE | 1 785 220 | 5/1971 |
| DE | 2 062 795 | 6/1972 |
| DE | 23 41 658 | 3/1974 |
| DE | 24 14 439 | 10/1975 |
| DE | 29 00 077 A1 | 7/1980 |
| DE | 2914280 A1 | 10/1980 |
| DE | 31 01 952 A1 | 9/1982 |
| DE | 36 26 837 | 2/1988 |
| DE | 38 13 470 | 11/1989 |
| DE | 3822113 C2 | 1/1990 |
| DE | 9413147 | 6/1994 |
| DE | 43 02 401 A1 | 8/1994 |
| DE | 43 05 671 A1 | 9/1994 |
| DE | 9308037 | 10/1994 |
| DE | 43 26 049 A1 | 2/1995 |
| DE | 9315776 | 2/1995 |
| DE | 29503552.8 | 4/1995 |
| DE | 196 24 553 | 1/1998 |
| DE | 19945045 A1 | 3/2001 |
| DE | 201 16 755 U1 | 1/2002 |
| DE | 20 2010 000 354 U1 | 6/2010 |
| DE | 11 2013 005 273 T5 | 9/2015 |
| EP | 0 056 953 81 | 6/1969 |
| EP | 0 081 042 81 | 7/1972 |
| EP | 0 056 953 | 8/1982 |
| EP | 0 099 504 | 2/1984 |
| EP | 0 123 050 | 2/1984 |
| EP | 0 123 050 | 10/1984 |
| EP | 0 155 596 | 9/1985 |
| EP | 0 201 051 | 11/1986 |
| EP | 0 099 504 | 1/1987 |
| EP | 0 255 869 | 7/1987 |
| EP | 0 155 596 | 1/1988 |
| EP | 0 255 869 | 2/1988 |
| EP | 0 393 380 | 3/1990 |
| EP | 0 393 380 | 10/1990 |
| EP | 0 474 708 | 9/1993 |
| EP | 0 589 232 A1 | 3/1994 |
| EP | 0 589 233 A1 | 3/1994 |
| EP | 0 614 624 | 9/1994 |
| EP | 0 614 625 A1 | 9/1994 |
| EP | 0 651 954 A1 | 5/1995 |
| EP | 0 679 346 | 11/1995 |
| EP | 0 693 260 B1 | 1/1996 |
| EP | 0 717 942 | 6/1996 |
| EP | 0 858 619 | 8/1996 |
| EP | 0 734 662 A1 | 10/1996 |
| EP | 0 848 917 | 6/1998 |
| EP | 0 858 621 | 8/1998 |
| EP | 0 923 965 | 6/1999 |
| EP | 0 937 467 | 8/1999 |
| EP | 0 848 917 81 | 4/2000 |
| EP | 1163860 | 12/2001 |
| EP | 1 219 195 | 7/2002 |
| EP | 1 236 412 | 9/2002 |
| EP | 1 236 412 A | 9/2002 |
| EP | 2298107 B1 | 3/2011 |
| EP | 2359708 | 8/2011 |
| FR | 1 349 832 | 3/1963 |
| FR | 1 404 799 | 7/1964 |
| FR | 1 374 110 | 10/1964 |
| FR | 1 404 799 | 7/1965 |
| FR | 2 019 991 A | 7/1970 |
| FR | 2 108 428 | 9/1971 |
| FR | 2 175 684 | 3/1972 |
| FR | 2.108.429 | 5/1972 |
| FR | 2 173 451 | 10/1973 |
| FR | 2 399 811 | 3/1979 |
| FR | 2 565 795 | 6/1984 |
| FR | 2 598 292 A1 | 11/1987 |
| FR | 2 726 440 A1 | 5/1996 |
| FR | 2 770 379 A1 | 5/1999 |
| FR | 2 814 919 A1 | 4/2002 |
| GB | 189911673 | 7/1899 |
| GB | 216400 | 5/1924 |
| GB | 2 449 722 A | 12/2008 |
| IT | 1220811 | 6/1990 |
| IT | PD 2003 A 000197 | 4/2003 |
| IT | PD 2003 A 000198 | 3/2005 |
| JP | 49-28618 | 3/1974 |
| JP | 51-2776 | 1/1976 |
| JP | 51-121375 | 10/1976 |
| JP | 51-131978 | 10/1976 |
| JP | 53-124987 | 3/1977 |
| JP | 54-108125 | 2/1978 |
| JP | 62-57346 | 4/1987 |
| JP | 63-80736 | 5/1988 |
| JP | H02-236025 | 9/1990 |
| JP | 7-000208 | 6/1995 |
| JP | 6-284906 | 2/1996 |
| JP | 3031760 | 9/1996 |
| JP | 3030988 | 11/1996 |
| JP | 8308608 | 11/1996 |
| JP | 3031760 | 12/1996 |
| JP | 10-199366 | 7/1998 |
| JP | 2001-197905 | 7/2001 |
| JP | 2004-016732 | 1/2004 |
| JP | 2004-041666 | 2/2004 |
| JP | 2009-504210 | 2/2009 |
| KR | 20-0367882 | 11/2004 |
| KR | 20-0400568 | 8/2005 |
| KR | 10-0598627 | 7/2006 |
| KR | 10-0953398 | 4/2010 |
| KR | 10-1025134 B1 | 3/2011 |
| KR | 10-1028468 | 4/2011 |
| KR | 10-1053551 | 7/2011 |
| WO | WO 94/27456 | 12/1994 |
| WO | WO 95/03720 | 2/1995 |
| WO | WO 95/11602 | 5/1995 |
| WO | WO 98/33408 | 8/1998 |
| WO | WO 98/37782 | 9/1998 |
| WO | WO 99/09850 | 3/1999 |
| WO | WO 99/15043 | 4/1999 |
| WO | WO 99/43231 | 9/1999 |
| WO | WO00/53045 | 9/2000 |
| WO | WO 00/53045 | 9/2000 |
| WO | WO 00/76337 | 12/2000 |
| WO | WO 00/76337 A1 | 12/2000 |
| WO | WO 01/08525 | 2/2001 |
| WO | WO 01/15559 | 3/2001 |
| WO | WO 02/051511 | 7/2002 |
| WO | WO 2004/093569 | 11/2004 |
| WO | WO 2005/013748 A1 | 2/2005 |
| WO | WO/2007/016983 | 2/2007 |
| WO | WO 2008/015214 | 2/2008 |
| WO | WO/2008/033963 | 3/2008 |
| WO | WO/2009/134858 | 11/2009 |
| WO | WO 2010/059989 A2 | 5/2010 |
| WO | WO 2012/165803 A2 | 12/2012 |
| WO | WO/2015/035885 | 3/2015 |

(56) References Cited

FOREIGN PATENT DOCUMENTS

| WO | WO 2015/179332 A1 | 11/2015 |
|---|---|---|
| WO | WO 2015/181928 A1 | 12/2015 |

OTHER PUBLICATIONS

La Sportiva, A Technical Lightweight Double Boot for Cold Environments http://www.sportiva.com/products/footwear/mountain/spantik.
U.S. Appl. No. 09/956,601 Including its prosecution history, filed Sep. 18, 2001, Hammerslag.
ASOLO® Boot Brochure Catalog upon information and belief date is as early as Aug. 22, 1997, 12 pages.
La Sportiva, A Technical Lightweight Double Boot for Cold Environments, 1 page. Accessed on May 27, 2015. Retrieved from http://www.sportiva.com/products/footwear/mountain/spantik.
"Strength of materials used to make my Safety Harnesses," Elaine, Inc. Jul. 9, 2012. Retrieved from <https://web.archive.org/web/20120709002720/http://www.childharness.ca/strength_data.html> on Mar. 17, 2014, 2 pages.
International Search Report and Written Opinion for PCT/US2013/032326 mailed Jun. 14, 2013, 27 pages.
International Preliminary Report on Patentability for PCT/US2013/032326 issued Sep. 16, 2014, 6 pages.
International Search Report and Written Opinion for PCT/US2013/057637 mailed Apr. 7, 2014, 34 pages.
International Preliminary Report on Patentability for PCT/US2013/057637 issued Mar. 3, 2015, 9 pages.
International Search Report and Written Opinion for PCT/US2013/068342 mailed Apr. 7, 2014, 29 pages.
International Preliminary Report on Patentability for PCT/US2013/068342 issued May 5, 2015, 9 pages.
International Search Report and Written Opinion for PCT/US2014/014952 mailed Apr. 25, 2014, 17 pages.
International Preliminary Report on Patentability for PCT/US2014/014952 issued Aug. 11, 2015, 9 pages.
International Search Report and Written Opinion for PCT/US2014/066212 mailed Apr. 22, 2015, 16 pages.
International Search Report and Written Opinion for PCT/US2014/032574 mailed Oct. 31, 2014, 19 pages.
International Search Report and Written Opinion for PCT/US2014/045291 mailed Nov. 6, 2014, 12 pages.
International Search Report and Written Opinion for PCT/US2014/013458 mailed May 19, 2014, 12 pages.
International Preliminary Report on Patentability for PCT/US2014/013458 issued Jul. 28, 2015, 7 pages.
International Search Report and Written Opinion for PCT/US2013/068814 mailed Jun. 9, 2014, 18 pages.
International Preliminary Report on Patentability for PCT/US2013/068814 issued May 12, 2015, 12 pages.
Notice of Reasons for Rejection from the Japanese Patent Office dated Feb. 26, 2015 for design application No. 2014-015570, 4 pages.
Receipt of Certificate of Design Registration No. 1529678 from the Japanese Patent Office for design application No. 2014-015570 dated Jun. 26, 2015, 1 page.
International Search Report and Written Opinion for PCT/US2014/055710 mailed Jul. 6, 2015, 19 pages.
International Search Report and Written Opinion for PCT/US2014/054420 mailed Jul. 6, 2015, 21 pages.
The Preliminary Rejections from the Korean Intellectual Property Office for Application No. 30-2014-34959, is not translated into English. The document requests a renaming of the application to be in accordance with Korean patent law, 5 pages total.
The Preliminary Rejections from the Korean Intellectual Property Office for Application No. 30-2014-34959, is not translated into English. The document requests a revision of the drawings to be in accordance with Korean patent law, 6 pages total.
Certificate of Design Registration No. 30-809409 on Aug. 3, 2015 from the Korean Intellectual Property Office for Appln No. 30-2015-11475, 2 pages.
Certificate of Design Registration No. 30-809410 on Aug. 3, 2015 from the Korean Intellectual Property Office for Appln No. 30-2015-11476, 2 pages.
European Search Report for EP 14168875 mailed Oct. 29, 2014, 9 pages.
International Search Report and Written Opinion for PCT/US2014/020894 mailed Jun. 20, 2014, 12 pages.
International Preliminary Report on Patentability for PCT/US2014/020894 issued Sep. 8, 2015, 7 pages.
International Search Report and Written Opinion for PCT/US2014/041144 mailed Dec. 10, 2014, 13 pages.
International Preliminary Report on Patentability for PCT/US2014/032574 issued Oct. 6, 2015, 12 pages.
International Search Report and Written Opinion for PCT/US2014/046238 mailed Nov. 21, 2014, 17 pages.
Office Action from the German Patent and Trademark Office for Appln No. 402015100191.2, regarding the title of the invention, 2 pages.
Anonymous, "Shore durometer," Wikipedia, the free encyclopedia, Mar. 10, 2012, XP002747470, Retrieved from the Internet: URL: https://en.wikipedia.org/w/index.php?title.Shore_durometer &oldid=481128180 [retrieved on Oct. 20, 2015] * shore A, shore D, durometer, polymer, rubber, gel; the whole document *, 6 pages.
Notice of Reasons for Rejection from the Japanese Patent Office dated Oct. 5, 2015 for design application No. 2015-004923, 4 pages.
"Save Tourniquet," 3 pages. Copyright 2015. Accessed on Dec. 11, 2015. Retrieved from http://www.savetourniquet.com/.

* cited by examiner

FAILURE COMPENSATING LACE TENSION DEVICES AND METHODS

CROSS-REFERENCES TO RELATED APPLICATIONS

This application claims priority to U.S. patent application No. 61/877,628 filed Sep. 13, 2013, and titled "Failure Compensating Lace Tension Devices and Methods," and to U.S. patent application No. 61/937,372 filed Feb. 7, 2014, and titled "Failure Compensating Lace Tension Devices and Methods," the entire disclosures of which are hereby incorporated by reference, for all purposes, as if fully set forth herein.

BACKGROUND OF THE INVENTION

The embodiments described herein are related to closure devices for various articles, such as braces, medical devices, shoes, clothing, apparel, and the like. Such articles typically include closure devices that allow the article to be placed and closed about a body part. The closure devices are typically used to maintain or secure the article to the body part. For example, shoes are typically placed over an individual's foot and lace is tensioned and tied to close the shoe about the foot and secure the shoe to the foot. Conventional closure devices have been modified in an effort to increase the fit and/or comfort of the article about the body part. For example, shoe lacing configurations and/or patterns have been modified in an attempt to increase the fit and/or comfort of wearing shoes. Conventional closure devices have also been modified in an effort to decrease the time in which an article may be closed and secured about the body part. These modifications have resulted in the use of various pull cords, straps, and tensioning devices that enable the article to be quickly closed and secured to the foot.

BRIEF SUMMARY OF THE INVENTION

The embodiments described herein provide closure systems and components therefor. According to one aspect, a reel for tightening an article includes a base member that is coupleable with the article and a housing positioned atop the base member and removeably coupleable therewith. The housing includes an interior region within which a spool is positioned. The spool is rotatable within the housing and includes a central post about which a tension member is wound. A knob member is coupled with the spool and configured to cause the spool to rotate within the interior region of the housing in a first direction to wind the tension member about the spool's central post. The reel also includes a load holding mechanism that is coupled with the spool and the housing. The load holding mechanism includes a first friction element/component and a second friction element/component that are frictionally engageable to prevent rotation of the spool in a second direction opposite the first direction to prevent unwinding of the tension member from the spool's central post. Rotation of the knob member in the first direction reduces the frictional engagement of the first friction element and the second friction element to enable rotation of the spool in the first direction and tension in the tension member biases the spool toward rotation in the second direction which increases the frictional engagement of the first friction element and the second friction element.

In some embodiments, the knob member includes a tapered lumen through which the tension member is inserted to enable a knot to be tied in the tension member, or a coupling element to be coupled with the tension member. In such embodiments, the knot or coupling element engages with the tapered lumen as the tension member is retracted within the lumen to enable attachment of the tension member with the spool without disassembly of reel. In such embodiments, the housing may include a lumen through which the tension member is inserted. The lumen of the housing may align with the lumen of the knob member so that, upon alignment, the lumen of the housing directs the tension member through the lumen of the knob member.

In some embodiments, the base member includes a spring member that is positioned within an annular groove and that releasably engages with a bottom end of the housing to removably couple the housing with the article. In some embodiments, the reel includes a release mechanism that is rotatably coupled with the housing and attached to a distal end of the second friction element. The release mechanism is rotatable relative to the housing to enable the spool to be rotated in the second direction and thereby enable unwinding of the tension member from the spool's central post. In some embodiments, the release mechanism may be rotatable between a lock position and an unlock position, where in the lock position rotation of the spool in the second direction is prevented, and where in the unlock position rotation of the spool in the second direction is enabled. In other embodiments, continuous rotation of the release mechanism in the second direction causes a corresponding rotation of the spool in the second direction to unwind the tension member from the spool's central post.

In some embodiments, the spool is not fully enclosed by a wall or walls of the housing so that the spool and/or a portion of the tension member wound about the spool's post is visible to a user. In such embodiments, the wall or walls of the housing may extend from a bottom portion of the base member or spool to a top portion of the spool and/or an under surface of the knob to reinforce the coupling of the spool and/or knob with the housing and/or base member.

In some embodiments, the first friction element is a hub that is coaxially aligned with and positioned within a lumen of the spool and the second friction element is a spring that is wound about the hub and configured to constrict about an outer surface of the hub to prevent rotation of the spool in the second direction. In other embodiments, the first friction element is a pair of hubs with a first one of said hubs fixedly coupled with the housing and a second one of said hubs fixedly coupled with the knob. In such embodiments, the second one of said hubs is configured to rotate relative to the first one of said hubs when frictional engagement of the spring and said pair of hubs is reduced. The second one of said hubs is rotatably locked to the first one of said hubs when frictional engagement of the spring and said pair of hubs is increased.

According to another aspect, a reel for tightening an article includes a housing having an interior region and a base that is attachable to the article and a spool positioned within the interior region of the housing and rotatable relative thereto. The spool includes a central post about which a tension member is wound. A knob member is coupled with the spool and configured to cause the spool to rotate within the interior region of the housing in a first direction to wind the tension member about the spool's central post. A load holding mechanism is coupled with the spool and the housing. The load holding mechanism includes a first friction element and a second friction element that are frictionally engageable to prevent rotation of the spool in a second direction opposite the first direction to prevent unwinding of the tension member from the spool's central post. Rotation of the knob member in the first direction reduces the frictional engagement of the first friction element and the second friction element to enable rotation of the spool in the first direction and tension in the tension member biases the load holding mechanism toward rotation in the second direction which increases the frictional engagement of the first friction element and the second friction element.

In some embodiments, the reel includes a release mechanism that is rotatably coupled with the housing and attached to a distal end of the second friction element. The release mechanism is rotatable relative to the housing to enable the spool to be rotated in the second direction and thereby enable unwinding of the tension member from the spool's central post. In some embodiments, the release mechanism is rotatable between a lock position and an unlock position where, in the lock position, rotation of the spool in the second direction is prevented and where, in the unlock position, rotation of the spool in the second direction is enabled. In other embodiments, rotation of the release mechanism in the second direction causes a corresponding rotation of the spool in the second direction to unwind the tension member from the spool's central post.

In some embodiments, the first friction element is a hub that is coaxially aligned with and positioned within a lumen of the spool and the second friction element is a spring that is wounds about the hub and configured to constrict about an outer surface of the hub to prevent rotation of the spool in the second direction. In other embodiments, the first friction element is a pair of hubs with a first one of said hubs fixedly coupled with the housing and a second one of said hubs fixedly coupled with the knob. In such embodiments, the second one of said hubs is configured to rotate relative to the first one of said hubs when frictional engagement of the spring and said pair of hubs is reduced and the second one of said hubs is rotatably locked to the first one of said hubs when frictional engagement of the spring and said pair of hubs is increased.

According to another aspect, a method for assembly a shoe with a reel based mechanism includes providing a reel that includes: a base member, a housing having an interior region, a spool positioned within the interior region of the housing and rotatable relative thereto, a knob member that is coupled with the spool, and a load holding mechanism that is coupled with the spool and the housing. The spool includes a central post about which a tension member is wound and the knob member is configured to cause the spool to rotate within the interior region of the housing in a first direction to wind the tension member about the spool's central post. The load holding mechanism includes a first friction element and a second friction element that are frictionally engageable to prevent rotation of the spool in a second direction opposite the first direction to prevent unwinding of the tension member from the spool's central post. The load holding mechanism is configured so that rotation of the knob member in the first direction reduces the frictional engagement of the first friction element and the second friction element to enable rotation of the spool in the first direction and tension in the tension member biases the load holding mechanism toward rotation in the second direction which increases the frictional engagement of the first friction element and the second friction element. The method also includes coupling the base member with the article.

In some embodiments, the housing is integrally formed with the base member. In other embodiments, the housing is removably coupleable with the base member. In some embodiments, the base member includes a spring member that is positioned within an annular groove and that releasably engages with a bottom end of the housing to removably couple the housing with the article.

According to another aspect, a mechanism for releasably attaching a component to an article includes a base member that is attachable to an article. The base member includes: an inner cavity or aperture, a channel disposed within the inner cavity or aperture, and a spring component positioned within the channel. The spring component is configured to radially deflect about a bottom end of the component as the component is inserted within the inner cavity or aperture to lock the bottom end of the component within the inner cavity or aperture of the base member and thereby releasably couple the component with the base member.

In some embodiments, the channel of the inner cavity or aperture is an annular channel and the spring component radially deflects within the annular channel as the bottom end of the component is inserted within the inner cavity or aperture. In such embodiments, the spring component may be a split ring having an inner diameter that widens upon radial deflection. In such embodiments, the widening of the inner diameter may be constrained by the annular channel and an outer diameter of the bottom end of the component may be greater than a widest inner diameter of the split ring allowed by the annular channel so that insertion of the bottom end of the component causes the base member or the bottom end of the component to flex to enable insertion of the bottom end of the component within the base member's inner cavity or aperture.

In some embodiments, the bottom end of the component includes an annular channel within which the spring component is positioned, or the bottom end of the component includes a plurality of lock tabs about which the spring component flexes, to lock the bottom end of the component within the inner cavity or aperture. In some embodiments, the spring component is a split ring, a horseshoe spring, or a clover spring. In some embodiments, the base member further includes a flange that radially extends from all or a portion of an outer periphery of a bottom end of the base member. The flange may be coupleable with the article.

According to another aspect, a method for releasably attaching a component to an article includes providing a base member that includes: an inner cavity or aperture, a channel disposed within the inner cavity or aperture, and a spring component positioned within the channel. The method also includes attaching the base member with the article and inserting a bottom end of the component within the inner cavity or aperture so that the spring component radially deflects about the component's bottom end and thereby locks the bottom end of the component within the inner cavity or aperture of the base member. In some embodiments, attaching the base member with the article includes coupling a flange of the base member with the article.

According to another aspect, a lacing system for tightening an article includes a tension member and a plurality of guide members that are positioned about the article and operably coupled with the tension member to guide the tension member along a path about the article. The lacing system also includes a tightening mechanism that is operably coupled with the tension member and configured to tension the tension member to a first level of tension to effect tightening of the article. The lacing system further includes a stop member that is coupled with the tension member. The stop member is configured upon breakage of the tension member to engage with at least one of the plurality of guide members to maintain a second level of tension in the tension member and thereby maintain a tightness of the article. The second level of tension is less than the first level of tension and greater than a nominal level of tension.

In some embodiments, the stop component is configured to couple with the tension member subsequent to coupling of the tension member with the article. In some embodiments, the stop component includes a lumen through which a portion of the tension member is positioned and a channel around which the portion of the tension member is wound. The stop component is larger than an opening of the at least one of the plurality of guide members to prevent the stop component from being pulled through the at least one of the plurality of guide members.

According to another aspect, a method for maintaining tension in a tension member upon breakage of the tension member is provided. In the method, the tension member is used to tighten an article where the article includes: a tension member, a plurality of guide members positioned about the article and operably coupled with the tension member to guide the tension member along a path about the article, and a tightening mechanism that is operably coupled with the tension member and configured to tension the tension member to a first level of tension to effect tightening of the article. The method includes coupling a stop member with the tension member. The stop member is configured to engage with at least one of the plurality of guide members upon breakage of the tension member to maintain a second level of tension in the tension member and thereby maintain a tightness of the article. The second level of tension is less than the first level of tension and greater than a nominal level of tension.

BRIEF DESCRIPTION OF THE DRAWINGS

The present invention is described in conjunction with the appended figures.

Figure 1:
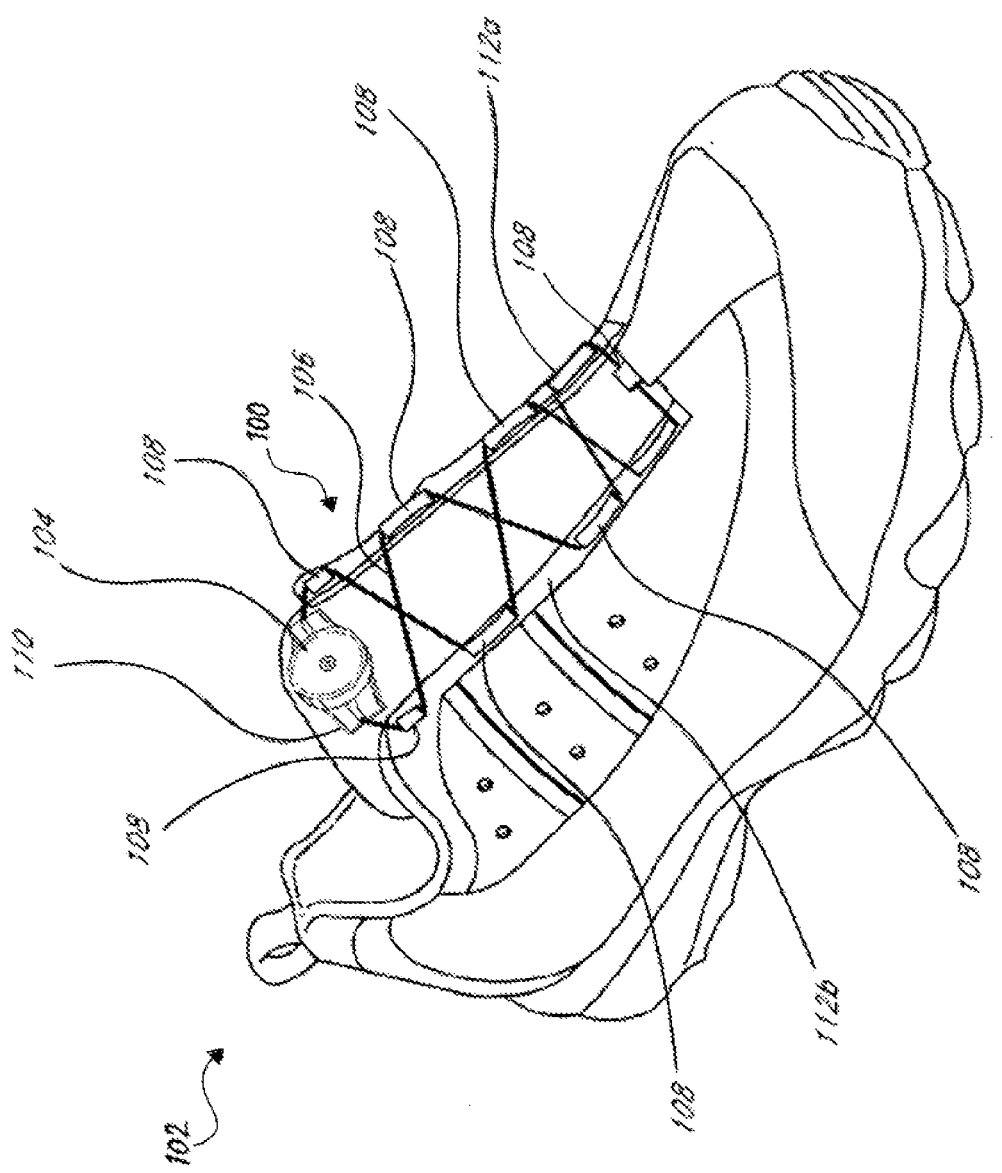
FIGS. 1-4 illustrate a general closure or lacing system that may be used to tighten a shoe or other apparel or device about a foot or limb.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments described herein provide various devices and methods that may be used to compensate for a failure in a component of a shoe. For example, the shoe's lace may break due to constant fatigue and/or exposure to severe conditions and/or lace stress. For example, in some activities, such as rock climbing, competitive sports, and the like, the shoe's lace may contact and rub against sharp and/or rough objects. The objects may cause the shoe's lace to slightly fray, crack, or otherwise break. Repeated exposure to such harsh conditions, and/or a sudden increase in the lace's tension due to sudden movement of the foot, may cause the lace to fail. Similarly, in military conditions, the shoes worn by soldiers may be subject to extreme and harsh conditions, which may greatly decrease the life of the lace and/or cause sudden failure of the lace. Similar harsh conditions may be subjected to shoes worn by police, firefighters, construction workers, other specialized workmen, and the like.

Failure of the lace may result in the shoe being too loose on the foot. Thus, the shoe may be incapable of providing a proper or desired support and/or protection. In extreme cases, the shoe may fall off the foot entirely or may be so loose that wearing the shoe is detrimental. For example, in rock climbing activities, failure of the shoe's lace may expose a user's foot to the harsh rock surfaces and/or may slip as the user attempts to climb a rock. This may result in damage and/or bleeding of the foot, or may render the climbing conditions dangerous. In sports situations, loss of the shoe may result in the participant being unable to finish or complete a play and/or may cause the participant to fall or stumble. In military applications, loss of the shoe, or loss of the shoe's tightness, may result in the soldier being unable to participate in a military operation or being unable to flee from a dangerous situation. In extreme cases, loss of the shoe may result in a death of an individual, such as when a soldier is unable to flee from a dangerous situation and is captured or hit by enemy fire as a result.

Other embodiments described herein provide shoe components that produce less audible noise during use of the component. For example, as described herein, some shoes are tensioned or tightened using a knob and reel assembly, which may be rotated to tighten and/or loosen a shoe's lace. Conventional reel assemblies often produce an audible noise as they are rotated by a user, such as a clicking sound from one or more internal components. In some situations it may be desirous to tension or tighten a shoe without producing such an audible noise. For example, a user may be in a public place and may not want to draw attention to him or herself as the shoe is being tightened. Similarly, hunters or outdoorsmen often want to remain as quiet as possible in order to avoid alerting game to their locations. In military situations, a soldier may not want to producing audible noise to avoid alerting enemies to their location and/or to enable the soldier to sneak up on an enemy without being detected.

These and other aspects of the embodiments will be realized with reference to the description of the several figures provided below. Before describing specific embodiments, however, FIGS. 1-4 are provided as a general description of a closure or lacing system that may be used to tighten a shoe or other apparel or device about a foot or limb. It should also be realized that while the embodiments are directed mainly to shoes, the embodiments described herein may be applied to virtually any application in which an object needs to be tensioned. For example, the embodiments may be used in various medical applications, on braces, sports equipment, outdoor wear, backpacks, hats, and the like as desired.

Referring now to FIG. 1, illustrated is a perspective view of an embodiment of lacing system 100 used for tightening a shoe 102. The shoe can be any suitable footwear that can be tightened around a wearer's foot. The lacing system 100 can be used to close or tighten various other articles as described herein, such as, for example, a belt, a hat, a glove, snowboard bindings, a medical brace, or a bag. The lacing system can include a reel assembly 104, a lace 106, and one or more lace guides 108. In the illustrated embodiment, the reel assembly 104 can be attached to the tongue 110 of the shoe.

Various other configurations are also possible. For example, the reel assembly 104 can be attached to a side of the shoe 102, which can be advantageous for shoes in which the shoe sides 112a-b are designed to be drawn closely together when tightened leaving only a small portion of the tongue 110 exposed. The reel assembly 104 can also be attached to the back of the shoe 102, and a portion of the lace 106 can pass through the shoe 102, sometimes using tubing for the lace to travel through, on either side of the wearer's ankle such that the lace 106 can be engaged with the reel assembly 104 when back-mounted. In some embodiments, the reel assembly 104 may also be attached to the lateral side at or near the top of the lacing throat.

Figure 2:
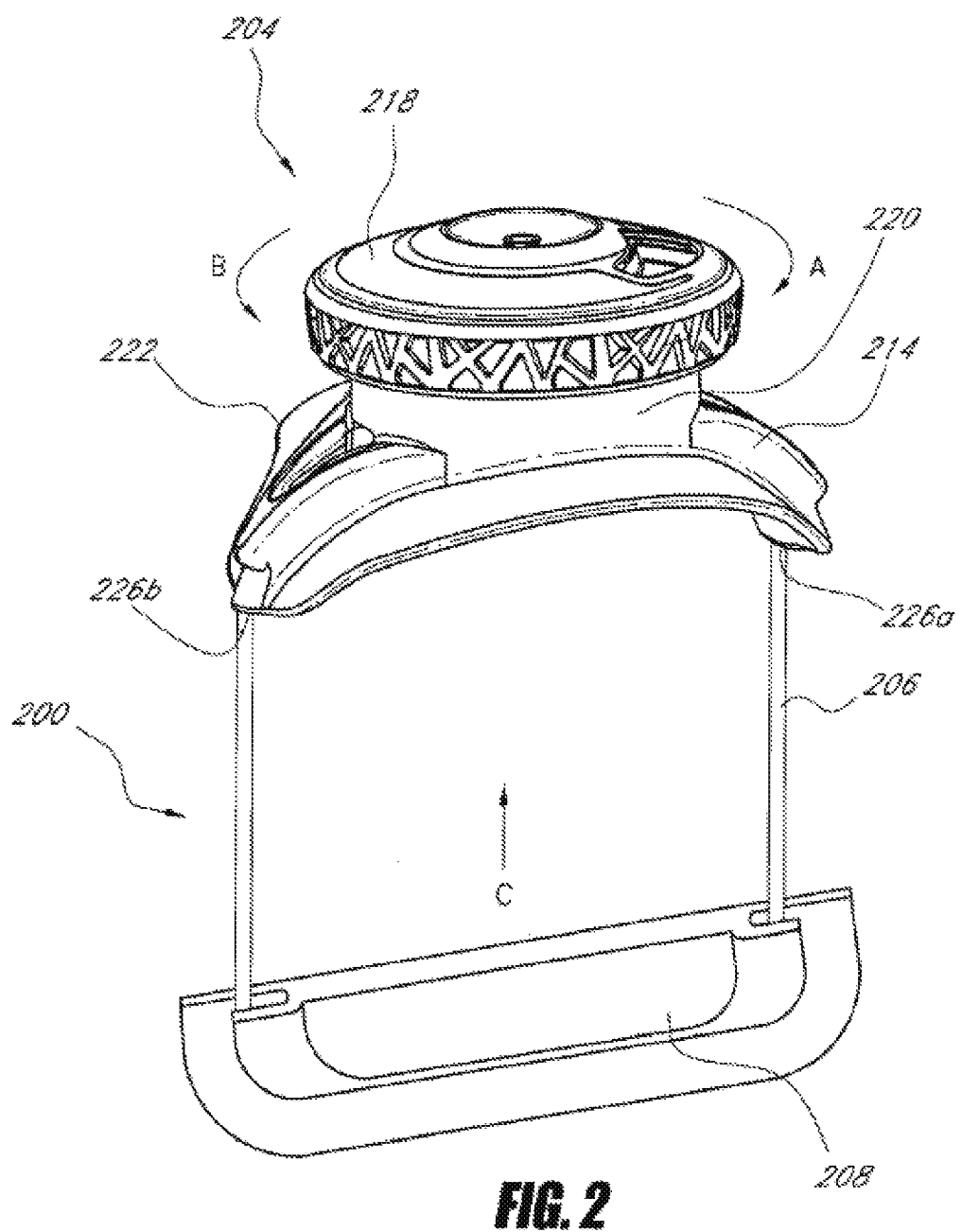
Figure 3:
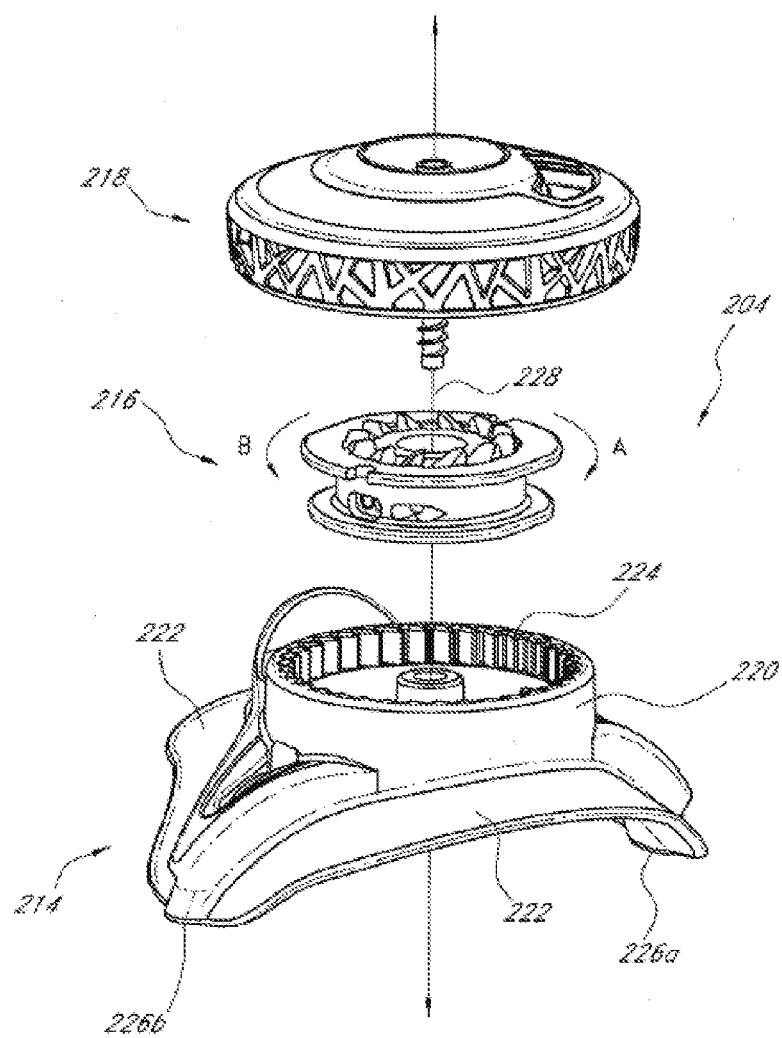
Figure 4:
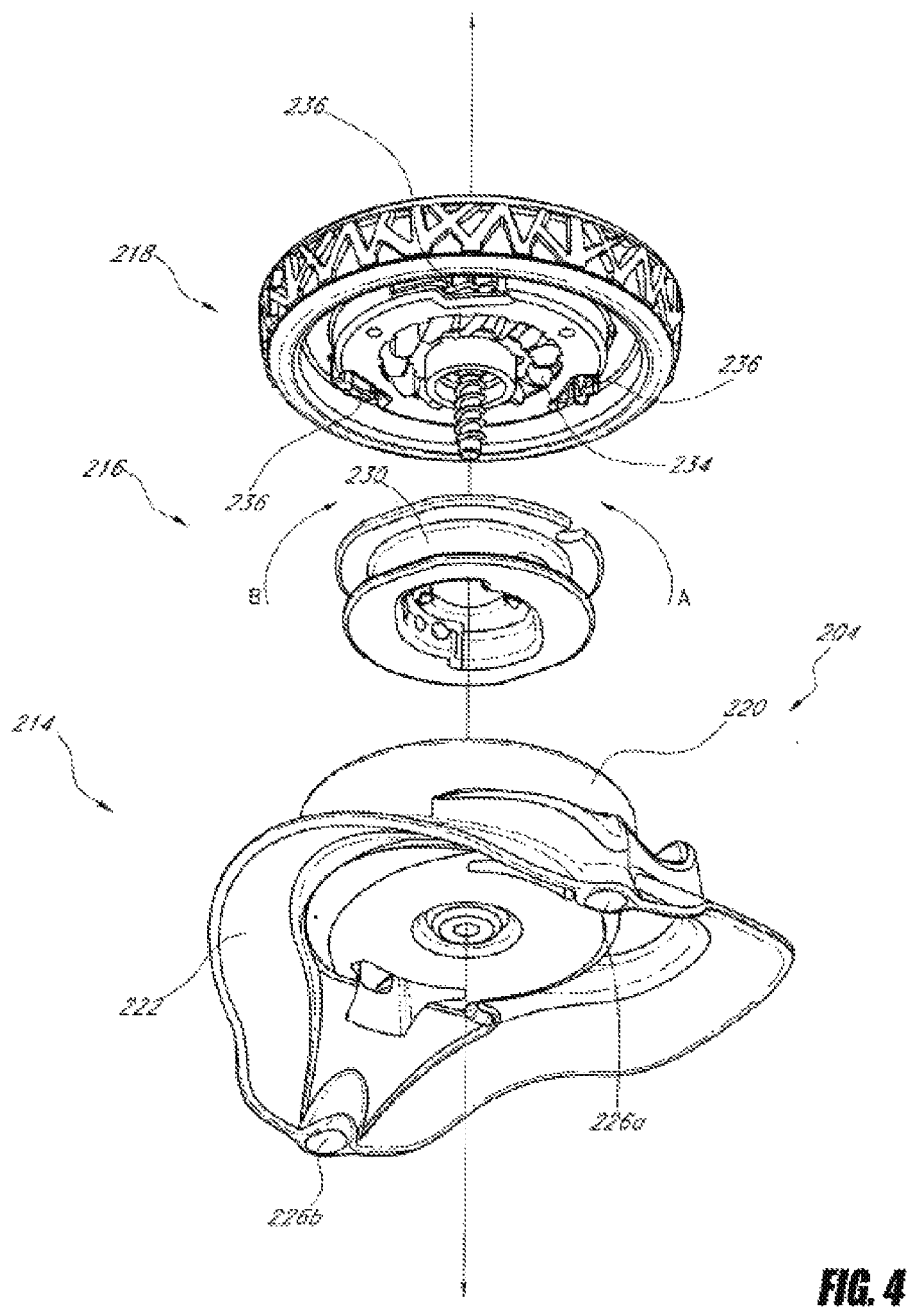

FIG. 2 is a perspective view of an embodiment of lacing system 200 that can be similar to the lacing system 100, or any other lacing system described herein. The lacing system can include a reel assembly 204 which can be similar to the reel assembly 104, or any other reel/knob assembly described herein. FIG. 3 is an exploded perspective view of the reel assembly 204. FIG. 4 is another exploded perspective view of the reel assembly 204.

With reference to FIGS. 2 to 4, the reel assembly 204 can include a base member 214, a spool member 216, and a knob member 218. The base member can include a housing 220 and a mounting flange 222. The spool housing 220 can include a plurality of ratchet teeth 224, which can extend radially inwardly. The base member 214 can include lace holes (e.g., 226a) that allow the lace 206 to enter the spool housing 220.

The spool member 216 can be disposed within the spool housing 220 such that the spool member 216 is rotatable about an axis 228 with respect to the spool housing 220. The lace 206 can be secured to the spool member 216 such that when the spool member 216 rotates in a tightening direction (shown by arrow A) the lace 206 is drawn into the spool housing 220 and is wound around the channel 230 formed in the spool member 216, and when the spool member 216 rotates in a loosening direction (shown by arrow B) the lace 206 unwinds from the channel 230 of the spool member 216 and exits the spool housing 220 via the lace holes (e.g., 226a). The spool member 216 can also include spool teeth 232 formed thereon. It will be understood that the embodiments disclosed herein can be modified such that rotation in the direction shown by arrow B will tighten the lacing. In this particular embodiment, the knob member 218 may be raised axially to disengage from spool 230 to allow the spool to freewheel in direction B in order to release the lace. In other embodiments, rotation of the knob member 218 in the direction shown by arrow A may loosen the lacing system. In a specific embodiment, the knob member 218 may be rotated be a specific amount (e.g., ¼ to ½ turn) in a loosening direction (e.g., as shown by arrow A) to loosen the lacing system. Other user interfaces are possible for tightening, releasing, or adjusting lace tension.

The knob member 218 can be attached to the spool housing 220 such that the knob member 218 can rotate about the axis 228 with respect to the spool housing 220. The knob member 218 can include knob teeth 234 that can be configured to mate with the spool teeth 232 to couple the knob member 218 to the spool member 216 such that rotation of the knob member 218 in the tightening direction causes the spool member 216 to also rotate in the tightening direction. In some embodiments, the rotation of the knob member 218 in the loosening direction can also cause the spool member 216 to rotate in the loosening direction. The knob member 218 can also include one or more pawls 236 which can be biased radially outwardly so as to mate with the ratchet teeth 224. The pawls 236 and ratchet teeth 224 can be configured so that the ratchet teeth 224 can displace the pawls 236 radially inwardly when the knob member 218 is rotated in the tightening direction, thereby allowing the knob member 218 to rotate in the tightening direction. In another embodiment, the pawls 236 and ratchet teeth 224 configuration may be reversed so that the pawls 236 bias inwardly. The pawls 236 and the ratchet teeth 224 can also be configured so that they engage one another when force is applied to twist the knob member 218 in the loosening direction, thereby preventing the knob member 218 from rotating in the loosening direction. In other arrangements, the ratchet teeth 224 may be oriented axially to engage knob pawl members (not shown) that are correspondingly arranged to mate axially.

Thus, a reel assembly such as reel assembly 204 can provide a one-way tightening system configured to allow the user to rotate the knob member 218 in the tightening direction, which causes the spool member 216 to rotate in the tightening direction, which in turn causes the lace 206 to be drawn into the spool housing 220 via the lace holes (e.g., 226a). As the lace 206 is drawn into the spool housing 220 the lacing system 200 can tighten, causing the lace guide 208 to be drawn in the direction toward the reel assembly 204 (shown by arrow C in FIG. 2). Although the lacing system 200 is shown with a single lace guide 208, any other suitable number of lace guides can be used. Other features of the reel and lacing system are described in U.S. patent application No. 2011/0266384, filed Apr. 29, 2011, and Titled "Reel Based Lacing System", the entire disclosure of which is incorporated herein by reference.

Referring now to FIGS. 5A-7C, illustrated are embodiments in which a lace of a closure or lacing system may remain tensioned after failure or breakage of the lace. The embodiments illustrated in FIGS. 5A-7C illustrate a lacing system that includes a reel assembly and knob device as described above. It should be realized, however, that the embodiments are not limited to such lacing systems and that the embodiments may be used with virtually any conventional lacing system, such as standard shoelace or pull cord system.

Figure 5A:
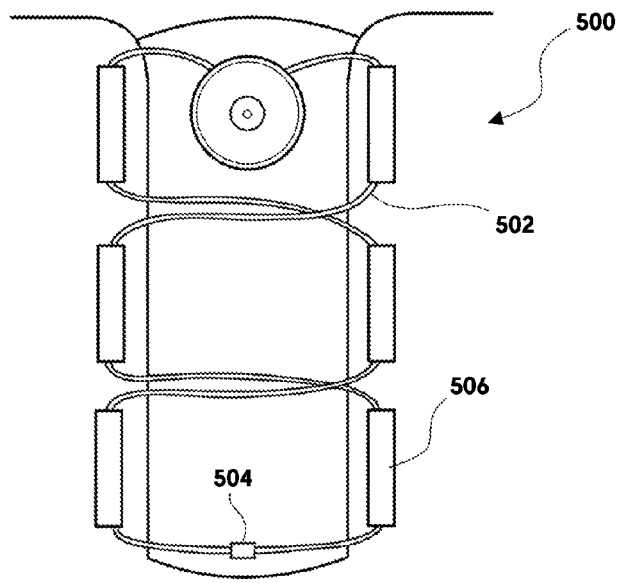
FIGS. 5A-7B illustrate embodiments in which a lace of a lacing system may remain tensioned after failure or breakage of the lace.
Figure 5B:
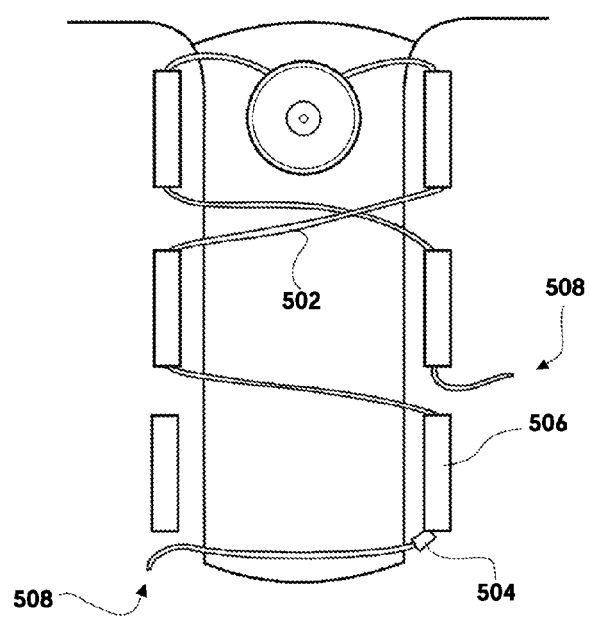

FIGS. 5A and 5B illustrates a lacing system 500 that includes a lace 502 that is positioned around a plurality of guides 506 as described above. A stop member 504 is positioned at a distal end of the lace path between a pair of guides 506. The stop member 504 is coupled with the lace 502 and essentially divides the lace 502 in half such that upon breakage or failure of the lace 502, one half of the lace remains coupled with a guide and tensioned to prevent the shoe from becoming fully loose, and/or to allow the reel assembly of lacing system 500 to be subsequently operated to tension the lace 502. For example, upon breakage or failure of the lace, as shown at position 508, the stop member 504 remains coupled with lace 502 and is pulled toward guide 506 until the stop member 504 contacts or engages with guide 506. Engagement of the stop member 504 and guide 506 prevents further slippage of the lace 502 so that half of the lacing system's lace 502 remains tensioned.

The tension may decrease to some degree as the stop member 504 moves from a roughly centered position between the opposing guides and into engagement with guide 506, but the overall tension in the shoe is significantly greater than would otherwise be achieved with a total failure of the lace 502. Further, the reel assembly of lacing system 500 may be operated to further tension the lace 502 with the stop member 504 engaged with guide 506. Thus, even a slight decrease in the lace tension and tightness of the shoe may be remedied by using the lacing system's reel assembly to re-tension the lace 502. As shown in FIG. 5A, in some embodiments the stop member 504 may include a clamping component that may be positioned over the lace 502 and clamped about the lace. Such clamping components may be clamped with conventional lace or lacing systems to provide a failsafe mode. In other embodiments, stop member 504 may be a built in component or otherwise pre-fit with the lace 502. In addition to a clamping component, the stop member 504 may be a lockable ferrule, threaded lace lock, and the like.

Figure 5C:
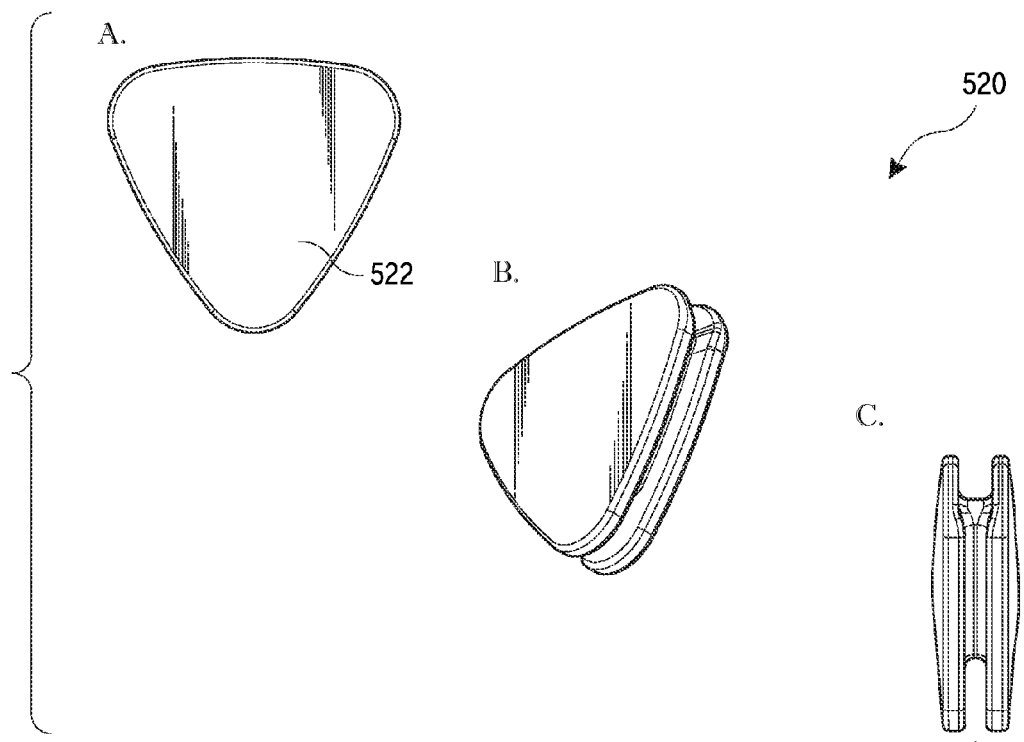
Figure 5D:
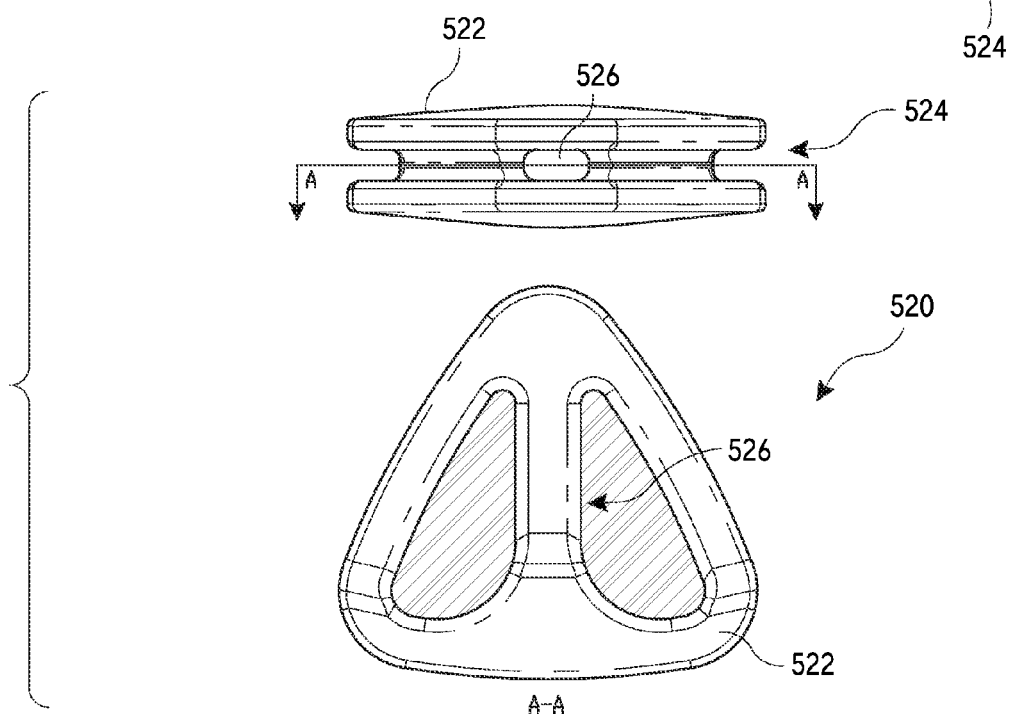
Figure 5E:
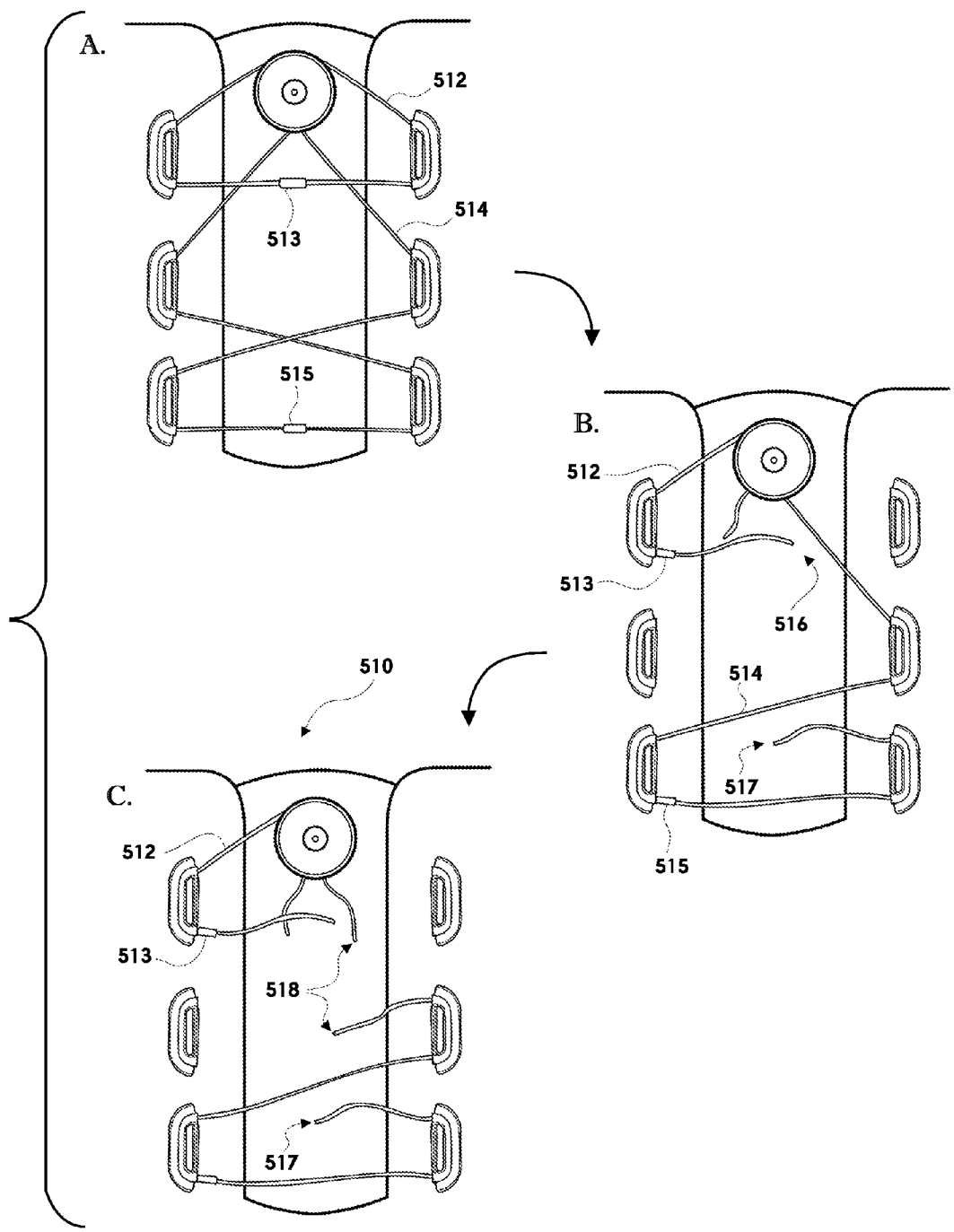
Figure 5F:
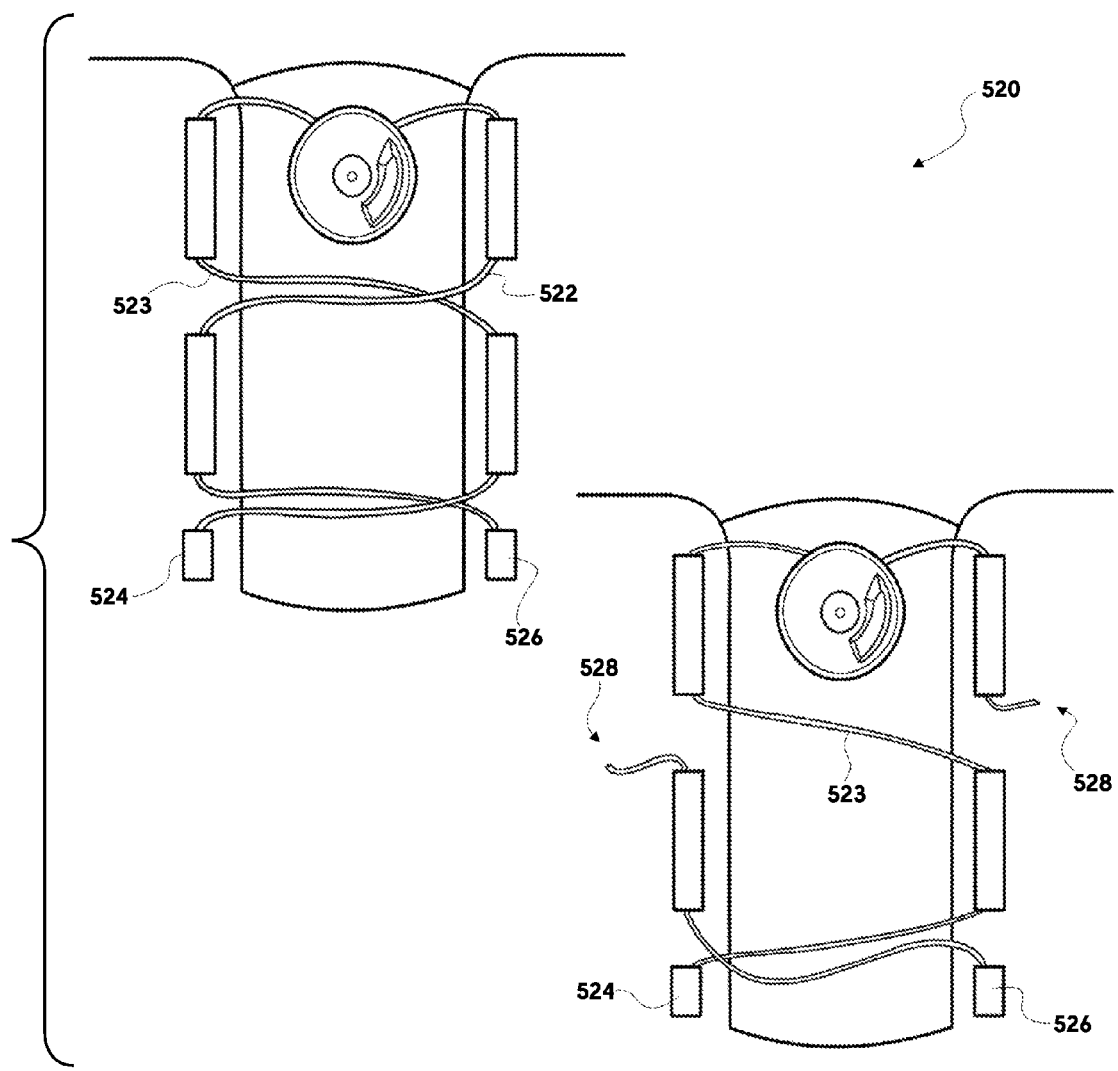

FIG. 5E illustrates another embodiment of a lacing system 510 that includes a stop member that is able to maintain lace tension and tightness of a shoe upon failure of a lace. Specifically, FIG. 5E illustrates a pair of stop members, 513 and 515, that are coupled with a first lace 512 and a second lace 514 respectively. As described previously, upon failure of the first lace 512, such as at point 516, the first stop member 513 will be pulled into engagement with a guide of the lacing system 510 to prevent further slippage of the first lace 512 and to maintain some tension or tightness in the shoe. Similarly, upon failure of the second lace 514, such as at point 517, the second stop member 515 will be pulled into engagement with a guide of the lacing system 510 to prevent further slippage of the second lace 514 and to maintain some tension or tightness in the shoe. The lacing system 510's reel assembly may then be operated to further tension the first and/or second lace, 512 and 514, respectively.

The embodiment of FIG. 5E provides redundancy in failure proofing the lacing system 510. Stated differently, in order to achieve a total or catastrophic failure of the lacing system's lace, the lacing system's lace must fail approximately 4 times. For example, upon a failure of the first lace 512 (i.e., point 516), one half of the first lace 512 remains tensioned while the entire second lace 514 remains tensioned or vice versa. Similarly, upon a failure of the second lace 514 (i.e., point 517), one half of the first lace 512 remains tensioned and one half of the second lace 514 remains tensioned. Upon an additional failure of one of the laces (e.g., failure of the second lace 514 at point 518), one half of the lacing system's lace (e.g., lace 512 as illustrated) would remain tensioned until that lace also experienced failure or breakage. The redundancy of the lacing system 510 allows a shoe to be subjected to extreme and harsh conditions for an extended period of time before experiencing a total or catastrophic failure.

FIGS. 5C and 5D illustrate a stop component 520 that may be coupled with the tension member or lace so that upon breakage of the tension member, the stop component engages with a guide member (e.g., guide 506 and the like) to maintain tension in the lace. As described herein, the lace tension may decrease slightly to a second level of tension that is less than an initial tension or first level of tension, however, the reduced tension or second tension level will be greater than a nominal level of tension, such as no lace tension. The reduced or second level of tension will be sufficient to ensure that an article maintains a sufficient level of tightness. For example, the tension will be sufficient to ensure that a shoe or footwear stays on the user's foot and the user is able to use the shoe or footwear. As described herein, the lace may be subsequently re-tensioned after breakage to increase the lace tension to near or greater than the first tension level.

The stop component 520 includes a main body 522 having a lumen 526 that extends through the main body. The lumen 526 enables the stop component 520 to couple with a lace after or subsequent to the lace being coupled with an article. For example, a shoe lace may be positioned about a shoe and then a portion of the shoe lace coupled with the stop component 520. The lace may be coupled with the stop component by forming a loop in the lace and inserting the loop through the lumen 526 of the stop component 520. The loop of lace may then be positioned within a channel 524 formed between and upper and lower portion of the stop component body 522. The loop may be positioned one or more times within the channel 524 to couple the lace with the stop component 520. As described herein, the stop component 520 is dimensioned larger than the openings of an adjacent guide to prevent the stop component 520 from being pulled through the guide.

According to one embodiment, a method for maintaining tension in a lace or tension member upon breakage of the lace includes coupling a stop member with the lace in an article that includes the lace, a plurality of guide members positioned about the article and operably coupled with the tension member to guide the tension member along a path about the article, and a tightening mechanism that is operably coupled with the tension member and configured to tension the tension member to a first level of tension to effect tightening of the article. The stop member is configured to engage with at least one of the plurality of guide members upon breakage of the tension member to maintain a second level of tension in the tension member and thereby maintain a tightness of the article. The second level of tension is less than the first level of tension and greater than a nominal level of tension.

Figure 5G:
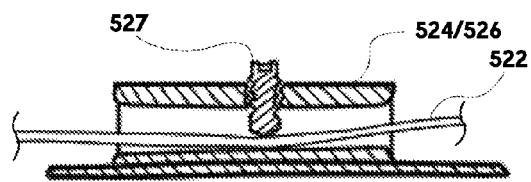

FIG. 5G illustrates another embodiment of a lacing system 520 that is capable of remaining tensioned upon failure or breakage of the lacing system's lace. Lacing system 520 includes a first lace 522 that is coupled with a reel assembly at a proximal end and that is terminated or fixedly coupled with a guide 526 at a distal end. Lacing system 520 also includes a second lace 523 that is coupled with the reel assembly at a proximal end and that is terminated or fixedly coupled with a guide 524 and a distal end. Upon failure of one of the laces, such as the breakage 528 of the first lace 522, the other lace (e.g., lace 523) remains coupled with the reel assembly and fixedly coupled with the respective guide (e.g., guide 524). In this manner approximately ½ of the lacing system's lace remains tensioned about the shoe and tensionable via the reel assembly. The distal end of the first and/or second lace, 522 and 523, may be terminated or fixedly coupled with the respective guides by using guides that are specifically designed to terminate or fixedly couple with lace. In other embodiments, a knot may be tied in the lace, or the system may employ barrel clasps, threading clasps, clamshell snap clasps, cam locks, screen locks, and/or any other mechanical or other fasteners known in the art.

Figure 6A:
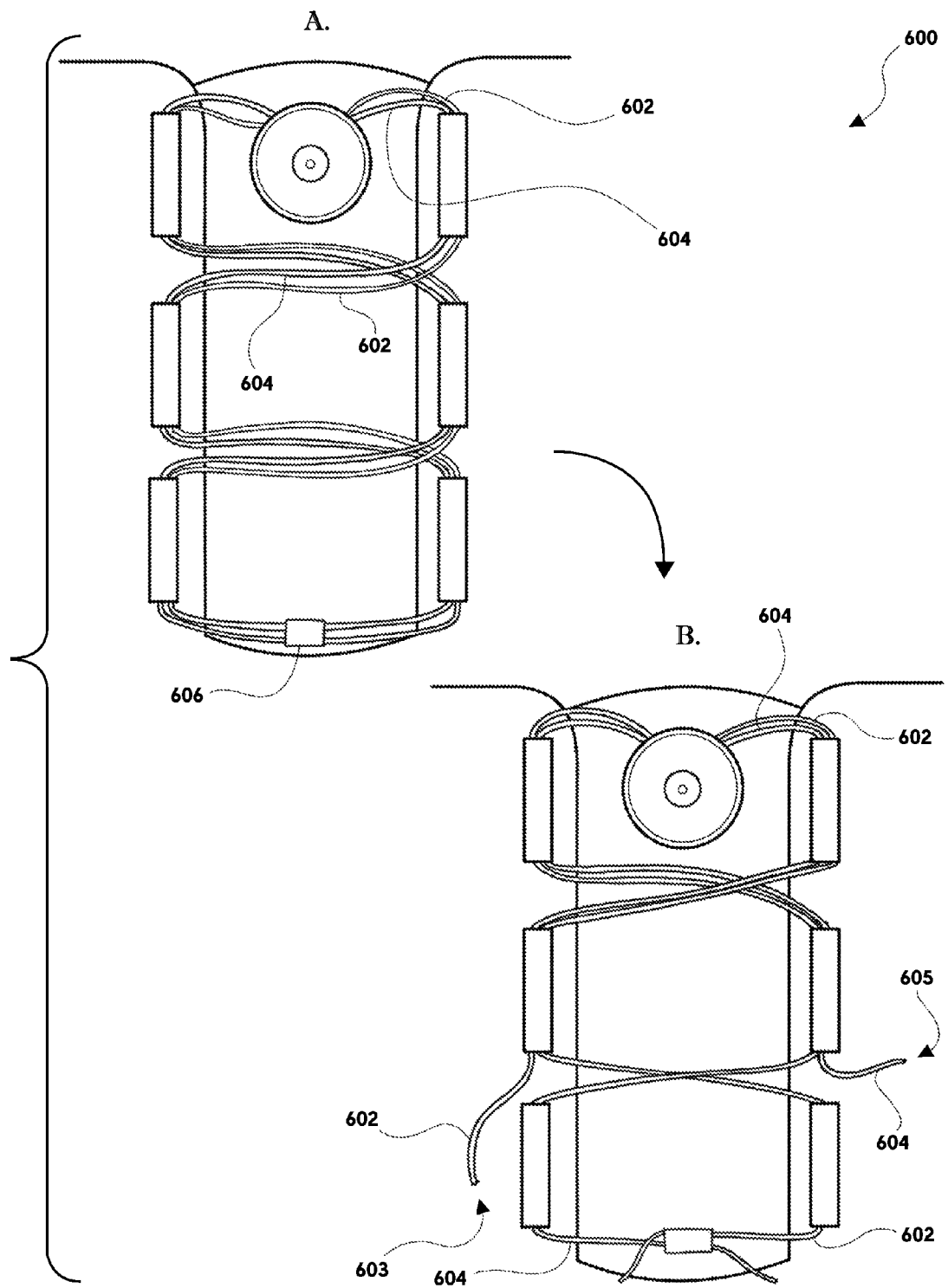

FIG. 6A illustrates another embodiment of a lacing system 600 in which failure proofing redundancy is built into the lacing system 600. For example, lacing system 600 includes a first lace 602 and a second lace 604, which both couple with a reel assembly and which wind around a plurality of lace guides along a lace path. A stop member 606 is coupled with both the first lace 602 and the second lace 604 at a distal end of the lace path and between two lace guides. The use of stop member 606 and two laces, 602 and 604, allows the lacing system to withstand at least one lace failure, and commonly two lace failures, before the stop member 606 will be pulled into contact with one of the lace guides.

For example, if the first lace 602 experiences a first failure or breakage, the stop member 606 will remain in position relative to the shoe and the fit or tightness of the shoe will remain relatively unchanged due to the use of the second lace 604, which is wound around the same lace path as the first lace 602. One half of the first lace 602 will also remain under tension due to the use of stop member 606. If the first lace 602 experiences a second failure or breakage in the portion of the first lace 602 that remains tensioned, the second lace 604 will again cause the stop member 606 to remain in position relative to the shoe and substantially maintain the fit or tightness of the shoe. In such a scenario, the stop member 606 will only be pulled into contact with a lace guide upon a failure of the second lace 604. The portion of the second lace 604 that remains under tension could then be further tensioned via the reel assembly as desired. An additional failure of the second lace 604 would result in a total or catastrophic failure of the lacing system 600's lace.

In another scenario, the first lace 602 and the second lace 604 may each fail at least one time before the stop member 606 is pulled into contact with the lace guide. For example, if the first lace 602 fails on a first side 603 of the stop member 606 and the second lace 604 fails on a second side 605 of the stop member 606 that is opposite the first side 603, the stop member 606 will remain in position relative to the shoe and the fit or tightness of the shoe will remain substantially unaffected because the stop member 606 remains coupled with the second lace 604 on the first side 603 and with the first lace 602 on the second side 605. An additional failure of either lace, 602 and 604, would result in the stop member 606 being pulled into contact with the lace guide as described above.

In a scenario where the first lace 602 and the second lace 604 both fail on the same side of stop member 606 (e.g., side 603 or 605), the stop member 606 would be pulled into contact with lace guide.

Lacing system 600 may be preferred in some instances, such as when maintaining a fit or tightness of the shoe is critical upon a failure of the lace. Lacing system 600 may also be preferred because the lace path is preserved and may be used to tighten the shoe upon failure of one of the laces of lacing system 600. Stated differently, in lacing system 600, a failure of the lace does not result in only half of the lace being usable to tension or tighten a shoe.

Figure 6B:
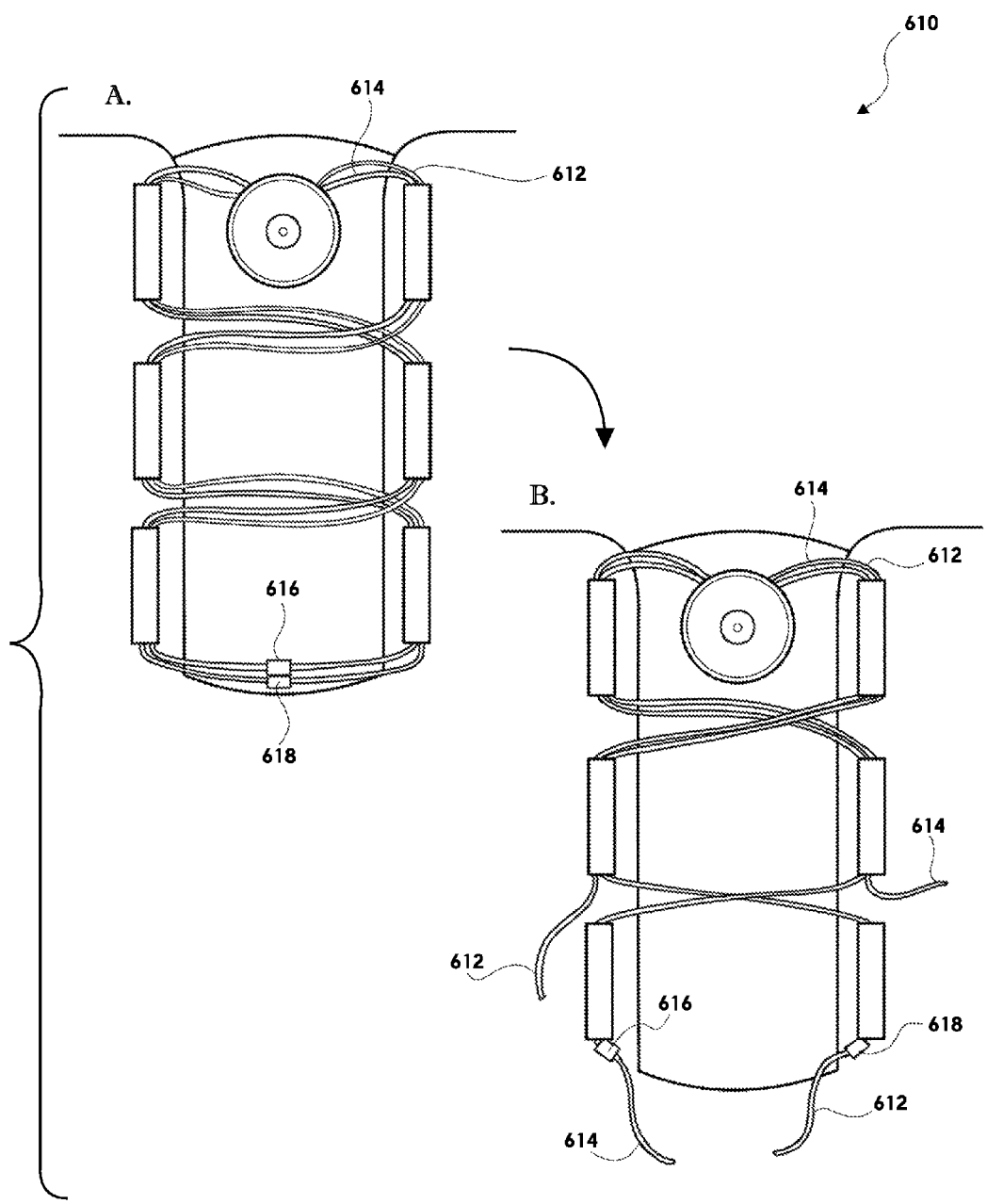

FIG. 6B illustrates a lacing system 610 that is similar to lacing system 600 in that lacing system 610 includes a first lace 612 and a second lace 614. Lacing system 610 is slightly different in that a first stop member 618 is coupled with the first lace 612 and a second stop member 616 is coupled with the second lace 614. Upon failure of either the first lace 612 or second lace 614, the other lace maintains the fit or tightness of the shoe as described above. In a scenario where the first lace 612 and the second lace 614 both fail, the first stop guide 618 and second stop guide 616 will be pulled against one of the lace guides as shown. In instances where the first lace 612 and second lace 614 fail on opposite sides of the lace path, the first stop member 618 and second stop member 616 will be pulled into engagement with opposite lace guides such that the lace path of lacing system 610 remains relatively unchanged and the reel assembly may be used to tension the first and second lace, 612 and 614, and tighten the shoe. Similar to some of the other embodiments described herein, lacing system 610 requires at least 4 lace failures before the lacing system 610 experiences a total or catastrophic failure.

Figure 6C:
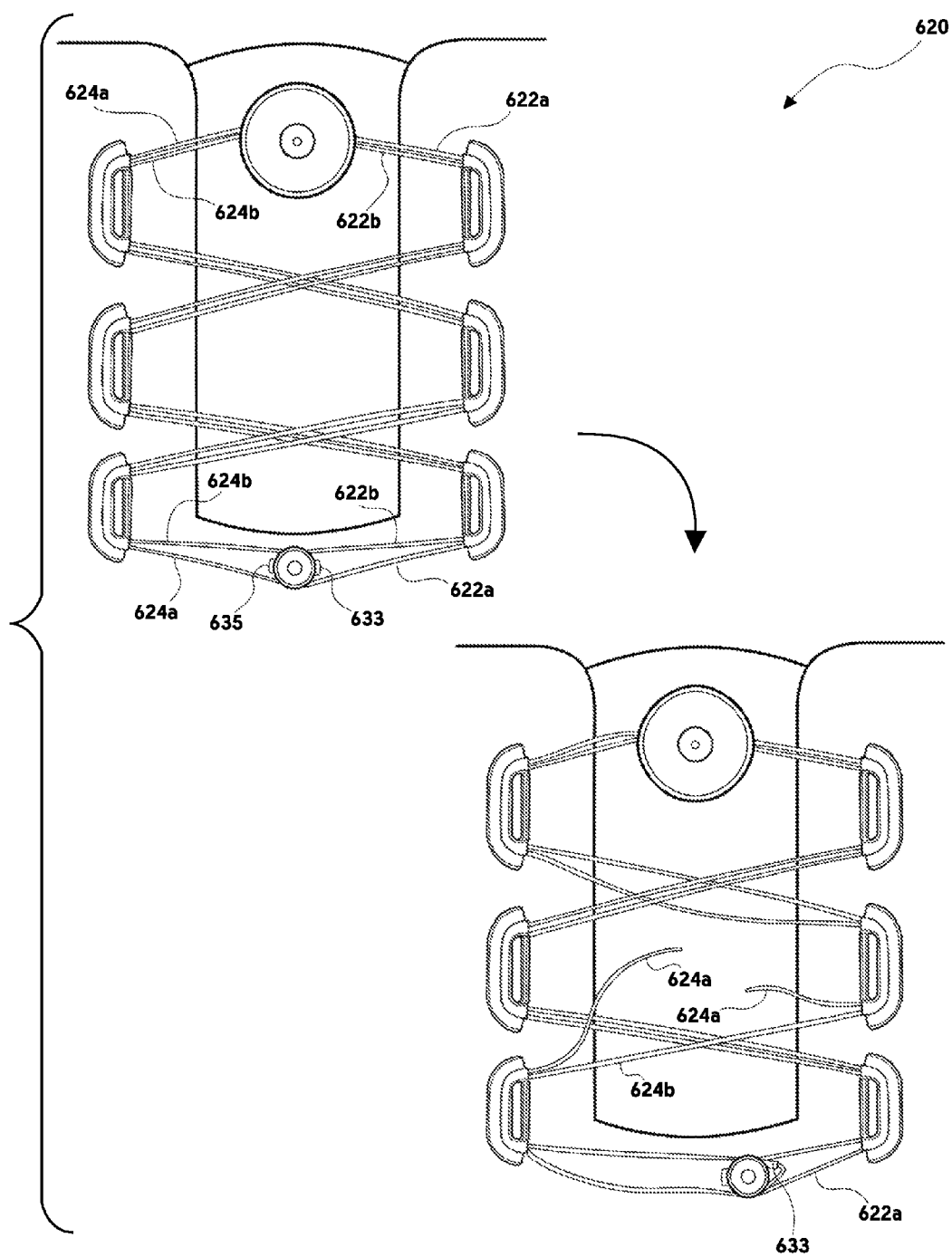

FIG. 6C illustrates an embodiment of a lacing system 620 that includes a first lace 622 and a second lace 624 that are coupled with a load balancing component 630. As shown, the first lace 622 is wound around a first pulley 634 of component 630 while the second lace 624 is wound around a second pulley 632 of component 630. A stop member, 635 and 633, is coupled with the first lace 622 and second lace 624 respectively. Upon failure of one of the laces, the stop member pivots around the pulley and into engagement with a stop pin, which arrests or prevents further slippage of the lace. For example, FIG. 6C illustrates a failure of the second lace 624 and the second stop member 633 pulled into engagement with stop pin 637. The stop member 633 is pulled into engagement with the stop pin 637 by positioning the lace between the pulley 632 and the stop pin 637. The load-balancing component 630 is able to shift or move laterally between opposing lace guides in order to balance a tension in the first lace 622 and the second lace 624 and on opposing sides of the lace path. In some embodiments, component 630 may be slidably coupled with a stop 636 in order to allow the component 630 to balance the lace tension load. Upon a second failure of one of the laces, component 630 may be forced into engagement with the stop 636 and/or one of the lace guides to prevent further slippage of the remaining lace. As with some of the previous embodiments, lacing system 620 requires 4 lace failures before a total or catastrophic failure is experienced.

Figure 6D:
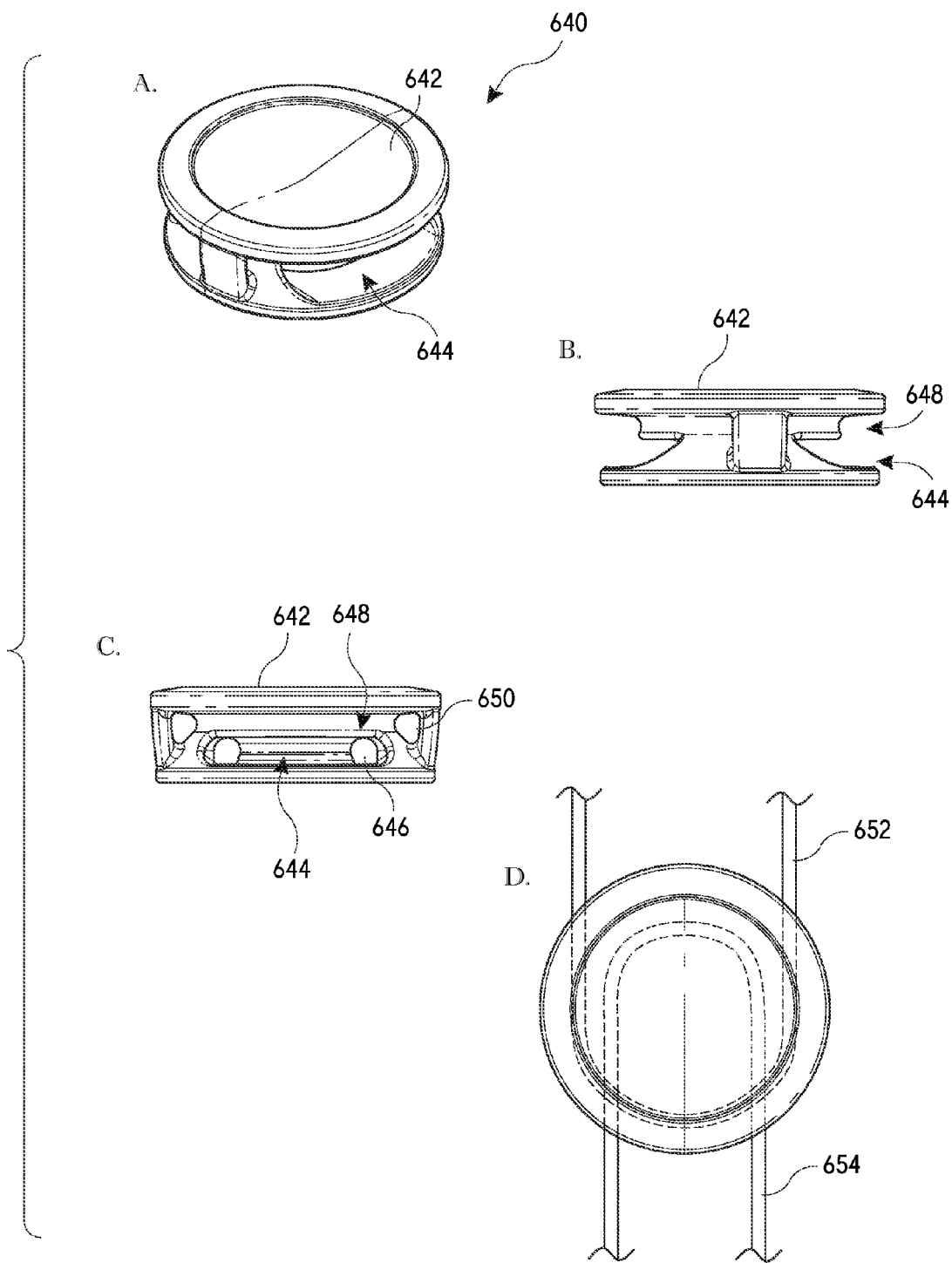

FIG. 6D illustrates an embodiment of a lace tension balancing component 640. The lace tension balancing component 640 includes a main body 642 having a first lower channel 644 within which a first lace 654 is positioned and a second upper channel 648 within which a second lace 652 is positioned. The first channel 644 includes a pair of lower lace ports 646 and the upper lace channel 648 similarly includes a pair of upper lace ports 650. The lower and upper lace ports, 646 and 650, are sized smaller than a stop component, such as stop component 520, so that upon breakage of the lace, the stop component or lace engages with the upper and/or lower lace ports, 646 and 650, and is not able to be pulled through the upper and/or lower lace ports, 646 and 650. The lace tension balancing component 640 may shift about the article or shoe to balance the lace tension in the first and second laces 652 and 654.

Figure 7A:
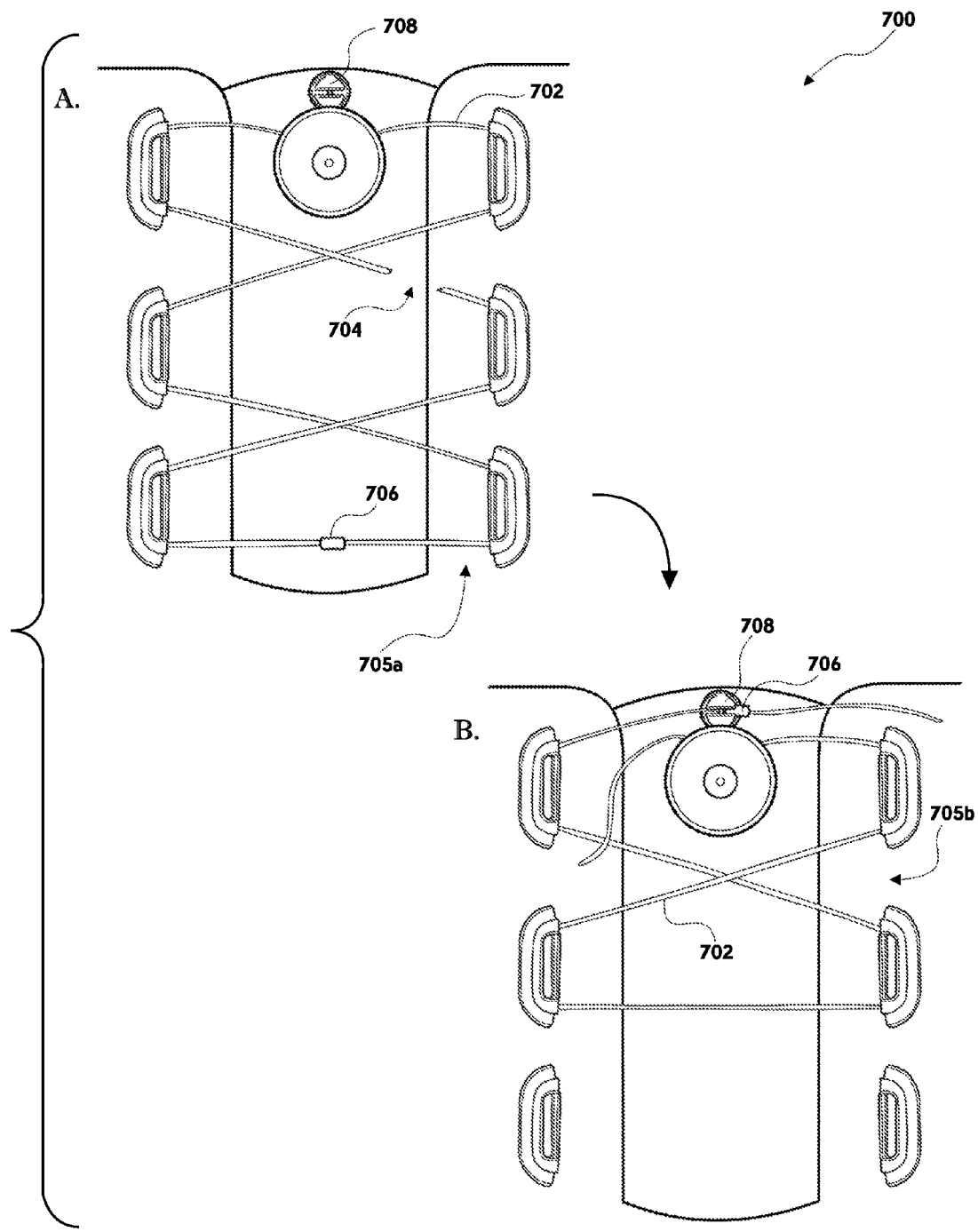
Figure 7B:
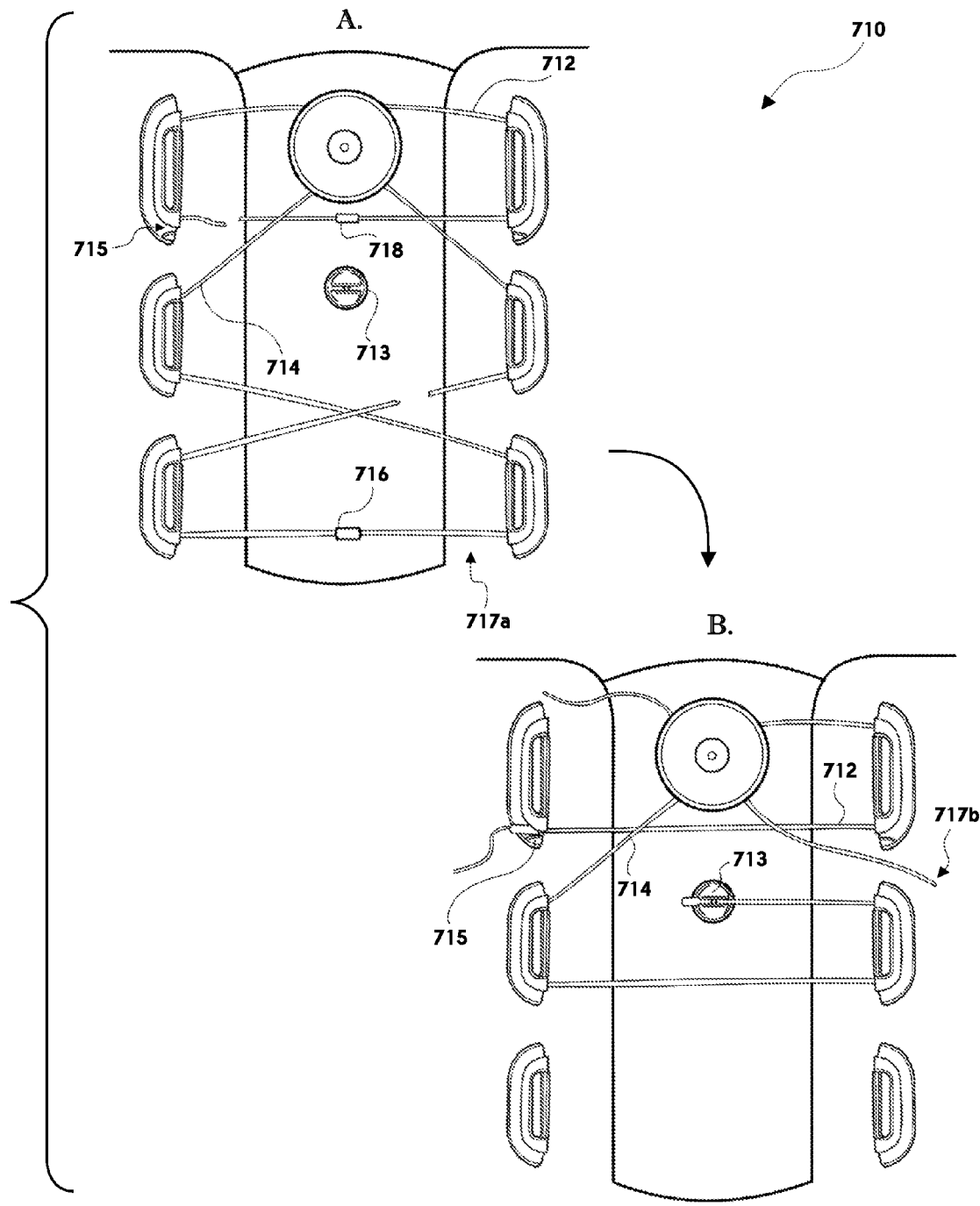

FIGS. 7A and 7B illustrate embodiments in which an additional lace path may be created upon failure or breakage of the lace. For example, FIG. 7A illustrates a lacing system 700 that includes lace 702 and a stop member 706 as previously described. The lace 702 may be initially wound around a plurality of guides to create a first lace path 705a. For example, FIG. 7A illustrates the lace 702 wrapped around six guides in the first lace path 705a configuration. At least some of the guides, and in some instances all of the guides, are preferably "open back" guides, or in other words, guides having an open channel within which the lace 702 may be positioned. The use of open back guides may be preferred because such guides allow the lace 702 to be easily removed or uncoupled from the guide since the guide does not include a rear wall that encloses the lace 702 within the guide.

Lacing system 700 also includes a coupling component 708 that is positioned adjacent the reel assembly. Upon breakage 704 of the lace 702, the lace 702 may be rerouted and rewound around the lace guides and coupled with coupling component 708 to create a second lace path 705b. The coupling component 708 may include a channel that is sized to allow the lace 702 to be inserted within the channel while preventing the stop member 706 from being pulled through the channel.

Although the second lace path 705b is smaller than the first lace path 705a, the creation of the second lace path 705b may be preferred to the previous embodiments since the second lace path 705b crisscrosses and distribute a load relatively equally on opposite sides of the shoe's tongue. The previous embodiments in which only one half of the lace is used to tension the shoe may result in slightly uneven tensioning or loading of one side of the shoe.

FIG. 7B illustrates another embodiment in which an alternate lace path may be created. The lacing system 710 of FIG. 7B includes a first lace 712 and a second lace 714 that have an initial or first lace path configuration 717a. A first stop member 718 is coupled with the first lace 712 and a second stop member 716 is coupled with the second lace 714. Lacing system 710 includes a first coupling component 713 that may be similar to the coupling component 708 of FIG. 7A. Lacing system 710 also includes a second coupling component 715, which may be a component or feature of one or more of the lacing guides. For example, the second coupling component 715 may be a protrusion or boss of a lace guide.

Upon failure or breakage of the first lace 712, the first lace 712 may be positioned between the second coupling component 715 (e.g., a protrusion/boss of the lace guide) and a channel of the lace guide such that tensioning of the first lace 712 causes the first stop member 718 to engage with the second coupling component 715 and the lace guide and thereby prevent further movement or slippage of the first lace 712. Similarly, upon breakage or failure of the second lace 714, the second lace 714 may be rerouted or rewound around one or more lace guides and coupled with the first coupling component 713 to prevent further movement or slippage of the second lace 714. In this manner, alternate lace paths 717b may be created upon failure or breakage of one of the laces. In some embodiments, either or both the first coupling component 713 or the second coupling component 715 may be positioned above the reel assembly, as in FIG. 7A.

As described previously, in some instances it may be beneficial to provide a reel assembly that is relatively quiet in operation. Such reel assemblies may allow for the lacing system's lace to be tensioned without essentially producing audible noise that is detectable by a human, or while minimizing the amount of audible noise that is produced. The description of nondetectable/undetectable audible noise as used herein refers to any noise level below those outlined in MIL-STD-1474D, Req. 2, pgs. 20-32, the entire disclosure of which is incorporated by reference herein. This document provides design criteria standards issued by the U.S. Department of Defense. The embodiments described hereinbelow are devices that are capable of meeting and exceeding the noise level standards provided in the above incorporated document.

It may also be desirable for the reel assembly to be designed to have safeguards against opening. For example, the reel assembly may involve a relatively complex operation to be opened and/or involve the use of two hands. Such a design may prevent the reel assembly from opening on its own or by accident. For example, when a user is rock climbing and needs a shoe to remain tensioned about the foot, the safeguards described herein may prevent the reel assembly from opening upon brushing against or hitting a rock or other object. In another embodiment, the safeguards may prevent the reel assembly from opening as a soldier is fleeing a dangerous situation, which opening of the reel assembly and loosening of the footwear may otherwise jeopardize the soldier's life.

Figure 8A:
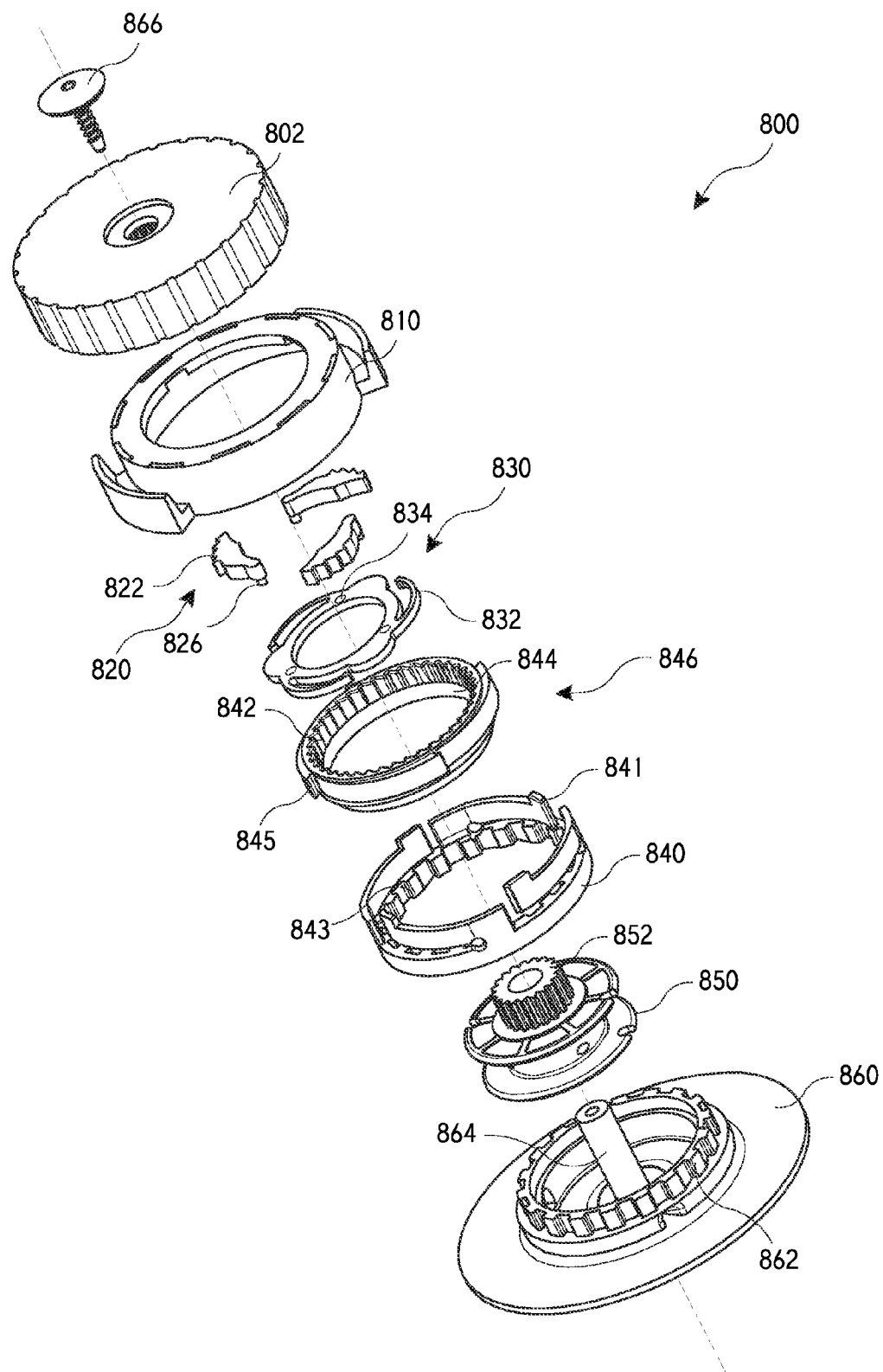
FIGS. 8A-F illustrate an embodiment of a reel assembly that may be used to close and/or tighten an article.
Figure 8B:
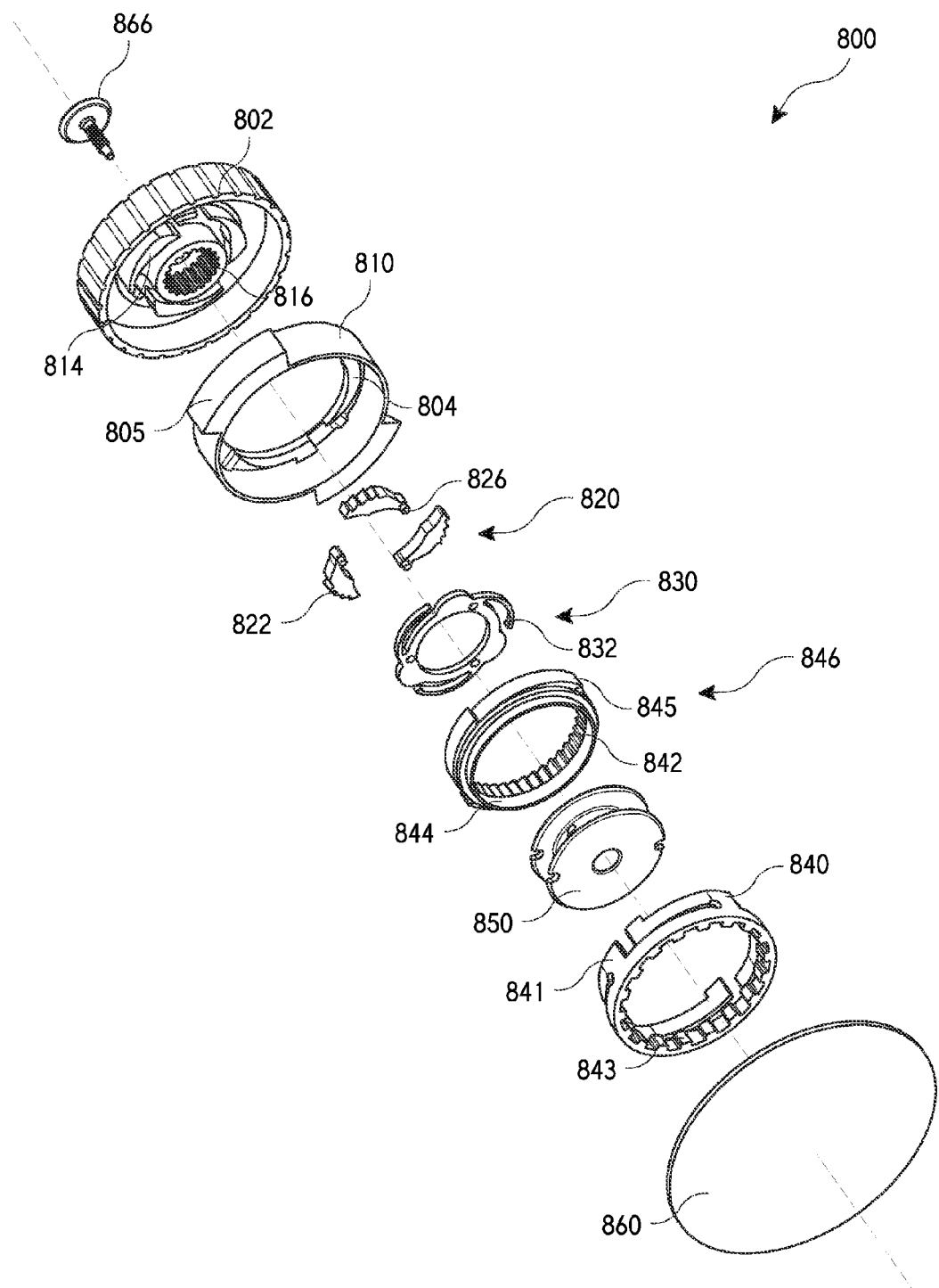

Referring now to FIGS. 8A-F, illustrated is an embodiment of a reel assembly 800 that is relatively quiet in operation and that provides safeguards against accidental opening. As shown in FIGS. 8A and 8B, reel assembly 800 includes a lower knob 810 and an upper knob 802. Upper knob 802 may be grasped by a user to tension lace (not shown) and thereby tighten a shoe. Reel assembly 800 includes a housing 840 that houses or contains the components of reel assembly 800. Lower knob 810 is configured so that its outer surface is positioned over and around the outer surface of housing 840.

Positioned within housing 840 is a spool 850 around which the lace is wound as the upper knob 802 is rotated by a user. Spool 850 includes a central boss 852 that is key or configured to be inserted within an aperture of boss 816 of upper knob 802. The keyed boss 852 allows the spool 850 to rotate as the upper knob 802 is rotated by a user so as to wind the lace around the spool 850. A friction component 830 is also positioned within housing 840. Friction component 830 includes a plurality of cantilevered arms 832 that engage and interact with an inner surface 844 of rotation control component 846. The cantilevered arms 832 slide along the inner surface 844 of the rotation control component 846 as the upper knob 802 is rotated in the tightening direction (e.g., clockwise). Friction component 830 includes a plurality of apertures 834 that couple with a plurality of pawls or pawl arms 820. Specifically, axially downward extending protrusions or bosses 826 of the pawls 820 are inserted within the apertures 834 of friction component 830.

The pawls 820 are positioned between the friction component 830 and a bottom surface of the lower knob 810. Each pawl 820 includes a cantilevered arm having a plurality of pawl teeth 822 positioned at a distal end thereof. The pawl teeth 822 lockingly engage with a set of teeth 842 of the rotation control component 846 to prevent counter rotation of the spool 850 and thereby prevent loosening of the lacing system's lace. As shown in FIGS. 8A and 8B, reel assembly 800 includes a plurality of separate and distinct pawls 820, although in other embodiments each pawl 820 may be coupled at a proximal end with a central ring so that the pawls are all attached or coupled together.

As shown in FIG. 8B, the bottom surface of the upper knob 802 includes a plurality of sweeper arms 814 that are used to disengage the pawl teeth 822 from the set of teeth 842 of rotation control component 846. As described in more detail below, disengagement of the pawl teeth 822 from the set of teeth 842 allows the reel assembly 800 to be operated without producing an audible noise that is detectable by a human. As also shown in FIG. 8B, the bottom surface of the lower knob 810 includes a plurality of ramped or cam surfaces 804 that interface with cantilevered arms 841 of the housing 840 to position the reel assembly in an "open" configuration, in which the lace may be easily and fully loosened. Rotation of the lower knob 810 in a loosening direction (e.g., counterclockwise) causes the cantilevered arms 841 of the housing to slide along the cam surfaces 804, which pushes the cantilevered arms radially outward and out of engagement with circumferentially positioned stop components 845 of the rotation control component 846. The cantilevered arms 841 of housing 840 and the stop components 845 of rotation control component 846 engage to hold or lock the reel assembly in position and prevent rotation of the spool 850 in the loosening direction. Disengagement of these components allows the rotation control component 846 and spool 850 to freely rotate within the housing 840 to unwind the lace from the spool.

The housing 840 is fixedly coupled with a base member 860 via engagement of spline teeth, 843 and 862. Engagement of the spline teeth, 843 and 862, prevent rotation of the housing 840 with respect to the base member 860. Engagement of the spline teeth, 843 and 862, further prevents rotation of the rotation control component 846 and spool 850 when the cantilevered arms 841 are engaged with the stop components 845. A fastening component 866 is coupled with a central boss 864 to couple the reel assembly 800 together.

Figure 8C:
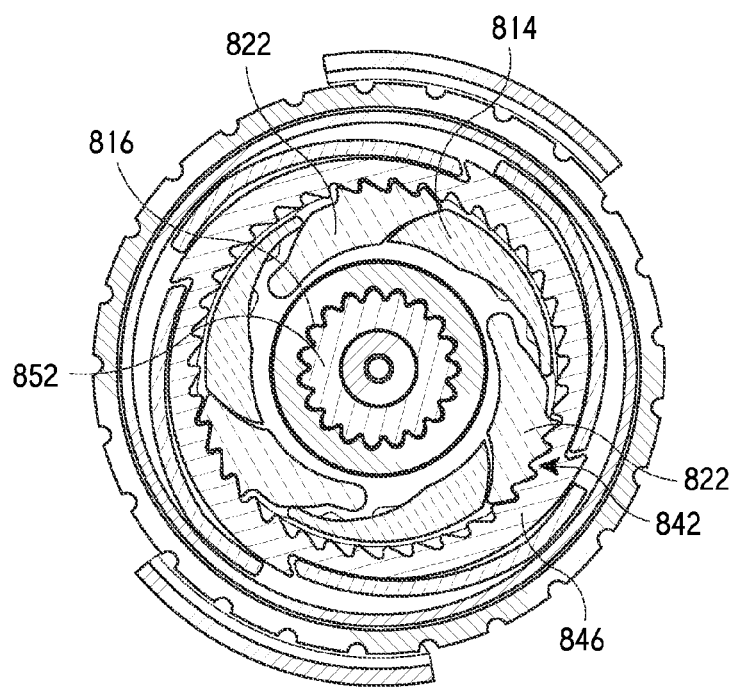

FIGS. 8C-F illustrate an operation of reel assembly 800. As shown in FIG. 8C, in a locked configuration, the pawl teeth 822 are engaged and locked with the set of teeth 842 of rotation control component 846. The engagement of the pawl teeth 822 with the set of teeth 842 prevents counter rotation of the spool 850 by preventing the upper knob 802 from being counter rotated. Counter rotation of the upper knob 802 is prevented by engagement of a distal end of the sweeper arms 814 and a proximal end of each pawl 822 as shown. As shown, the distal end of the sweeper arms 814 may correspond with the proximal end of the pawl 822 to facilitate engagement of the two components. The keyed configuration of the boss 852 and aperture of boss 816 prevent counter rotation of the spool 850.

As further shown in FIG. 8C, the distal end or surface of the sweeper arms 814 may be angled so that as the sweeper arms 814 engages with the front surface of the pawl teeth 822 (e.g., via counter rotation of the upper knob 802 and/or lace tension), the pawl teeth 822 are forced into engagement with the set of teeth 842 of rotation control component 846. At relatively high lace tension levels, counter rotation of the upper knob 802 may automatically occur as lace tension causes the spool 850 to counter rotate and a rotational force is transferred to the knob 810 via the keyed boss 852 and boss 816 aperture. At relatively low lace tension levels, counter rotation of the upper knob 802 may occur via the user.

Figure 8D:
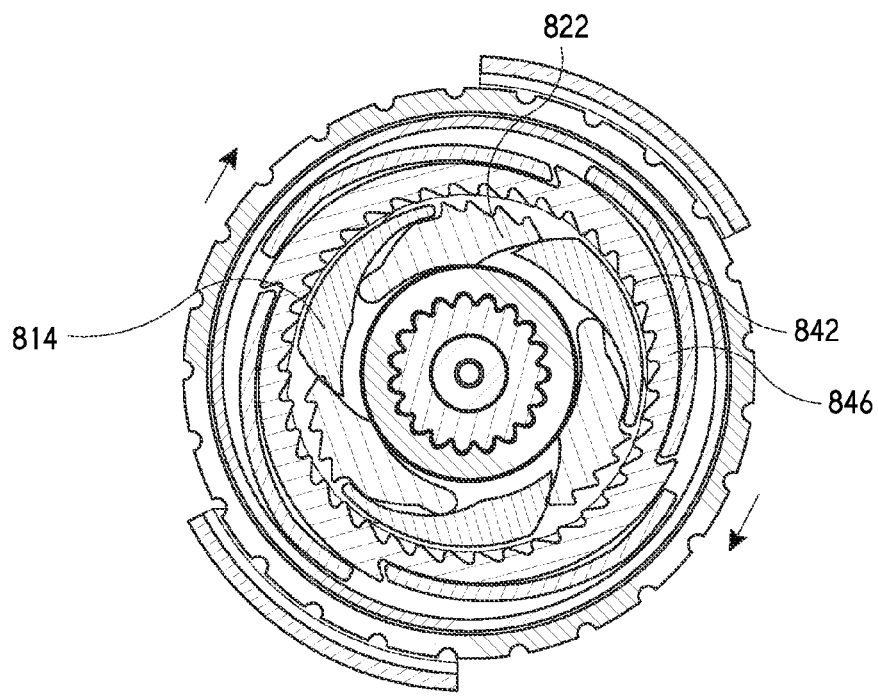

As shown in FIG. 8D, rotation of the upper knob 802 in a tightening direction (e.g., clockwise) causes the sweeper arms 814 to rotate relative to the pawl teeth 822. At some point the sweeper arms 814 will engage with the pawl teeth 822 and pivot the pawl teeth 822 out of engagement with the set of teeth 842 of rotation control component 846. Because the pawls 822 are separate components or pieces, as the pawl teeth 822 are pivoted out of engagement with the set of teeth 842 via the sweeper arms 814, each pawl 820 may pivot slightly so that the proximal surface or end of the pawl teeth 822 pivots into contact with the distal end or surface of the sweeper arms 814. Subsequent rotation in the opposite direction, via user interaction or lace tension, causes the distal end of the sweeper arms 814 to reengage the pawl teeth 822 with the teeth 842 of rotation control component 846. Because the pawl teeth 822 are disengaged from the set of teeth 842 during rotation of the spool 850, an audible clicking noise is not produced by the pawl teeth 822 skipping over or otherwise contacting the set of teeth 842.

Figure 8E:
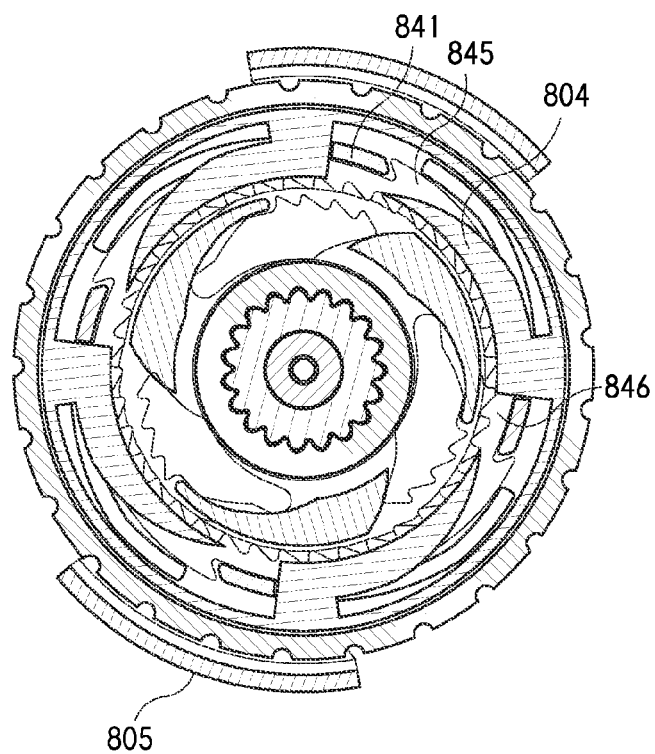
Figure 8F:
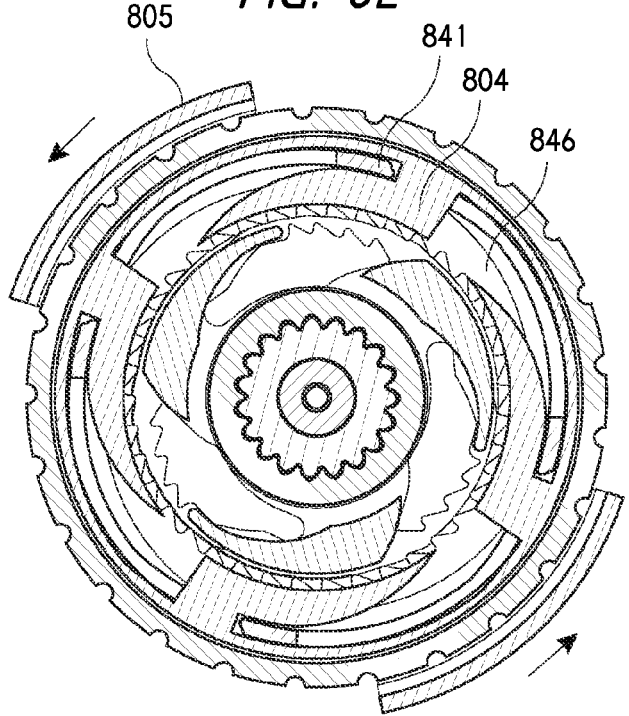

FIGS. 8E and 8F illustrate the lower knob 810 being used to position the reel assembly in an open or unlocked configuration in which the spool 850 is able to rotate freely in the second or loosening direction and thereby loosen lace tension by unwinding the lace from about the spool 850. Specifically, FIG. 8E illustrates the cantilevered arm of 841 of housing 840 engaged with the stop component 845 of rotation control component 846. In this configuration, the spool 850 is locked relative to the housing 840 and base member 860 and prevented from rotating in the second direction. FIG. 8F illustrates the lower knob 810 being rotated in the second direction via grip members 805 to engage an axially upward extending member at a distal end of the cantilevered arms 841 with the cam surfaces 804 of lower knob 810. As the cam surfaces 804 rotate relative to the housing 840, the cantilevered arms 841 are pushed radially outward and disengaged from the stop component 845 of rotation control component 846, which allows the rotation control component 846, spool 850, pawls 822, friction component 830, and upper knob 802 to freely rotate relative to housing 840 and base member 860.

Figure 9A:
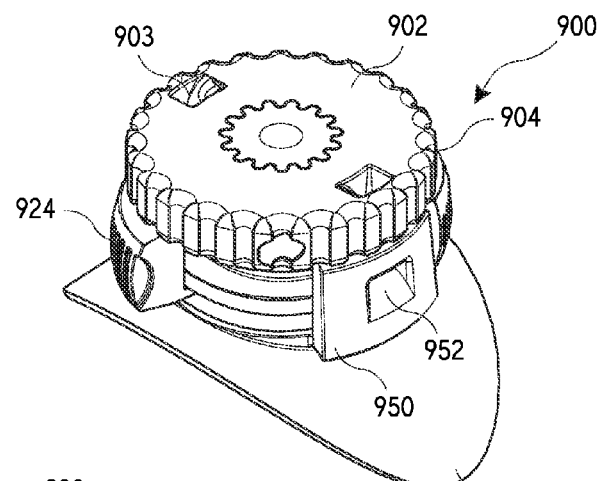
FIGS. 9A-L illustrate another embodiment of a reel assembly that may be used to close and/or tighten an article.
Figure 9B:
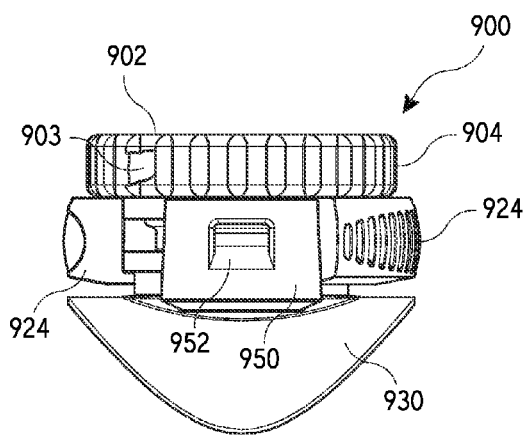
Figure 9C:
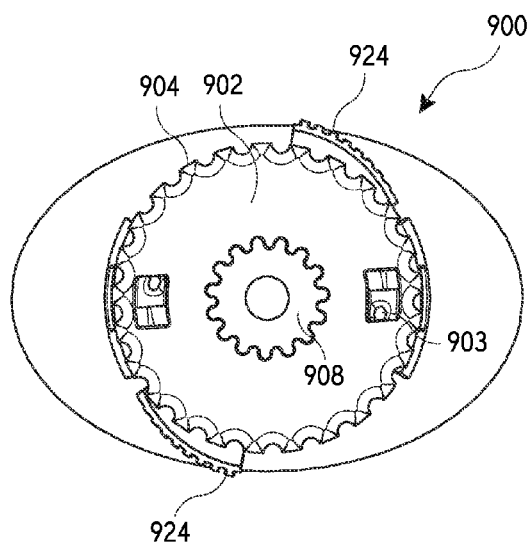
Figure 9D:
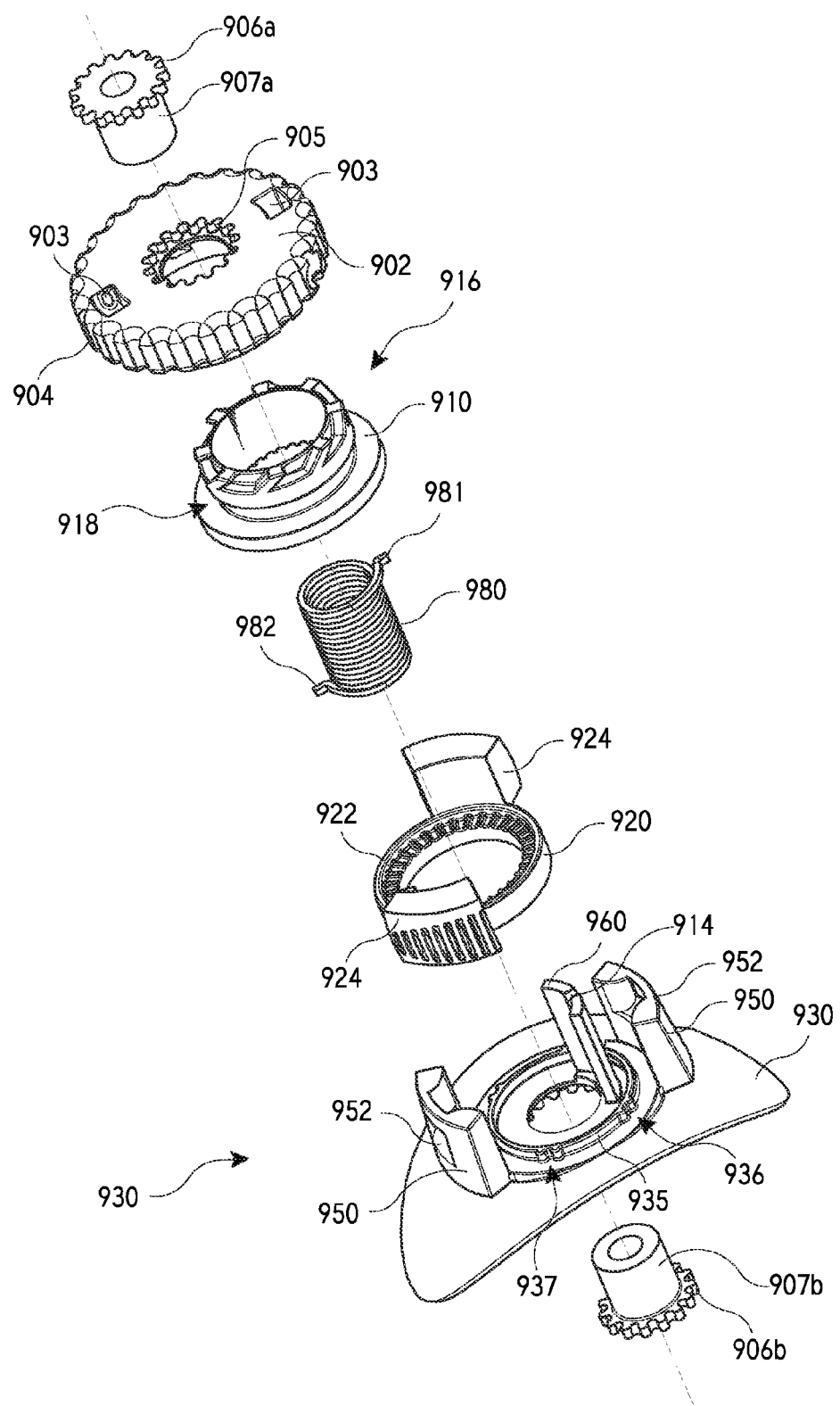

Referring now to FIGS. 9A-9L, illustrated is another embodiment of a reel assembly 900 that is relatively quiet in operation and that provide safeguards against accidental opening. FIGS. 9A-C illustrate assembled configurations of reel assembly 900 while FIGS. 9C and 9D illustrate exploded views of the reel assembly 900. FIGS. 9F-L illustrate various cross-section and detailed views of the reel assembly 900. As shown in FIGS. 9A-E, reel assembly 900 includes a knob 902 having a grip surface 904 that may be grasped and rotated by a user to tension and loosen lace (not shown). A loading holding mechanism 908 is positioned within and/or coaxially aligned with an aperture 905 of knob 902. In the illustrated embodiment, the load holding mechanism 908 is a spline drive having a first friction element 907 including a first hub 907a and a second hub 907b. The first and second hubs, 907a and 907b, each include spline teeth, 906a and 906b, that engage with corresponding spline teeth of the knob (i.e., spline teeth 905) and a housing (i.e., spline teeth 932). Each hub, 907a and 907b, includes a protrusion that extends axially from the respective spline teeth, 906a and 906b. The central protrusion of each hub, 907a and 907b, extends toward the center of the reel assembly 900 with the opposing ends of the hubs, 907a and 907b, often contacting one another.

A spool component 910 is positioned axially below the knob 902 and coupled therewith via a clutch mechanism. In some embodiments the clutch mechanism may include axially oriented teeth 916 of the spool 910 that engage with corresponding axially oriented teeth 901 of knob 902. Engagement of the axially oriented teeth, 916 and 901, transfer torque or rotational forces from the knob 902 to the spool 910 to enable a user to rotate the knob 902 and thereby wind a lace (not shown) around an annular channel or central post 918 of the spool 910. In some embodiments, the clutch mechanism between the knob 902 and spool 910 (e.g., teeth 916 and 901) may be disengaged to allow the spool 910 to freely rotate relative to the knob 902 and/or within the reel assembly's housing 950 and thereby unwind the lace from about the spool's central post or annular channel 918. Disengagement of the clutch mechanism may be achieved by pulling axially upward on the knob 902, by counter-rotating the knob 902 (i.e., rotating the knob in a loosening direction), or by operating or pressing a button component, lever mechanism, or other release mechanism.

A spool component 910 is positioned axially below the knob 902 and coupled therewith via a clutch mechanism. In some embodiments the clutch mechanism may include axially oriented teeth 916 of the spool 910 that engage with corresponding axially oriented teeth 901 of knob 902. Engagement of the axially oriented teeth, 916 and 901, transfer torque or rotational forces from the knob 902 to the spool 910 to enable a user to rotate the knob 902 and thereby wind a lace (not shown) around an annular channel or central post 918 of the spool 910. In some embodiments, the clutch mechanism between the knob 902 and spool 910 (e.g., teeth 916 and 901) may be disengaged to allow the spool 910 to freely rotate relative to the knob 902 and/or within the reel assembly's housing 950 and thereby unwind the lace from about the spool's central post or annular channel 918. Disengagement of the clutch mechanism may be achieved by pulling axially upward on the knob 902, by counter-rotating the knob 902 (i.e., rotating the knob in a loosening direction), or by operating or pressing a button component, lever mechanism, or other release mechanism.

Reel assembly 900 also includes a housing 950 that is positioned axially below the other components of the reel assembly 900. Housing 950 includes a base member or flange 930 (hereinafter flange 930) that is positioned at a bottom end of the housing 950 and extends entirely around an outer periphery of the housing 950, or around a portion thereof. The flange 930 allows the housing 950 to be coupled with an article, such as a shoe, via sewing, adhesive bonding, mechanical fastening, heat welding, RF or sonic welding, and the like. The housing 950 includes an interior region or portion within which the spool 910 and/or other components of the reel assembly 900 are positioned. The spool 910 is positioned within the housing's interior region so as to be able to rotate therein.

As shown in FIGS. 9A and 9B, in some embodiments the walls of the housing 950 do not fully enclose the spool 910 so that a portion of the spool 910 and/or a portion of the lace (not shown) that is wound about the spool is visible to a user. For example, the housing 950 may include a pair of walls that are positioned on opposing sides of the spool 910. In such embodiments, the housing walls may extend from the flange 930 to adjacent a undersurface of the knob 902. In this manner the housing walls 950 may interlock the housing 950 to the spool 910 and knob 902 and thereby support the spool 910 and knob 902 and prevent or limit accidental uncoupling or disassembly of the components due to side impact or other forces. For example, if the knob 902 and/or spool 910 is hit or contacted, the housing walls 950 reinforce the components and prevent uncoupling or breakage of the components.

The bottom surface of the housing 950 further include spline teeth 932 that engage with the spline teeth 906*b* of the second hub 907*b* as previously described. Engagement of the spline teeth 932 of housing 950 and the spline teeth 906*b* of the second hub 907*b* anchors the second hub 907*b* to the housing 950 and any article coupled therewith, and prevents rotation of the second hub 907*b* relative to the housing 950. Because the second hub 907*b* is anchored to the housing 950 and any article coupled therewith, the second hub 907*b* functions as the load holding component of the load holding mechanism 908. In other embodiments, such as the single hub design of FIG. 9S or the outer hub design of FIGS. 9T and 9U, the load holding component could be something other than an inner hub, such as a tang of the spring component or an inner cylindrical wall.

The housing 950 further includes an axially extending inner wall 960 that functions to maintain a spring component 980 in place to allow release of the spring component 980 as described in greater detail below. The inner wall 960 includes a notch 914 within which an upper tang 981 of the spring component is positioned. The housing 950 additionally includes an annular ring 935 that extends axially upward from an upper surface of the flange 930. The annular ring 935 is positioned within an annular channel 927 of a release mechanism 920 to prevent dust and other debris from accessing an inner portion of the reel assembly 900 and thereby degrading or fouling the inner components of the reel assembly. The annular ring 935 includes detent notches, 937 and 936, that engage with a detent 926 of the release mechanism 920 to position the load holding mechanism in an engaged and disengaged state as described in greater detail below.

The release mechanism 920 is positioned axially above the housing 950 and coaxially aligned therewith. The release mechanism 920 is coupled with the housing by positioning the annular channel 927 over the annular ring 935 of the housing 950. When the release mechanism 920 is coupled with the housing 950, the inner wall 960 is positioned radially within a central aperture of the release mechanism 920. The release mechanism 920 is coupled with the housing 950 so as to be rotatable between a first or engaged position and a second or disengaged position as described in greater detail below. A tang engagement feature 928, such as a pair of radially extending protrusions, is positioned on an inner cylindrical wall of the release mechanism 920. The tang engagement feature 928 is designed to engage a bottom tang 982 of the spring component 980 and to rotate the bottom tang 982 between the engaged and disengaged positions.

Figure 9E:
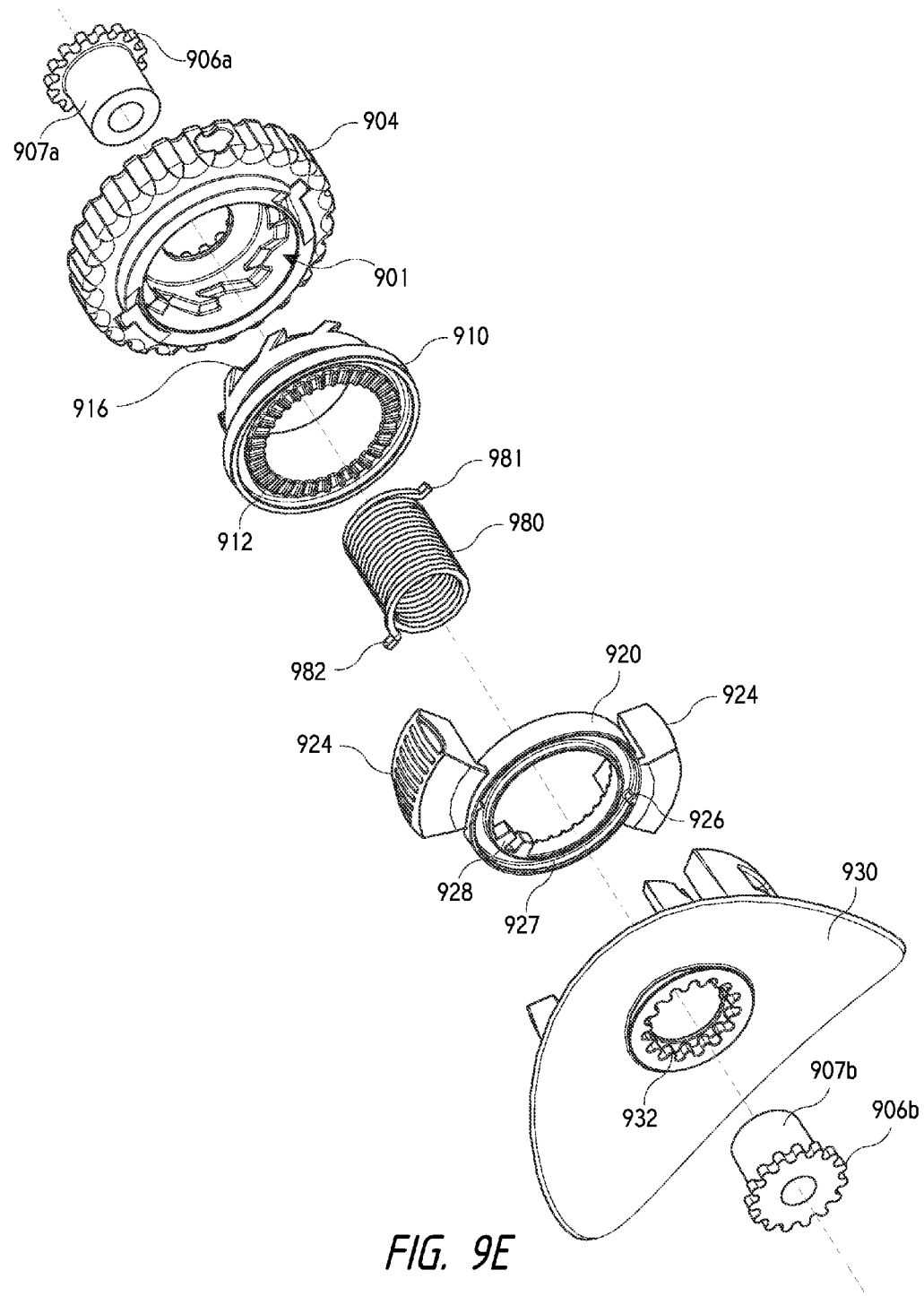

To enable rotation of the release component 920 between the engaged and disengaged positions, the release component 920 includes a pair of grip tabs 924 that may be gripped by a thumb and forefinger of the user to rotate the release mechanism 920 between the engaged and disengaged positions. The release mechanism 920 also includes a clutch mechanism 922 that interfaces with a clutch mechanism 912 of the spool 910. As shown in FIGS. 9D and 9E, in some embodiments the clutch mechanism includes axially oriented teeth 922 positioned on an upper surface of the release mechanism 920 that engage with corresponding axially oriented teeth 912 positioned on a bottom surface of the spool 910. The clutch mechanism of the spool 910 and release mechanism 920 prevent "backwinding" of the lace, which is winding of the lace about the spool's annular channel or central post 918 in an opposite direction of that intended. To prevent backwinding, the clutch mechanisms of the spool 910 and release mechanism 920 may engage only when a tension in the lace decreases or falls below a predetermined or nomical level (e.g., zero lace tension). The spool's teeth 912 may be positioned axially above and disengaged from the release mechanism's teeth 922 when the lace tension is above the predetermined level (e.g., near zero lace tension) to allow the spool 910 to spin freely relative to the release mechanism 920. When the lace tension falls or decreases below the predetermined lace tension, the spool 910 may move axially downward relative to the release mechanism 920 so that the spool's teeth 912 engage with the release mechanism's teeth 922 and thereby prevent rotation of the spool 910 relative to the release mechanism 920 and housing 950. Axially movement of the spool 910 relative to the release mechanism 920 may be achieved via engagement of the spool's upper teeth 916 and the knob's teeth 901. For example, low lace tension level may allow the spool's upper teeth 916 and the knob's teeth 901 to disengage, which allows the spool 910 to move axially downward to engage the clutch mechanism of the spool 910 and release mechanism 920. Rotation of the knob 902 to tension the lace and/or a lace tension above the predetermined level may cause the spool 910 to move axially upward to disengage the clutch mechanism of the spool 910 and release mechanism 920. Additional details of clutch mechanisms that may be used to prevent backwinding are provided in U.S. application Ser. No. 14/328,521, filed Jul. 10, 2014, and titled "Closure Devices Including Incremental Release Mechanisms and Methods Therefor", the entire disclosure of which is incorporated by reference herein.

Reel assembly 900 additionally includes a second friction element or spring component 980 that is coaxially aligned with the housing 950, release mechanism 920, spool 910, knob 902, and load holding mechanism 908 (e.g., first and second hubs, 907a and 907b). The spring component 980 is positioned centrally within the reel assembly 900 and is around the first and second hubs, 907a and 907b. A lower tang 982 of the spring component 980 is positioned within the tang engagement feature 928 of release mechanism 920 while an upper tang 981 of the spring component 980 is positioned within the notch 914 of inner wall 960.

As described in greater detail herein below, the spring component 980 is configured to constrict or open about the first and second hubs, 907a and 907b, to allow the knob 902 and spool 910 to rotate in a first direction to wind the lace about the spool 910 and to prevent the spool 910 and/or knob 902 from rotating in a second direction that allows the lace to be unwound from the spool 910. Specifically, when the knob 902 is rotated in the first or tightening direction (e.g., clockwise), the first hub 907a is rotated in a direction that causes a diameter of the spring component 980 to slightly expand, thereby reducing the frictional engagement of the spring component 980 with the first friction element (i.e., the first and/or second hubs, 907a and 907b). The reduced frictional engagement of the spring component 980 and first hub 907a enables the knob 902, first hub 907a, and spool 910 to rotate in the first or tightening direction. Rotation of the spool 910 in the first or tightening direction causes the lace to wind around the spool's central post or annular channel 918, which tensions the lace and tightens an article, such as a shoe about a user's foot. The reduced frictional engagement of the spring component 980 and first hub 907a unlocks or rotationally decouples the first hub 907a from the second hub 907b, which allows the first hub 907a to rotate relative to the second hub 907b.

When the knob 902 is released, the tension in the lace biases the spool 902 toward rotation in the second or loosening direction (e.g., counterclockwise). Stated differently, because the lace is wound about the spool's central post or annular channel 918, the lace tension induces a torque or moment the effects rotation of the spool 910 in the second or loosening direction. This torque or moment increases the frictional engagement of the spring component 980 and first and/or second hubs, 907a and 907b, by causing the spring component 980 to constrict about the first and/or second hubs, 907a and 907b, which prevents rotation of the spool 910, first hub 907a, and/or knob 902 in the second or loosening direction. The increased frictional engagement of the spring component 980 and first hub 907a also locks or rotationally couples the first hub 907a and the second hub 907b, which prevents the first hub 907a from rotating relative to the second hub 907b. In this manner, the engagement of the spring component 980 and first and second hubs, 907a and 907b, enables a one way rotation of the spool 910 that allows the lace to be tensioned and an article to be tightened.

Although FIGS. 9A-E illustrate the first hub 907a attached to the knob 902 via a spline drive, it should be realized that in other embodiments the first hub 907a may be directly attached to or coupled with the spool 910. In such embodiments, the knob 902 may be rotated in the second or loosening direction without effecting rotation of the spool 910 in said direction.

Figure 9F:
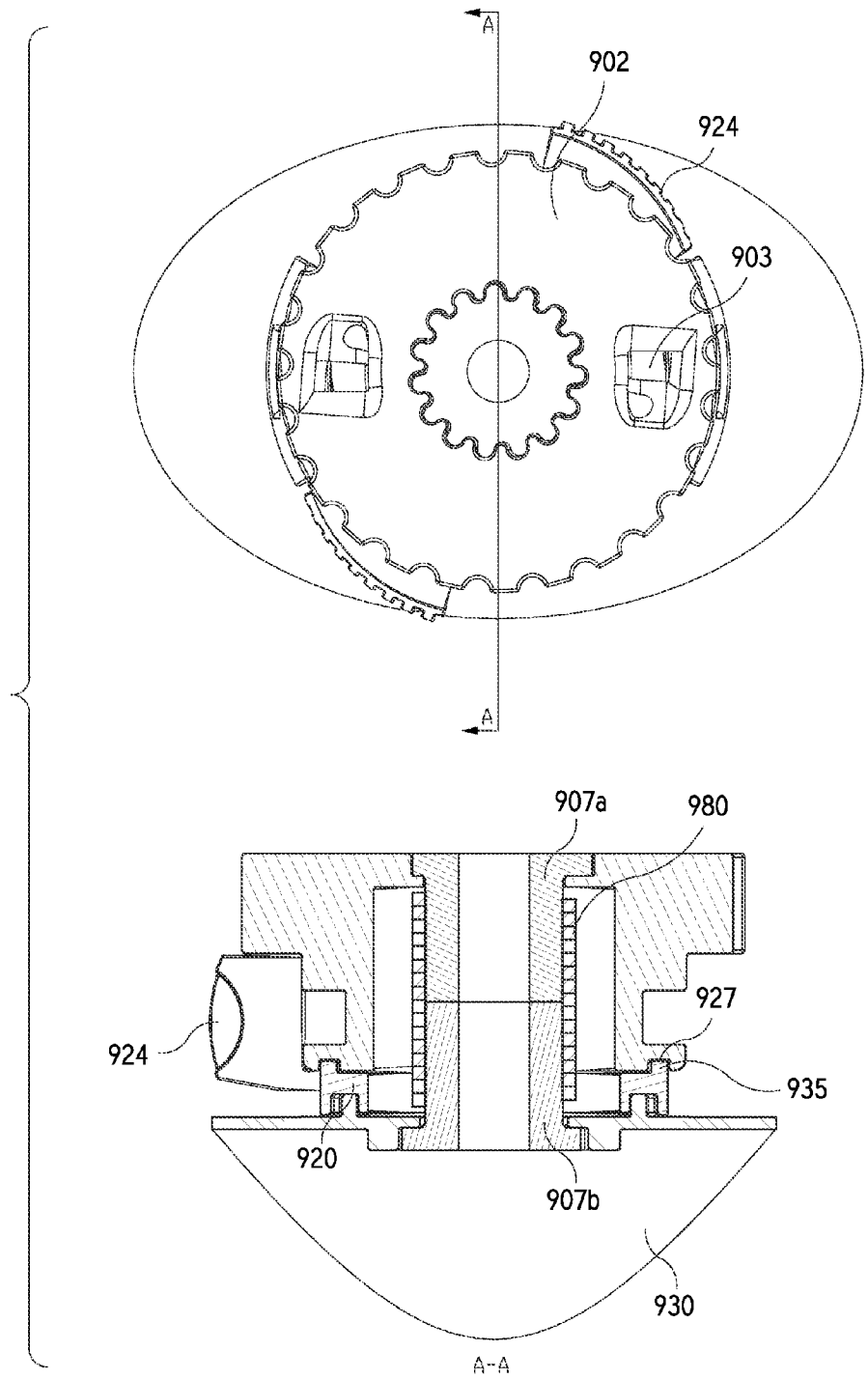

Referring now to FIG. 9F, illustrates is a top view and cross section view of the assembled reel assembly. As shown, the spring component 980 is positioned or wrapped around the first and second hubs, 907a and 907b, and positioned centrally within the assembled reel assembly 900. Frictional contact or engagement between the spring component 980 and the first and second hubs, 907a and 907b, lock the hubs and reel assembly components in position. The release mechanism 920 is coupled with the housing 950 with the annular channel 927 positioned over the annular ring 935. The annular channel 927 and annular ring 935 limit the dust or other debris that may access the interior region of the reel assembly 900, which may degrade or foul the spring component 980, first and second hubs, 907a and 907b, and/or other reel assembly components. FIGS. 9H and 9I illustrate a detailed view of the load holding mechanism 908 with the spring component 980 wrapped around and engaged with the first hub 907a and second hub 907b.

Figure 9G:
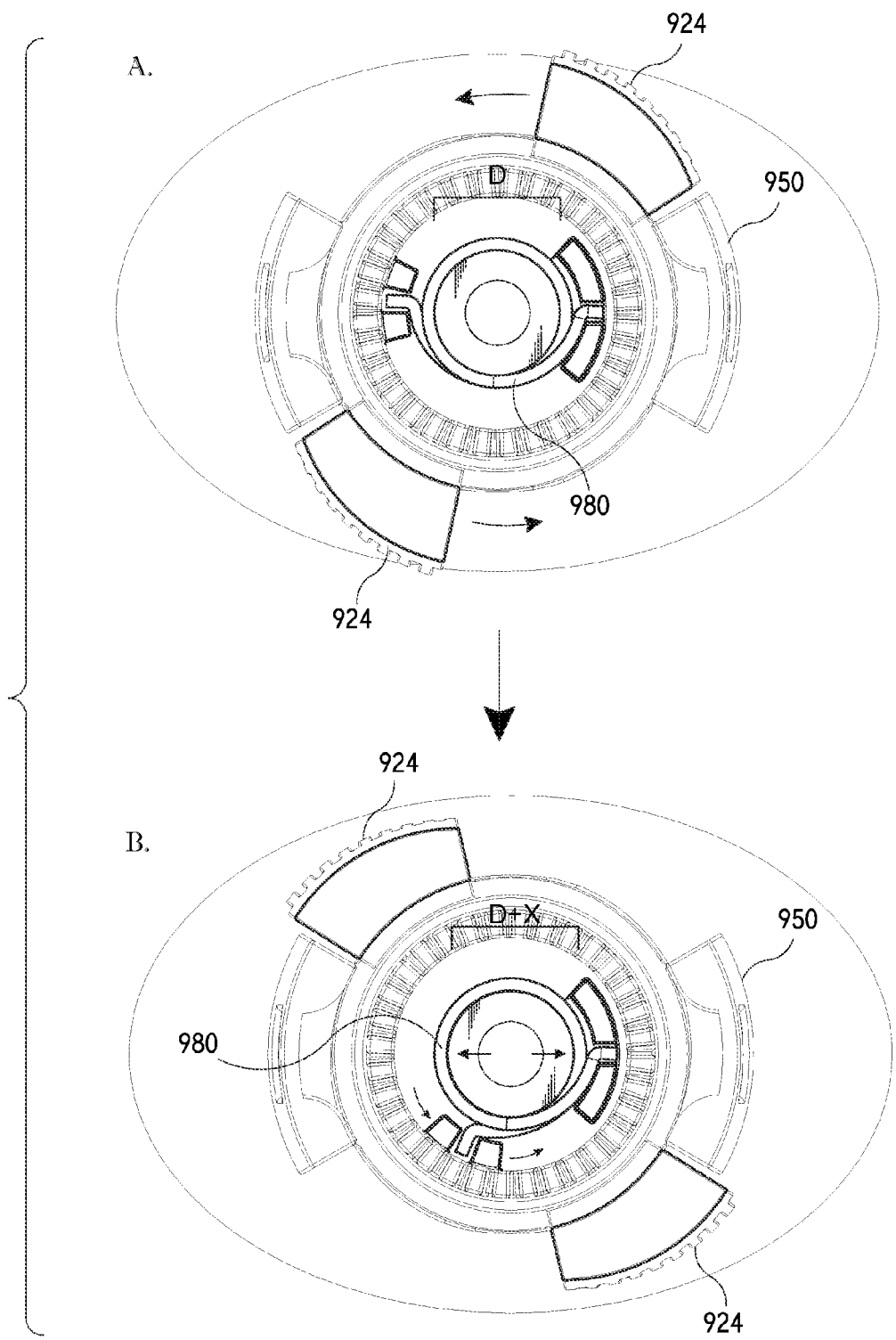
Figure 9H:
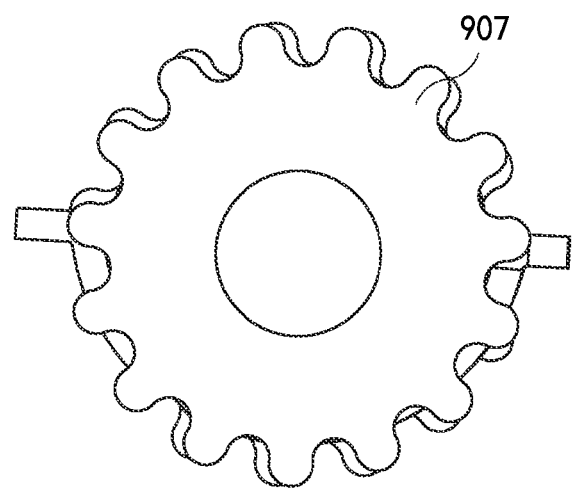
Figure 9I:
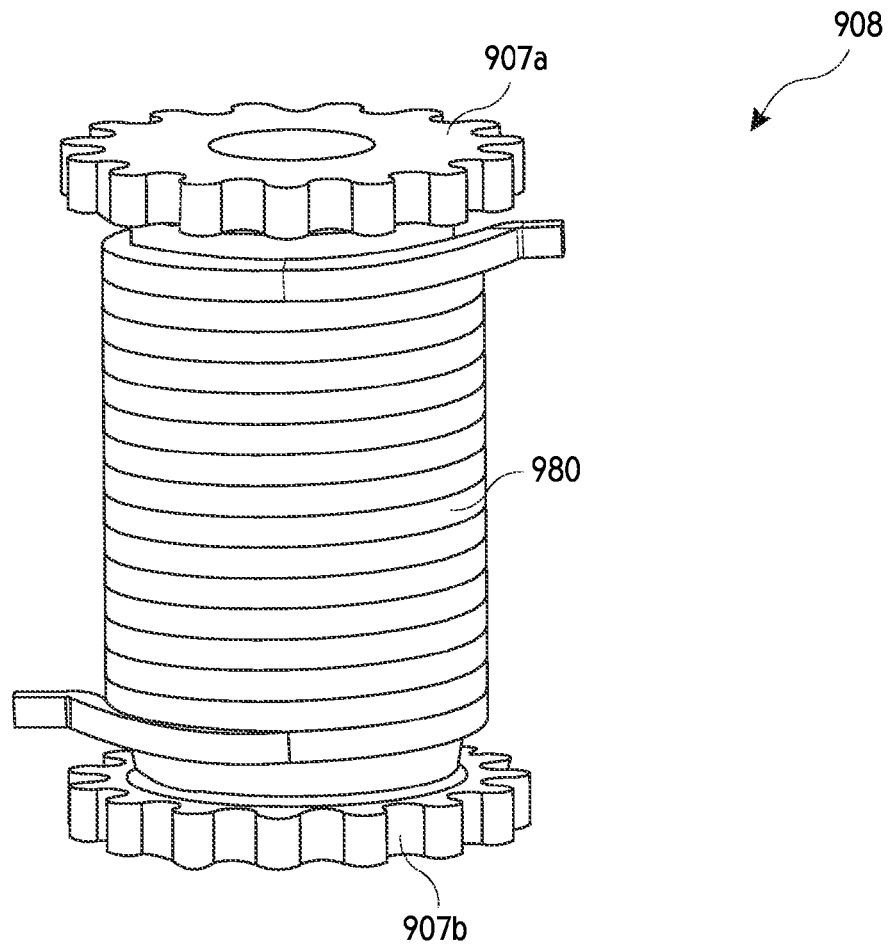
Figure 9J:
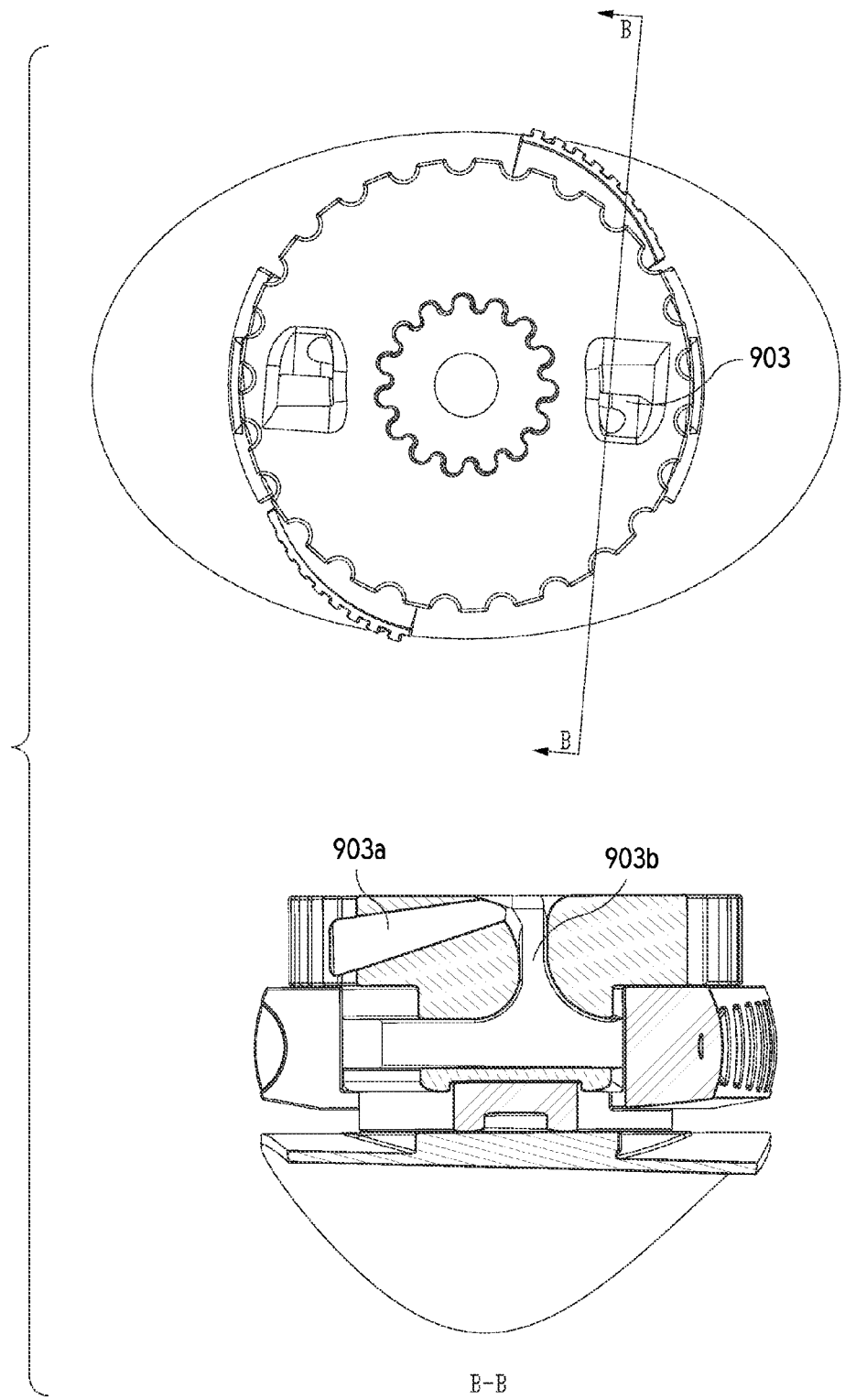
Figure 9K:
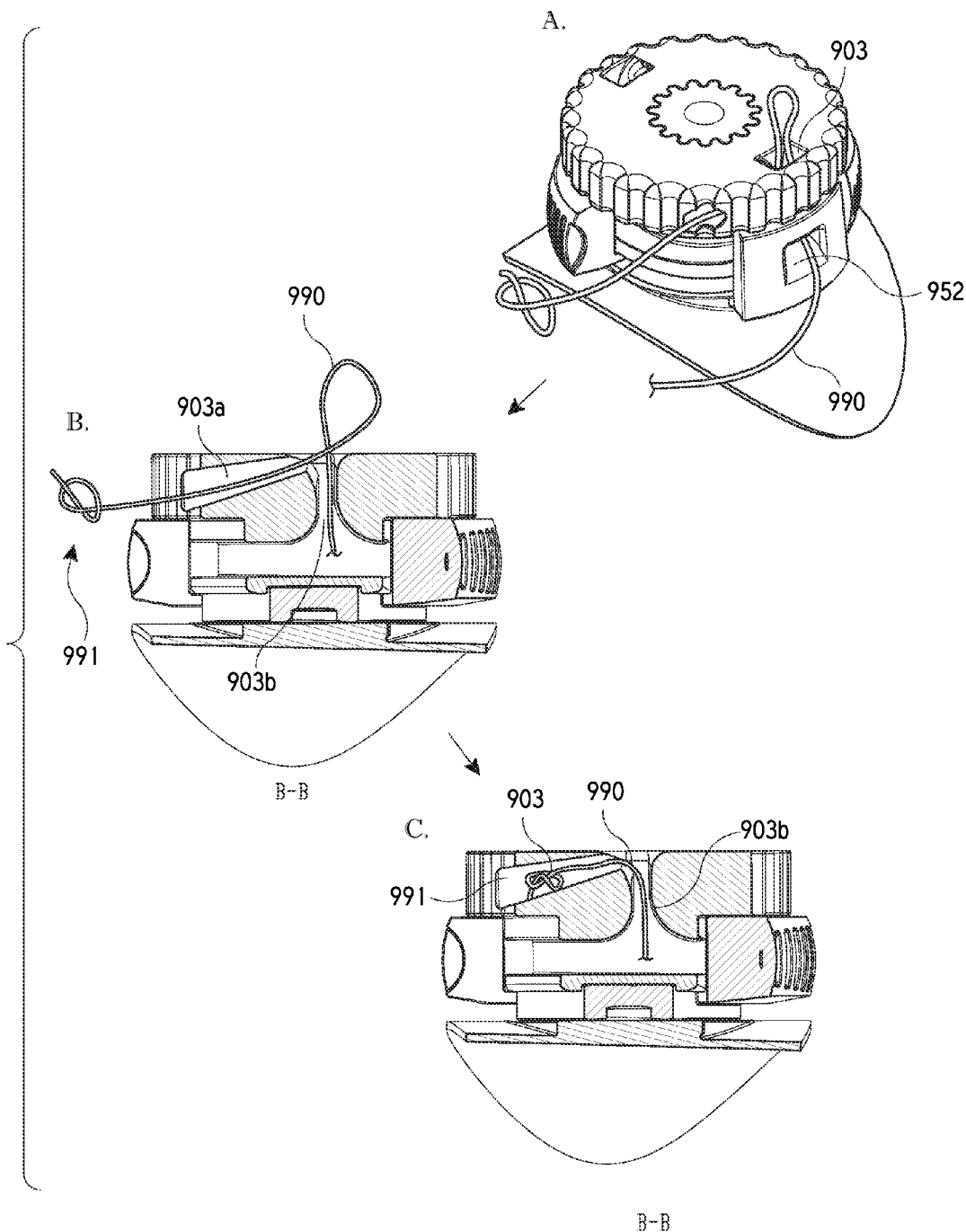
Figure 9L:
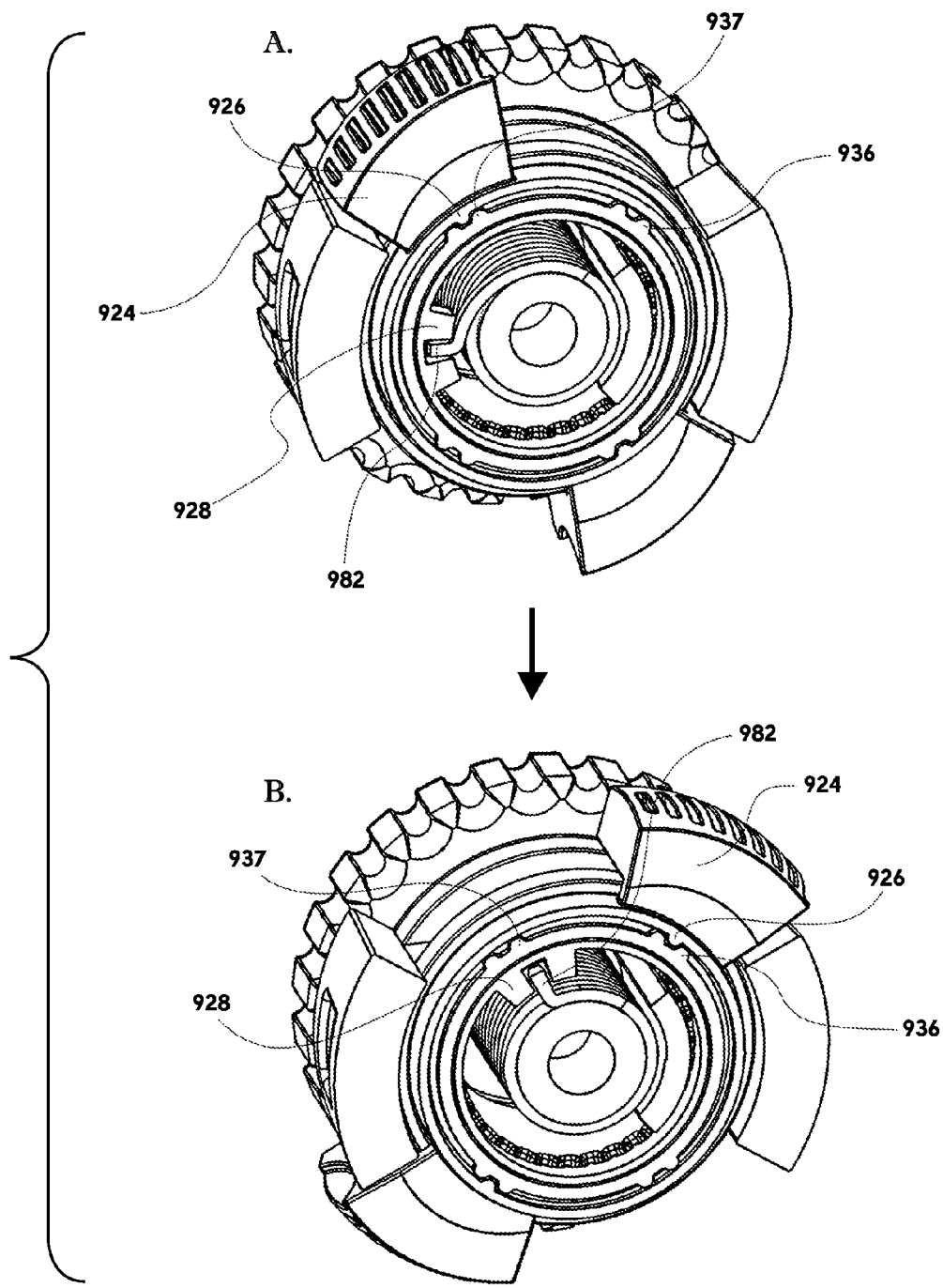

Referring now to FIGS. 9G and 9L, illustrated is an operation of using the release mechanism 920 to position the reel assembly in a locked/engaged state wherein rotation of the spool 910 in the second or loosening direction is prevented as described above, or to position the reel assembly in an unlocked/disengaged state wherein rotation of the spool 910 in the second or loosening direction is enabled. Positioning of the reel assembly 900 in the unlocked/disengaged state allows the lace to be unwound from the spool's central post or annular channel to loosen the lace's tension and thereby loosen the article.

As shown in FIG. 9G, rotation of the grip tabs 924 in the second direction (e.g., counterclockwise) relative to the housing 950 causes the diameter of the spring component 980 to increase from D to D+X, which reduces the frictional engagement of the spring component 980 and the first and second hubs, 907a and 907b, as described above. The diameter of the spring component 980 is increased as the lower spring tang 982 is rotated in the loosening direction via tang engagement feature 928 while the upper spring tang 981 is held or maintained in position via notch 914 of inner wall 960. The reduced frictional engagement of these components allows the spool 910 to rotate in the second or loosening direction, which allows the lace to unwind from the spool's central post or annular channel.

As shown in FIG. 9L, rotation of the grip tab 924 and release mechanism 920 in the second direction causes the detent 926 to move out of engagement with one of the detent notches 937 to into engagement with the other detent notch 936. Detent notch 937 holds or maintains the release mechanism 920 and spring component 980 in the locked/engaged state wherein the spring component 980 is constricted about the first and second hubs, 907a and 907b, (i.e., spring component has a diameter D) and rotation of the spool 910 in the second or loosening direction is prevented. Detent notch 936 holds or maintains the release mechanism 920 and spring component 980 in the unlocked/disengaged state wherein frictional engagement of the spring component 980 and first and second hubs, 907a and 907b, is reduced (i.e., spring component has a diameter D+X) and rotation of the spool 910 in the second or loosening direction is allowed. With the release mechanism 920 and spring component 980 in the unlocked/disengaged state, the spool 910 is able to freely rotate within the housing's interior region to unwind the lace from about the spool's central post or annular channel 918.

FIGS. 9J and 9K illustrate a lace or tension member being coupled with the reel assembly, and specifically, the reel assembly's knob 902 and spool 910. As shown in the cross section view of FIG. 9J, the knob's lumen 903 includes a first lumen 903b that extends axially upward and a second tapered lumen 903a that diagonally downward and through the knob 902. As shown in FIG. 9K, a lumen 952 of the housing may be aligned with the knob's lumen 903, and specifically the first lumen 903b. When aligned, the housing's lumen 952 directs the lace 990 upward and through the first lumen 903b. The lumen may then be pulled axially upward and above a top surface of the knob 902 an inserted through the second tapered lumen 903a. A knot 991 may then be tied onto an end of the lace 990 and the lace retracted through the second tapered lumen 903a. Retraction of the lace 990 through the second tapered lumen 903a may cause the knot 991 to engage with the tapered portion of the second tapered lumen 903a, thereby preventing full retraction of the lace 990 through the lumen 903a. The engagement of the knot 991 and the second tapered lumen 903a results in coupling of the lace 990 and the knob 902 and spool 910. As shown in FIG. 9K, the above lace attachment process occurs without disassembly of the reel assembly's components. Rather, the only step that may be required other than insertion of the lace 990 and tying of the knot 991 is alignment of the housing's lumen 952 with the knob's lumen 903.

Figure 9M:
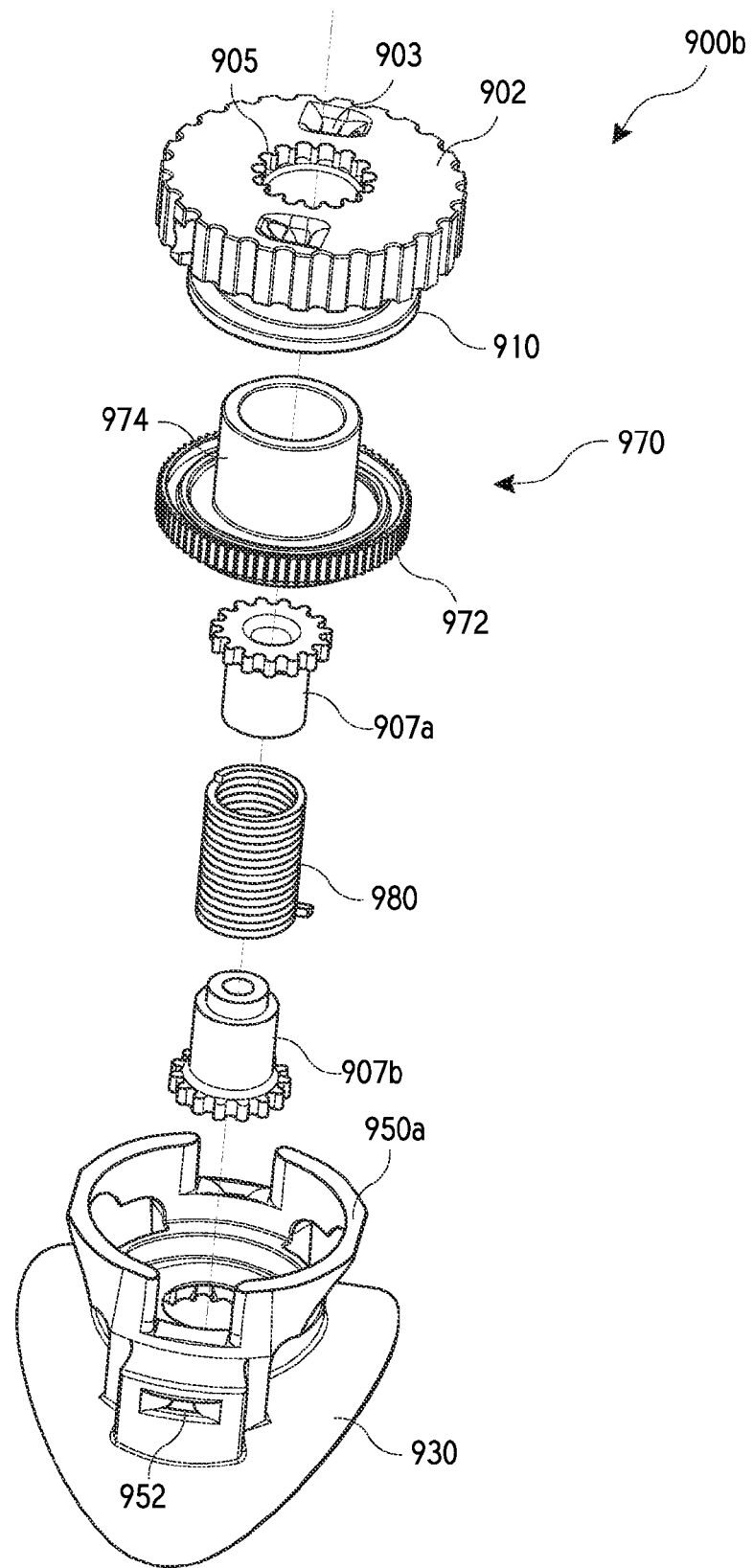
FIGS. 9M-R illustrate another embodiment of a reel assembly that may be used to close and/or tighten an article.
Figure 9N:
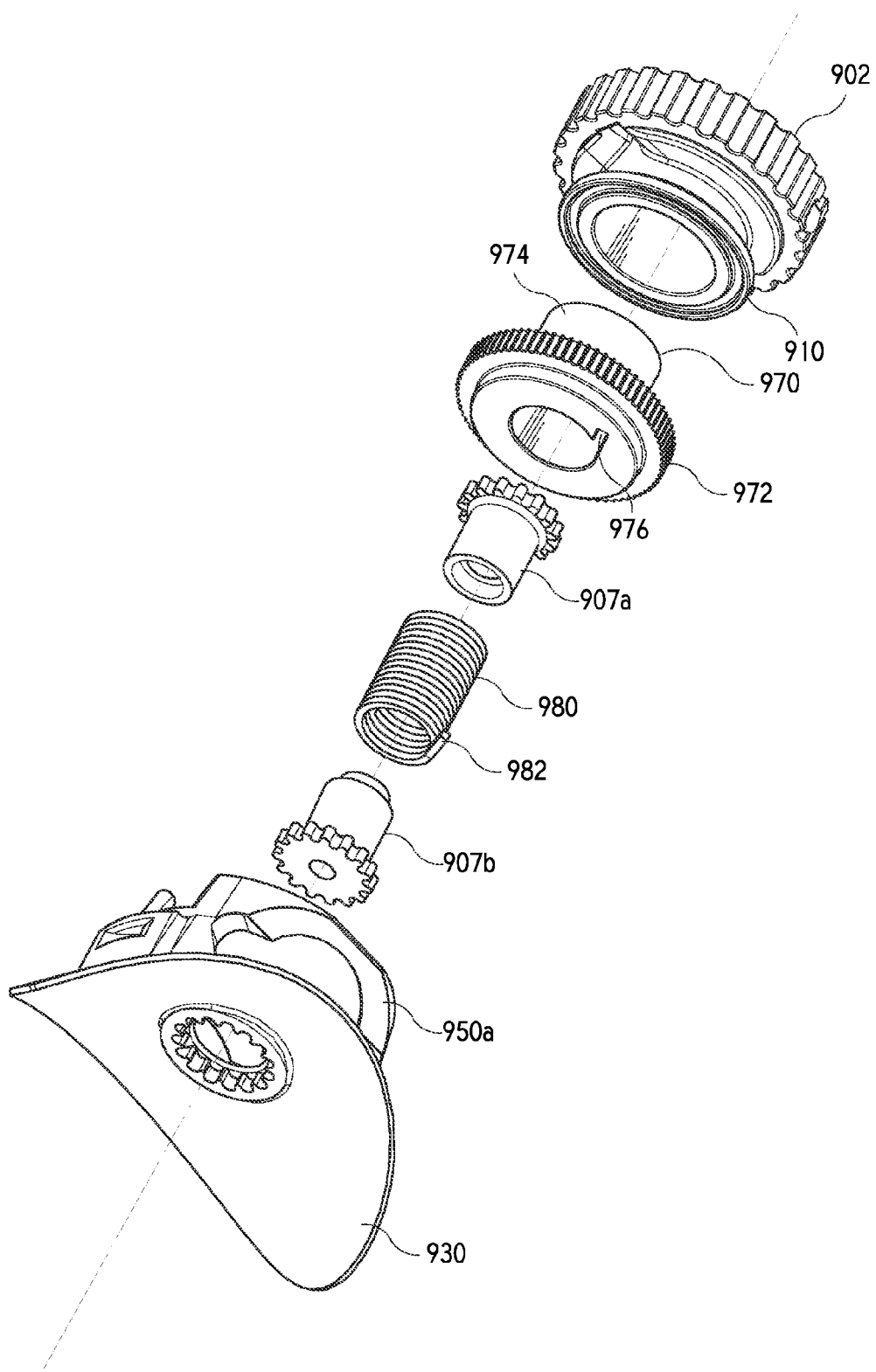
Figure 9O:
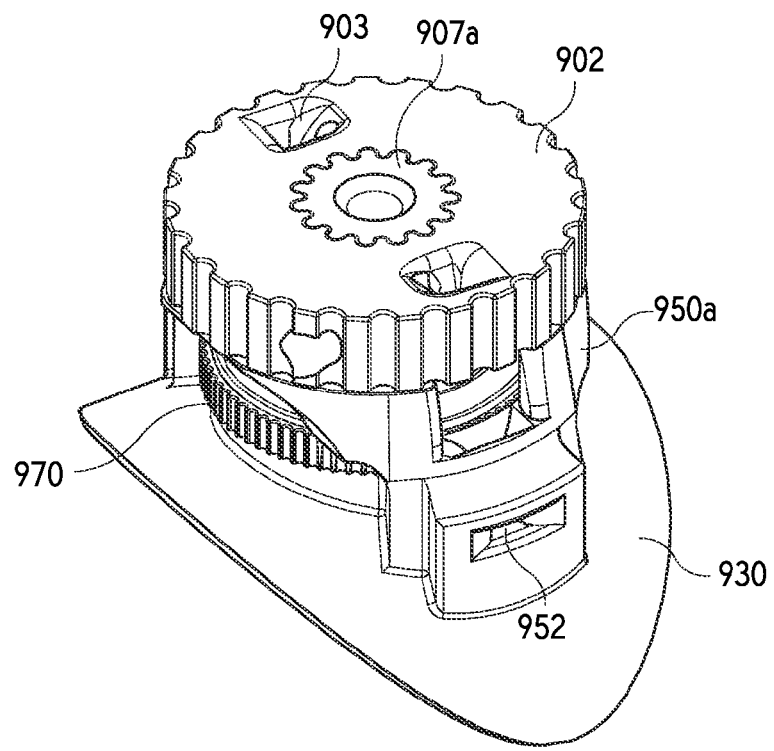
Figure 9P:
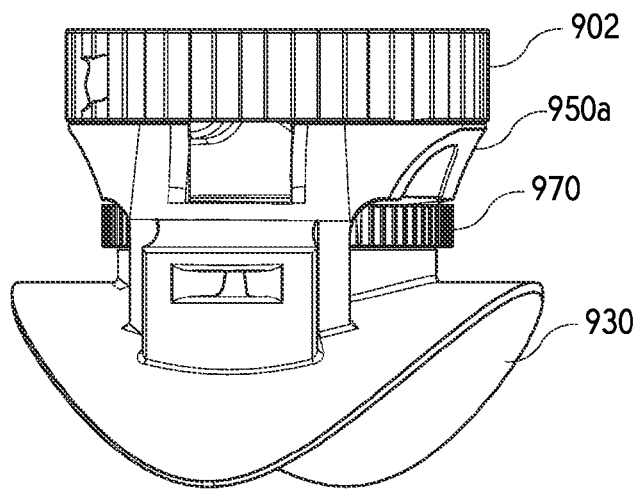
Figure 9Q:
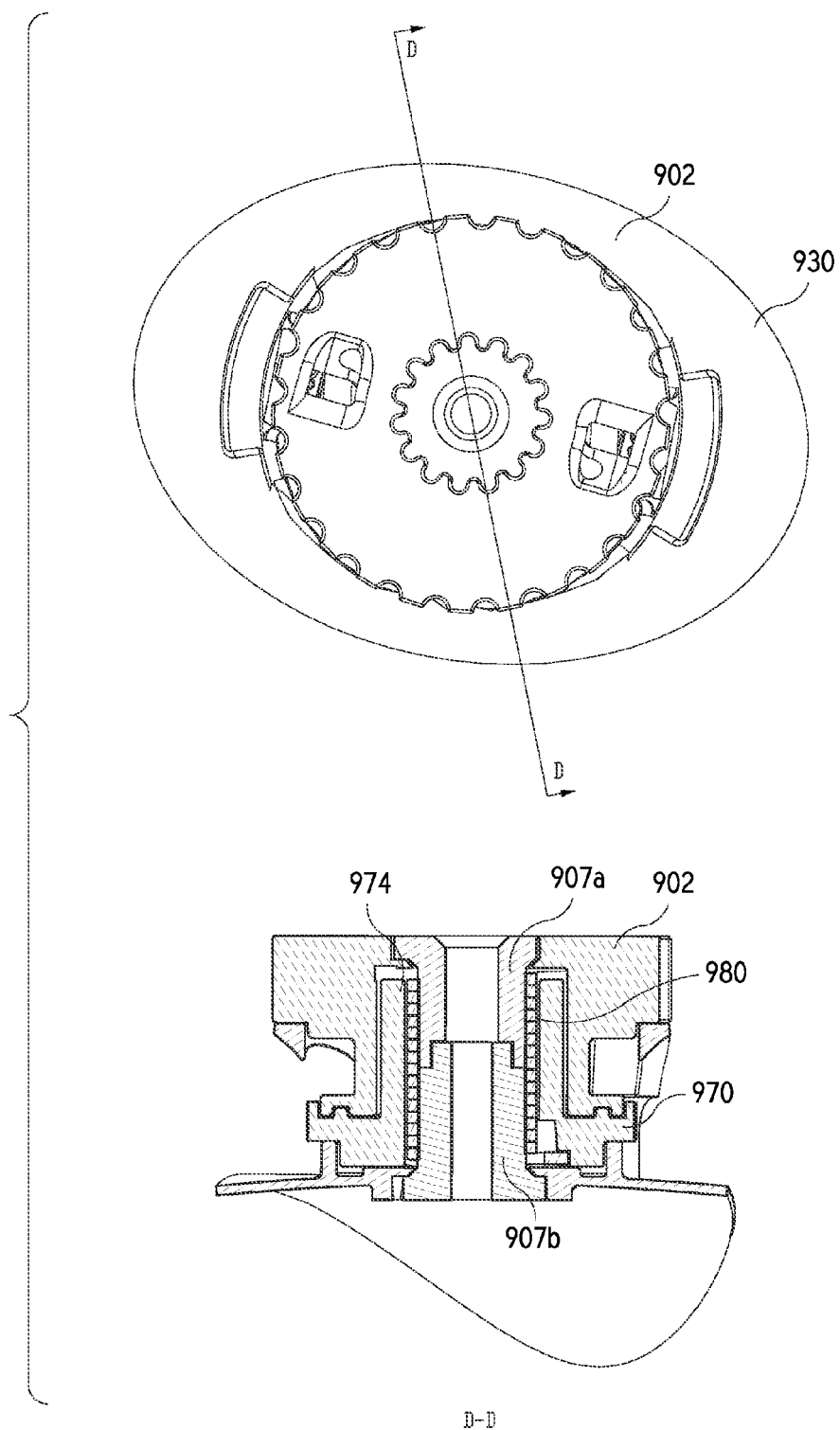

Referring now to FIGS. 9M-R, illustrated is another embodiment of a reel assembly mechanism 900b. Reel assembly 900b is similar to the reel assembly 900 previously described except that reel assembly 900b allows for an incremental release or loosening or lace tension and except that the housing 950a fully or mostly encloses the spool 910 and/or other components. The incremental release or loosening of the lace tension is achieved via release mechanism 970, which replaces the release mechanism 920 of the previous embodiment. As shown in FIGS. 9M, 9N, and 9Q, the release mechanism 970 includes a cylindrical boss 974 that is positioned around the spring component 980 and first and second hub, 907a and 907b, within the reel assembly. A bottom surface of the release mechanism 970 includes a tang aperture 976 within which the lower tang 982 of spring component 980 is positioned. Rotation of the knob 902 in the first or tightening direction reduces the frictional engagement of the spring component 980 and first hub 907a and/or second hub 907b as previously described to enable the spool 910 to rotate in the first direction and tension the lace.

The release mechanism 970 includes a rotatable surface or ring 972 that may be gripped by a user to rotate the release mechanism 970 in the second or loosening direction. Rotation of the release mechanism 970 in the second direction causes the lower portion of the spring component 980 to rotate in the second direction via engagement of the lower tang 982 and the tang aperture 976, which reduces the frictional engagement of the spring component 980 and the second hub 907b and/or first hub 907a by increasing the diameter of the spring component 980 as previously described. The reduced frictional engagement of the spring component 980 and second hub 907b unlocks or rotationally decouples the first hub 907a from the second hub 907b, which allows the first hub 907a and spool 910 to rotate, via lace tension, relative to the second hub 907b. When rotation of the release mechanism 970 is ceased, frictional engagement of the spring component 980 and second hub 907b is immediately increased, which locks or rotationally couples the first hub 907a and the second hub 907b and prevents further rotation of the first hub 907a and spool 910 in the second or loosening direction. In this manner the tension of the lace may be incrementally loosened or released by infinitely small amounts. In some embodiments, the lace tension may be fully loosened or released by providing a full release mechanism that disengages the clutch mechanism between the spool 910 and knob 902, between the spool 910 and housing 950, or between other components of the reel assembly 900b. Disengagement of the clutch mechanism may be achieved via axially upward movement of the knob 902, rotation of the knob 902 in the second direction, operation of a button component or lever mechanism, radial movement of a release mechanism, and the like.

Figure 9R:
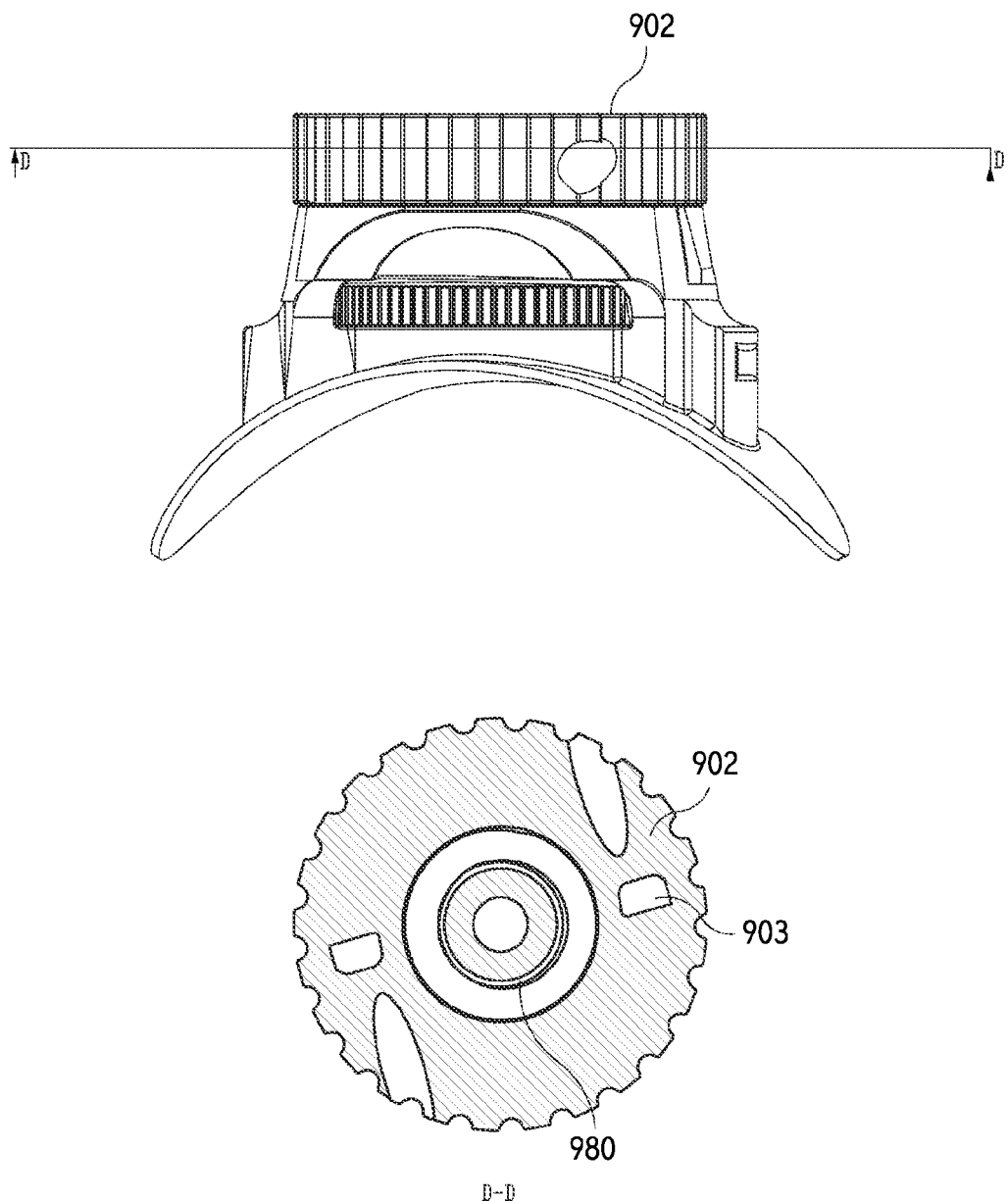
Figure 9S:
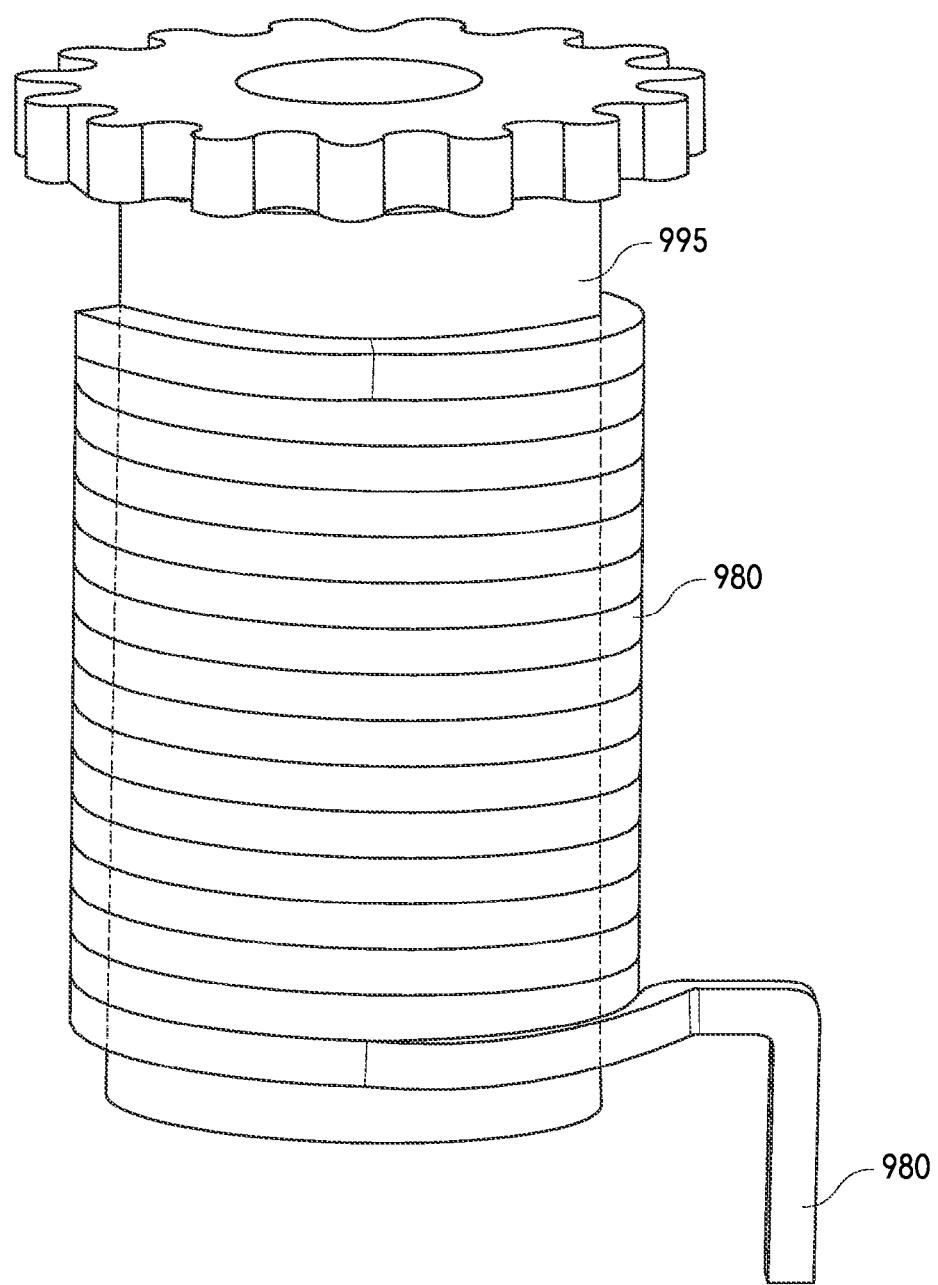
FIGS. 9S-U illustrate alternative embodiments of a spring-hub mechanism.
Figure 9T:
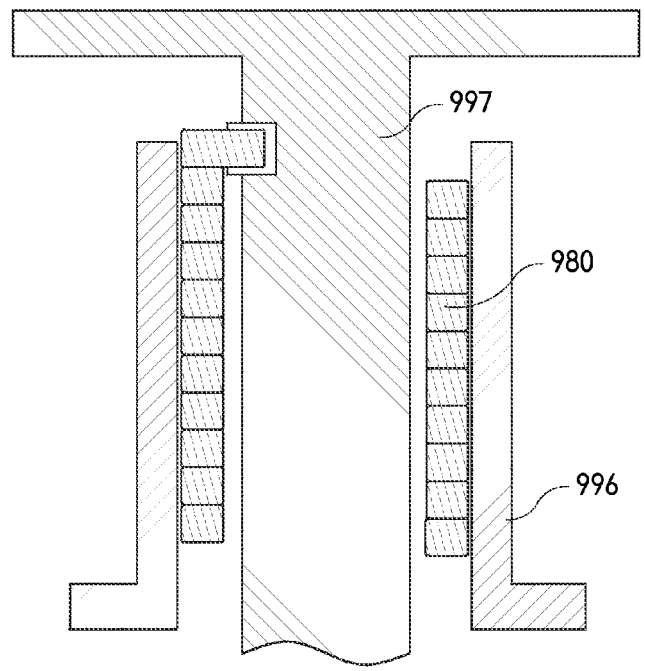
Figure 9U:
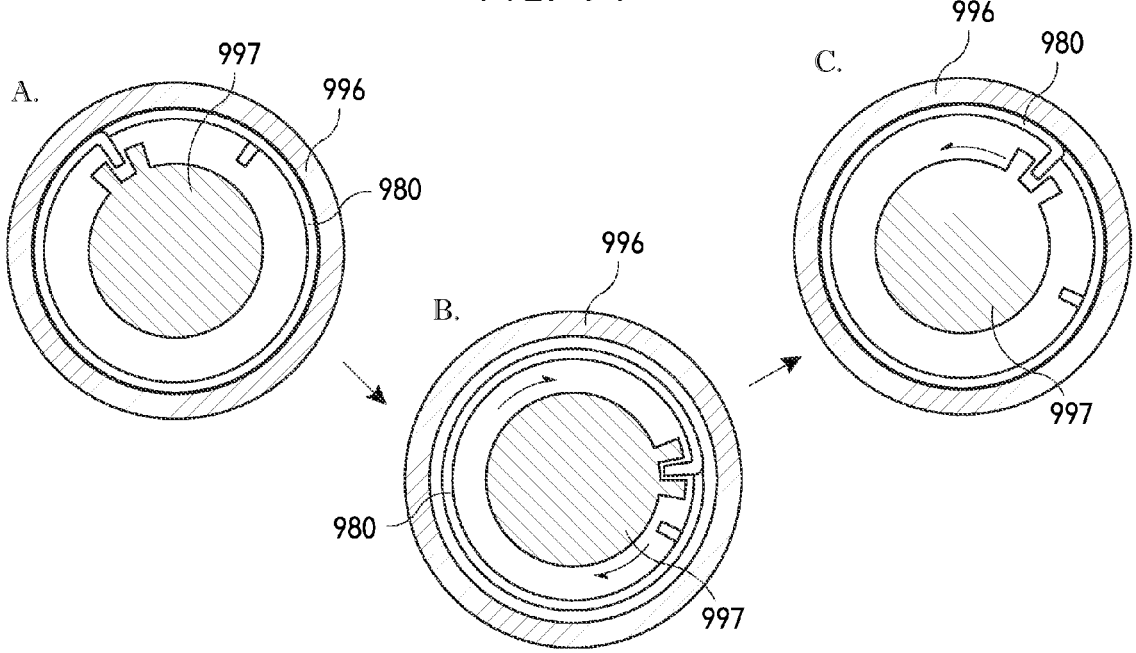

Referring now to FIG. 9S, illustrated is an embodiment of a spring component 980 frictionally engaged with a single hub 995. The single hub configuration of FIG. 9S may be used in place of the first and second hubs, 907a and 907b, described above. In such embodiments, the lower tang 982 would be fixedly coupled with the reel assembly, such as the flange 930 or housing 950/950a. In such embodiments, the lower tang 982 would function as the primary load holding component of the spring-hub or load holding mechanism. Operation of the spring-hub mechanism would function in a manner similar to that described above. FIGS. 9T and 9U illustrate an embodiment in which the spring component 980 is positioned within an inner wall of a cylindrical outer hub 996. The embodiment of FIGS. 9T and 9U may likewise be used to replace the first and second hub design described above. The spring component 980 flexes radially outward and into engagement with the inner cylindrical wall 996 to prevent rotation of an inner component 997 and an attached spool 997. As shown in FIG. 9U, rotation of the inner component 997 in the tightening direction causes the spring component 980 to constrict out of engagement with the inner cylindrical wall 996, which enables rotation of the inner component 997 and an attached spool (not shown). Rotation of the inner component 997 in a second and opposite direction, or ceasing rotation of the inner component 997 in the first direction, causes the spring component 980 to frictionally reengage with the inner wall of the cylindrical hub 996.

Although the reel assemblies, 900 and 900b, of FIGS. 9A-R illustrate the housing 950/950a attached or integrated with the base member or flange 930, it should be realized that in other embodiments the housing 950/950a may be removably coupled with a separate base member that includes the flange. For example, the base member or bayonet and release mechanism shown in FIGS. 14A and 14B can be used to removably couple the housing 950/950a with the flange 930.

According to an embodiment, a method for assembly a shoe with a reel based mechanism includes providing a reel that includes: a base member, a housing having an interior region, a spool positioned within the interior region of the housing, a knob member, and a load holding mechanism. As described herein above, the spool includes a central post about which a tension member is wound, and the spool is rotatable relative to the housing and/or base member. The knob member is coupled with the spool and configured to cause the spool to rotate within the interior region of the housing in a first direction to wind the tension member about the spool's central post. The load holding mechanism is coupled with the spool and the housing and includes a first friction element and a second friction element that are frictionally engageable to prevent rotation of the spool in a second direction opposite the first direction to prevent unwinding of the tension member from the spool's central post. Rotation of the knob member in the first direction reduces the frictional engagement of the first friction element and the second friction element to enable rotation of the spool in the first direction and tension in the tension member or lace biases the load holding mechanism toward rotation in the second direction, which increases the frictional engagement of the first friction component and the second friction component. The method also includes coupling the base member with the article.

Referring now to FIGS. 10A-10G, illustrated is another embodiment of a reel assembly 1000 that is relatively quiet in operation and that provide safeguards against accidental opening. To provide quiet operation of reel assembly 1000, a plurality of lock components 1010 are positioned between a knob 1002 and upper housing 1030. Each of the lock components 1010 includes a main body 1012 and a protrusion 1016 that is positioned within an aperture 1022 of a coupling component 1020. The protrusions 1016 allow the lock components 1010 to pivot between cam walls 1024 of coupling component 1020. The main body 1012 of each lock component 1010 includes a pair of cam surfaces 1013 and a pair of radius surfaces 1015 that are positioned on opposite sides of the main body 1012.

Each of the lock components 1010 also includes a protrusion 1014 that extends axially upward from the main body 1012. A spring component 1004 is positioned between the lock components 1010 and knob 1002. The spring component 1004 includes a plurality of cantilevered arms that are each positioned over the protrusion 1014 of the lock components 1010 so that the protrusions 1014 are positioned between the cantilevered arms and a central ring portion of spring component 1004. The cantilevered arms of spring component 1004 bias the lock components 1010 inward toward a locked position described hereinbelow.

Figure 10A:
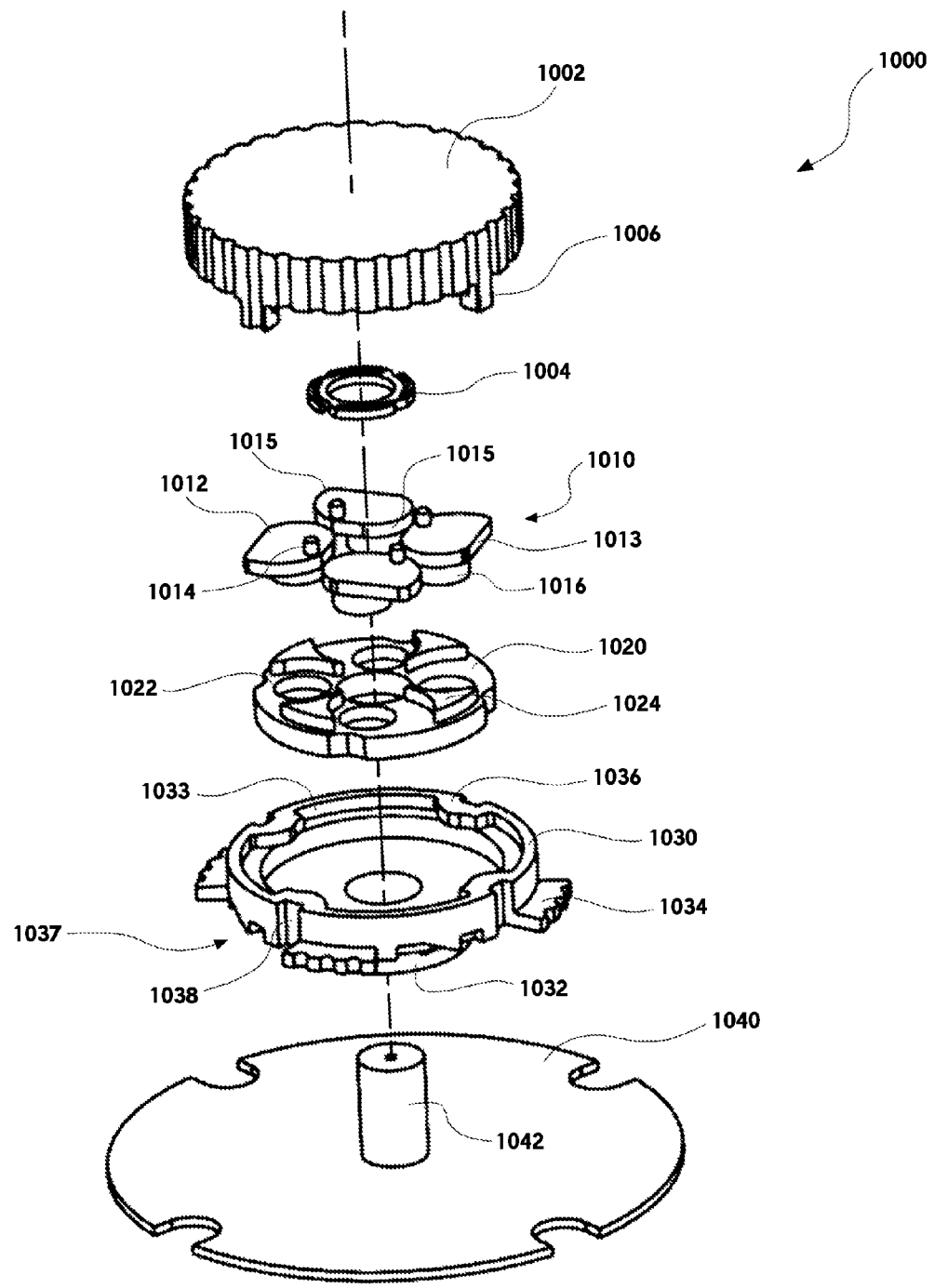
FIGS. 10A-G illustrate another embodiment of a reel assembly that may be used to close and/or tighten an article.
Figure 10B:
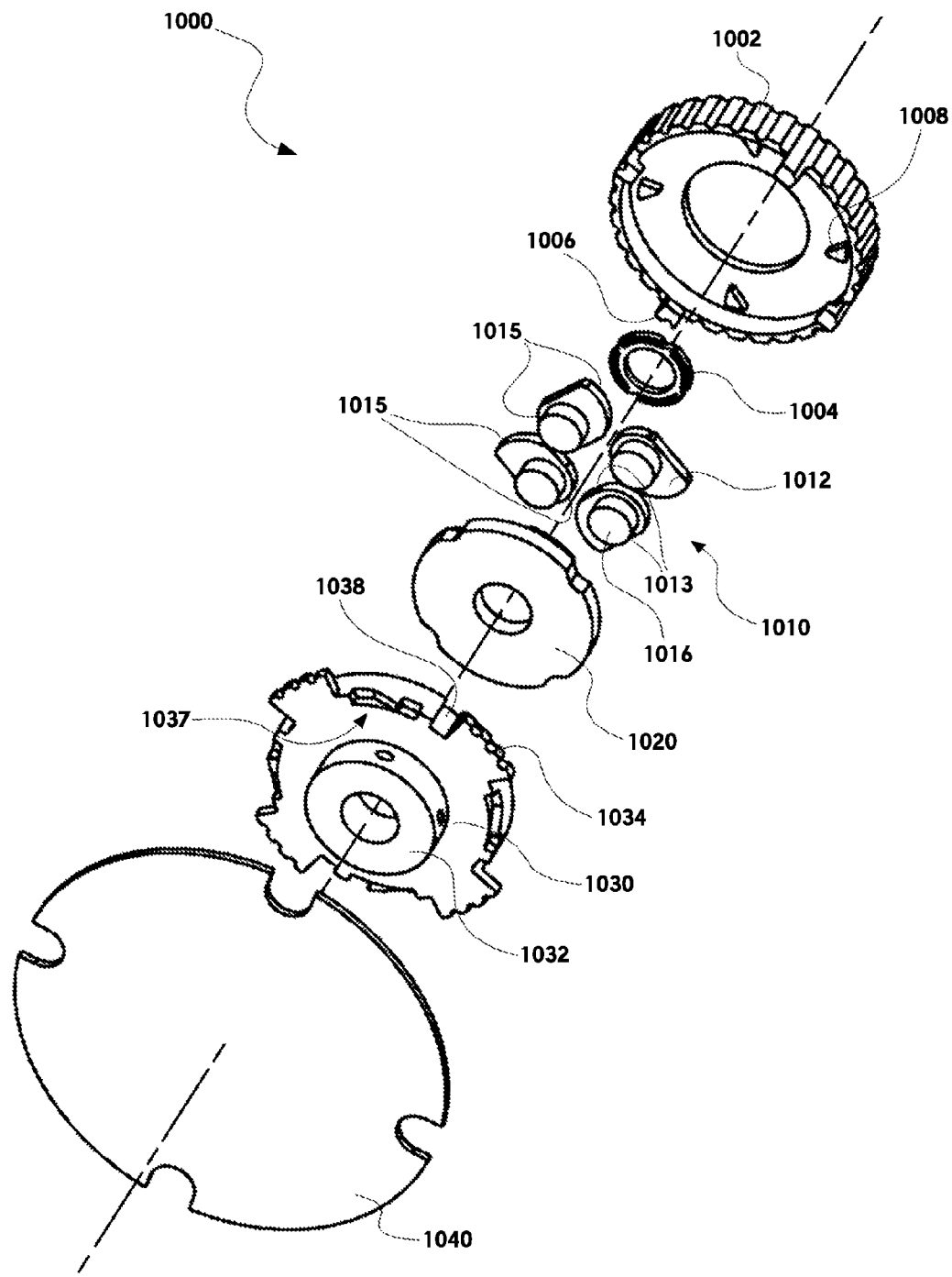

The upper housing 1030 includes an inner surface 1033 and a plurality of inwardly extending walls 1036. The coupling component 1020 is positioned within a central recess of upper housing 1030 so that each main body 1012 is positioned on roughly the same plane as the inwardly extending walls 1036. A central boss 1042 of a base component 1040 extends axially upward through an aperture of upper housing 1030 and coupling component 1020 so that the central boss 1042 is centrally positioned between the plurality of lock components 1010. Upper housing 1030 may also include a plurality of flanged members 1034 that extend axially outward from a body of upper housing 1030. As shown in FIG. 10B, knob 1002 includes a plurality of wedged or cam members 1008 that extend axially downward from a bottom surface of knob 1002. As described in greater detail below, the wedge members 1008 contact the lock components 1010 to cause the lock components 1010 to pivot between a locked and unlocked position. Knob 1002 also includes a plurality of hanging bosses 1006 that extend axially downward from a bottom surface of knob 1002. The hanging bosses 1006 are configured to be inserted through corresponding slots 1038 in upper housing 1030. Positioned axially below the upper housing 1030 is the spool 1032 around which lace is wound by operation of reel assembly 1000.

Figure 10C:
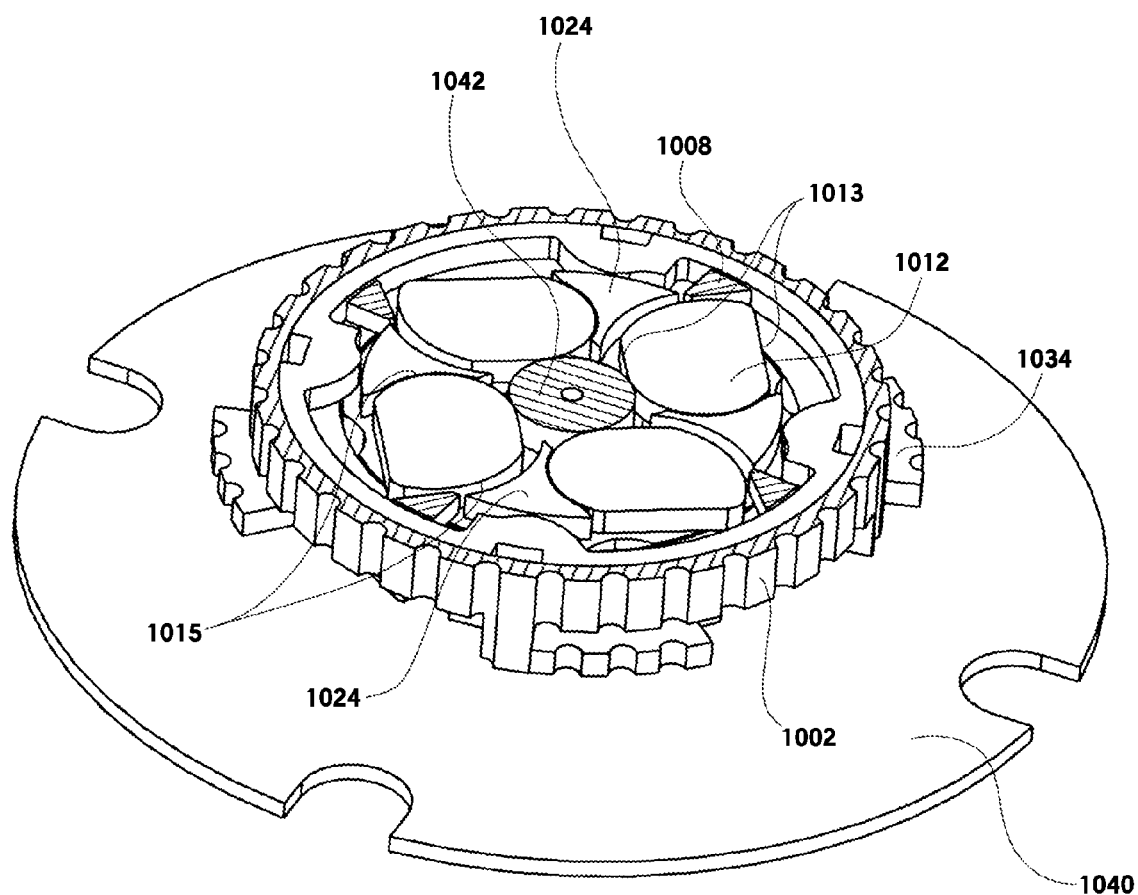

FIG. 10C illustrates the components of reel assembly 1000 in an assembled configuration and with a top portion of the knob 1002 removed. As shown in FIG. 10C, in the assembled configuration each main body 1012 is positioned on or adjacent roughly the same plane as the inwardly extending walls 1036 and central boss 1042 of base component 1040. Each main body 1012 is positioned between a pair of cam walls 1024 and a wedge member 1008 is positioned adjacent each main body 1012.

Figure 10D:
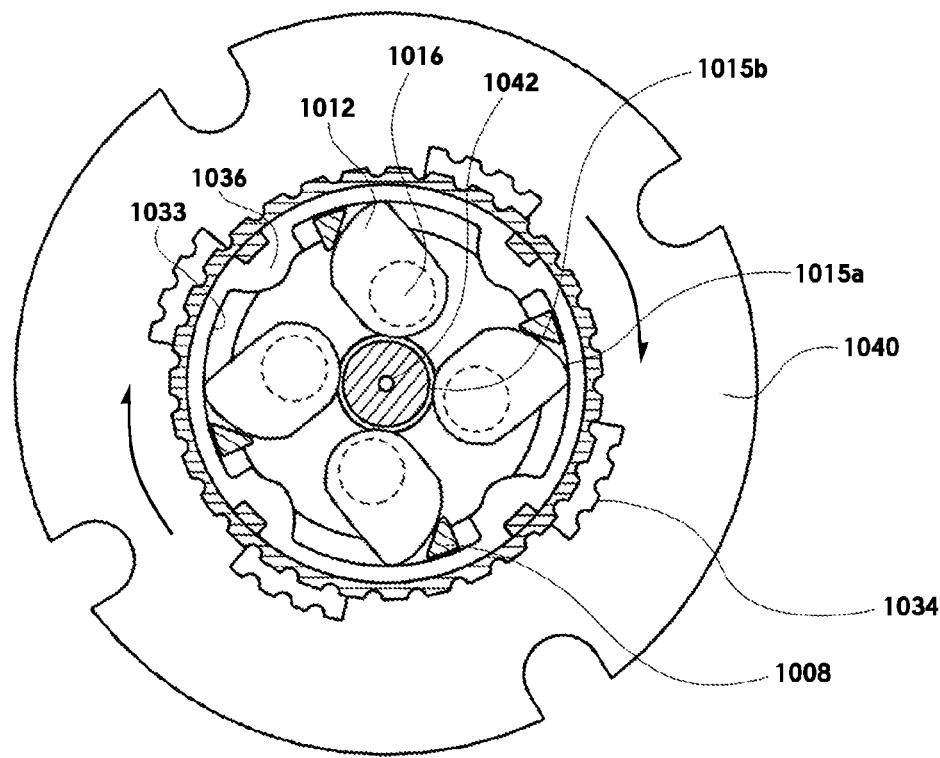
Figure 10E:
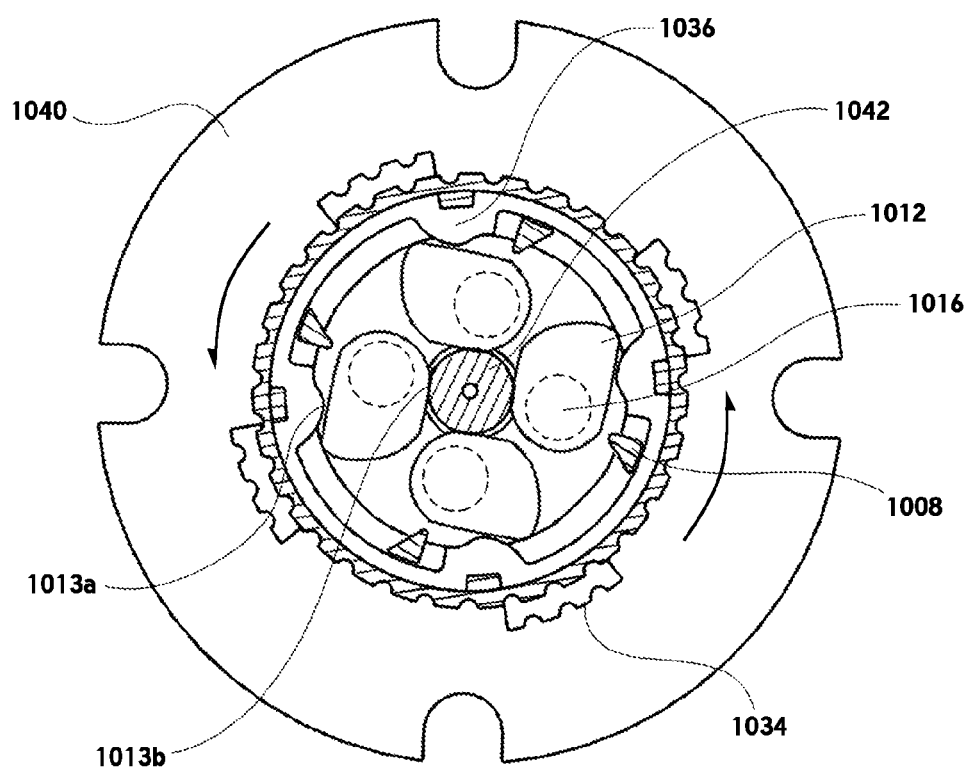

As shown in FIGS. 10D and 10E, in operation of reel assembly 1000 the lock components 1010, and specifically each main body 1012, pivot within the upper housing 1030 and between the cam wall 1024 to engage the inner surface 1033 or inwardly extending walls 1036 and thereby drive spool 1032 or lock the reel assembly 1000 to prevent backwinding of the spool 1032 and lace. As shown in FIG. 10D, to drive the spool 1032 and tighten or tension the lace, the knob 1002 is rotated by a user in the tightening direction. Rotation of the knob 1002 in this direction causes the wedge members 1008 to contact the main body 1012, which causes the radius surfaces 1015a-b to pivot within upper housing 1030 (e.g., clockwise) until an outer radius surface 1015a contacts inner housing 1033. Contact between the outer radius surface 1015a and inner housing 1033 locks the upper housing 1030 with the knob 1002 and causes the upper housing 1030 to rotate with the knob 1002, which in turn drives the spool 1032 and winds lace about the spool 1032. As shown in FIG. 10D, an inner radius surface 1015b does not contact central boss 1042 and thus, the upper housing 1030 and spool 1032 are able to rotate about central boss 1042 and base component 1040. In another embodiment, the inner radius surface 1015b may contact central boss 1042, but the radius of surface 1015b may allow the surface 1015b to slide along the surface of central boss 1042 without binding or locking the upper housing 1030 and spool 1032. Although not shown, in many embodiments, the base component 1040 includes axially upward extending walls that function to house the spool 1032 and any lace wound thereon.

As shown in FIG. 10E, as the knob 1002 is released or rotated in the loosening direction, the main body 1012 pivots in an opposite direction within the upper housing 1030 (e.g., counterclockwise) until the cam surfaces 1013a-b contact and are pinched between the inwardly extending walls 1036 and the central boss 1042 of base component 1040. Specifically, outer cam surfaces 1013a contact the inwardly extending walls 1036 while inner cam surfaces 1013b contact the central boss 1042. With the cam surfaces 1013a-b pinched between the inwardly extending walls 1036 and central boss 1042, the reel assembly 1000 is locked about base component 1040, which is fixedly coupled with the shoe or other apparel. As described briefly above, the spring component 1004 may be used to bias or pivot the main bodies 1012 toward the locked configuration shown in FIG. 10E. Further, tension on the lace causes the spool 1032 to drive rotation of the upper housing 1030 in the loosening direction, which causes the cam surfaces 1013a-b to pinch between the inwardly extending walls 1036 and central boss 1042.

To place the reel assembly 1000 in an open configuration, the upper housing 1030 may be rotated in the tightening direction (e.g., by gripping flanged members 1034), which causes the inwardly extending walls 1036 to rotate the main bodies 1012 into a disengaged position. For example, the inwardly extending walls 1036 may rotate the outer radius surfaces 1015a out of disengagement with the inner wall 1033 without rotating the inner cam surfaces 1013b into contact with the central boss 1042. Simultaneously, the knob 1002 may be rotated in the loosening direction to cause the wedge members 1008 to contact an opposite side of the main bodies 1012 and thereby pinch or holding the main bodies 1012 between the inwardly extending walls 1036 and the wedge members 1008 in the fixed, disengaged position. The hanging bosses 1006 located on the outer circumferential edge of the knob 1002 may key into recesses 1037 in the upper housing 1030 by rotating the knob 1002 and upper housing 1030 in opposite directions, which may hold or maintain the main bodies in the disengaged position without additional user input. To reengage the main bodies 1012, the knob 1002 and upper housing 1030 are rotated in the tightening and loosening direction, respectively, to disengage the hanging bosses 1006 from the recesses 1037. Reel assembly 1000 provides a safeguard against accidental opening by requiring rotation of these two components (i.e., knob 1002 and upper housing 1030) in opposite directions to place the reel assembly 1000 in the open configuration.

Figure 10F:
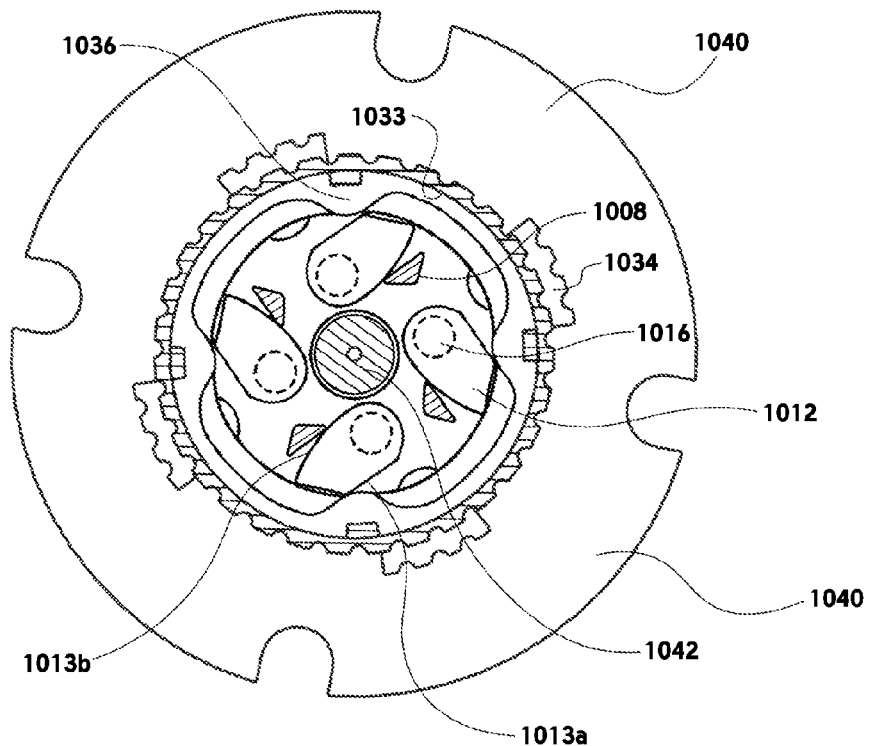
Figure 10G:
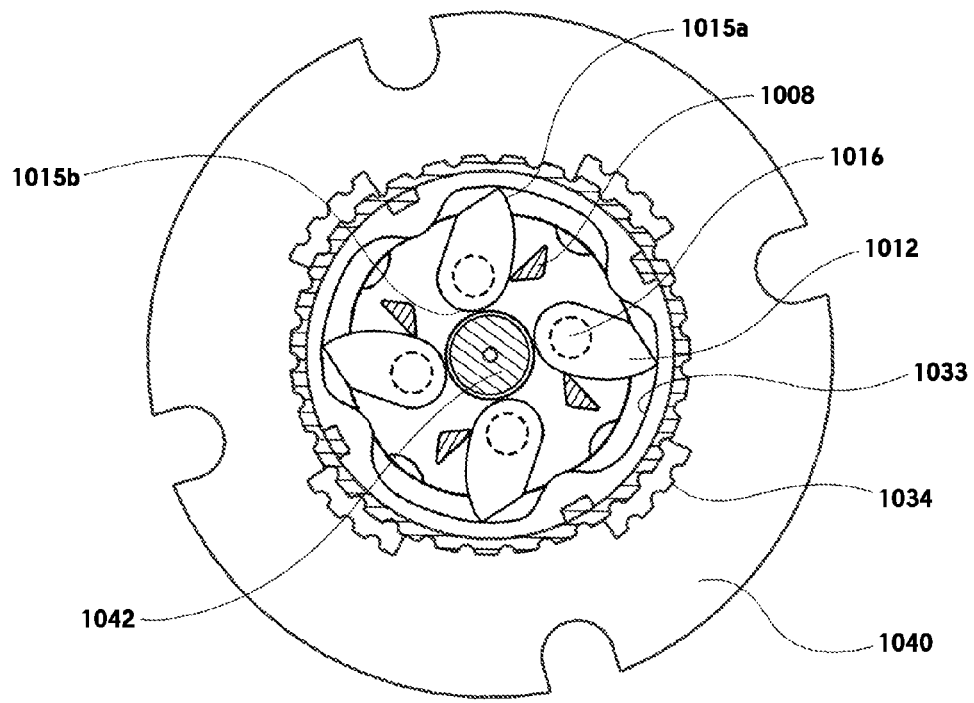

FIGS. 10F and 10G illustrates a slight variation of the assembly of the components of reel assembly 1000. As shown in FIG. 10F, in the drive or tensioning mode of operation, the inwardly extending walls 1036 contact the outer cam surfaces 1013a and cause the main bodies 1012, and specifically the inner cam surfaces 1013b, to pivot into engagement with the wedge members 1008. This causes the main bodies 1012 to be pinched between the inwardly extending walls 1036 and wedge members 1008, which locks the upper housing 1030 to the knob 1002 and permits rotation of the upper housing 1030 and spool 1032 via knob 1002. When the knob 1002 is released or counter-rotated, the wedge member 1008 cause the main bodies 1012, and specifically the outer radius surfaces 1015a, to pivot into engagement with the inner surface 1033 of upper housing 1030 while the inner radius surfaces 1015b pivot into contact with the central boss 1042 of base component 1040. This pinches the main bodies 1012 between the inner housing 1033 and central boss 1042 and locks or fixes the reel assembly components to base component 1040, which is fixedly coupled to the shoe or apparel.

Figure 11A:
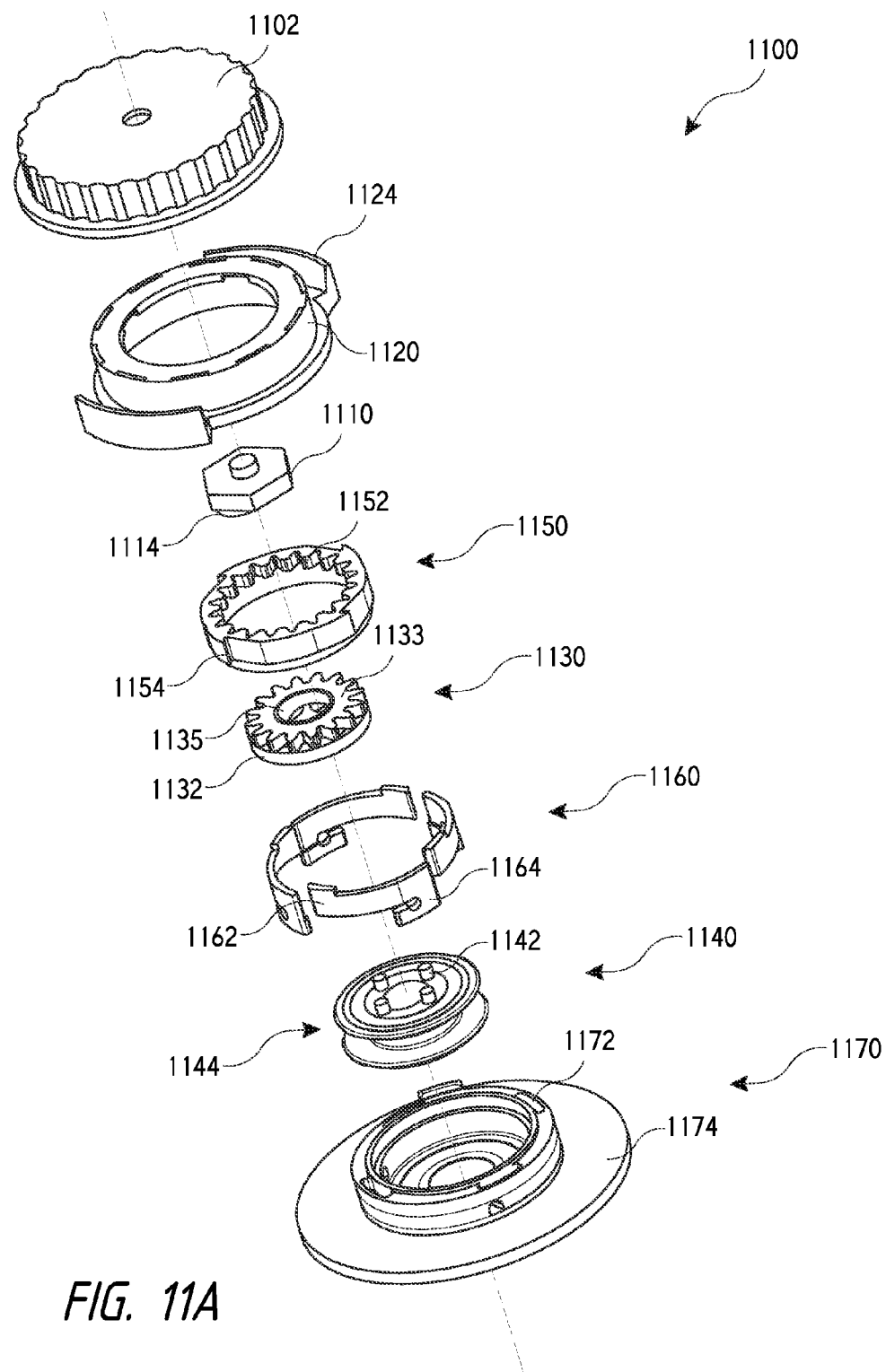
FIGS. 11A-E illustrate another embodiment of a reel assembly that may be used to close and/or tighten an article.
Figure 11B:
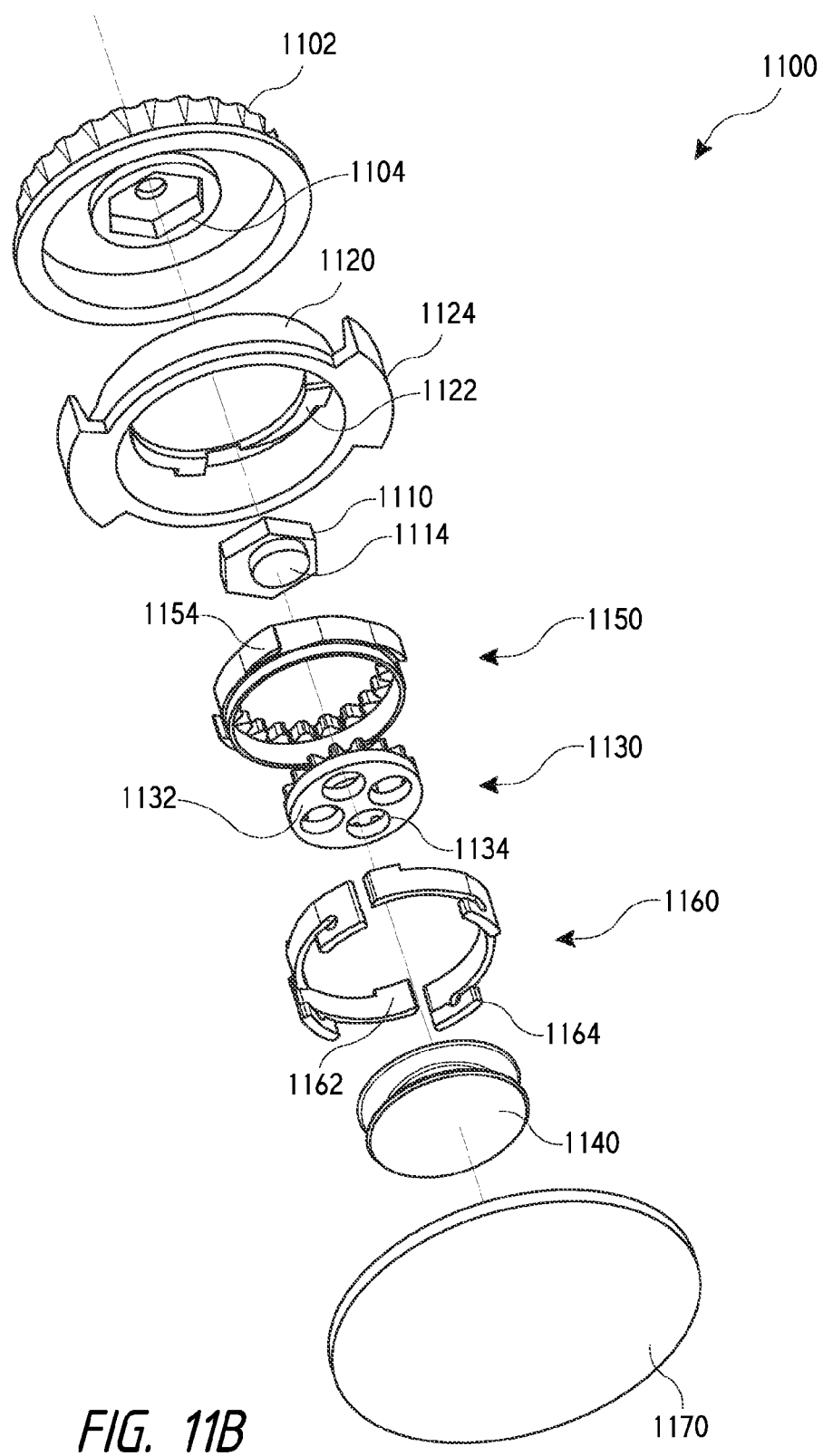

Referring now to FIGS. 11A-E, illustrated is another embodiment of a reel assembly 1100 that is relatively quiet in operation. FIGS. 11A and 11B illustrate exploded perspective views of reel assembly 1100. The reel assembly 1100 includes a knob 1102 having a geometric aperture 1104 that is used to drive a drive component 1110. Drive component 1110 includes a top member having a geometric shape that corresponds to the geometric aperture 1104 of knob 1102 such that rotation of the knob 1102 causes rotation of the drive component 1110. Positioned axially below the drive component 1110 is an eccentrically positioned input shaft 1114. Stated differently, the input shaft 1114 has an axis that is offset from an axis of drive component 1110 and knob 1102.

Figure 11C:
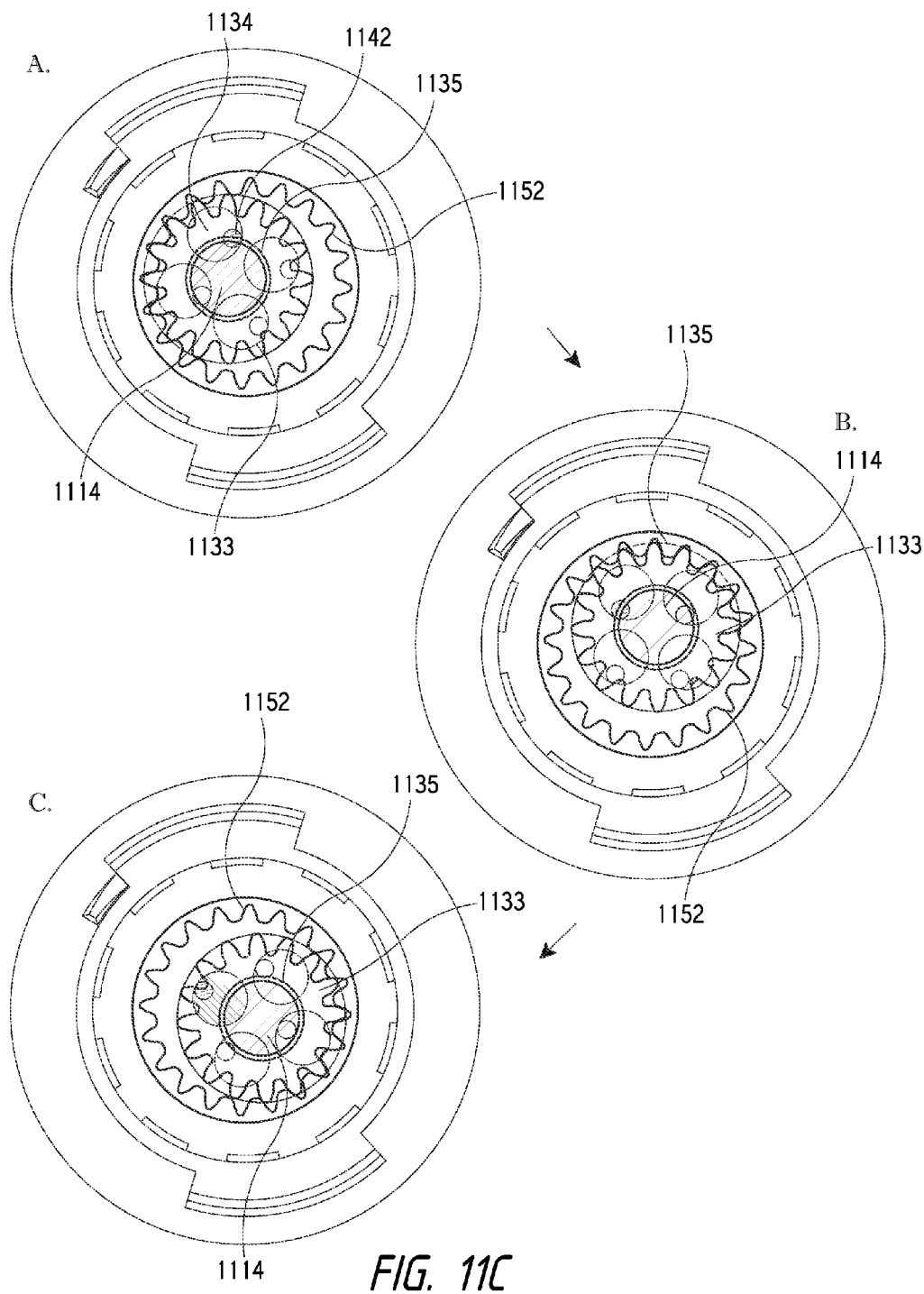

Input shaft 1112 extends axially into an interior region of a lower knob 1120 and into engagement with an input aperture 1135 of a cyclodial gear or disc 1130. The cycloidal disc or gear 1130 is positioned within the interior region of lower knob 1120 and within a rotation control component 1150. The cycloidal gear 1130 is positioned within the rotation control component 1150 so that a pinion gear surface 1133 (hereinafter pinion gear 1133) is engaged with an annular gear 1152. As shown in FIG. 11C, rotation of the knob 1102 causes the input shaft 1114 to rotate the pinion gear 1133, via input aperture 1135, within the annular gear 1152 of rotation control component 1150.

The cyclodial gear 1130 also includes a disc 1132 positioned axially below the pinion gear 1133. The disc 1132 includes a plurality of apertures 1134 within which bosses 1142 of the spool 1140 are inserted. The bosses 1142 slide within the apertures 1134 of the disc 1132 as the pinion gear 1133 moves within the annular gear 1152 of rotation control component 1150, which transfers a rotational force to spool 1140 and drives or causes rotation of spool 1140. Spool 1140 includes a channel 1144 within which the lace is wound as the reel assembly 1100 is operated. To prevent counter-rotation of the spool 1140 (i.e., rotation in the loosening direction), the rotation control component 1150 is coupled with a housing 1160 as described above. Specifically, cantilevered arms 1162 of the housing 1160 are configured to contact and engage with stop components 1154 of the rotation control component 1150. The housing 1160 is in turn fixedly coupled with a base member 1170, such as by positioning axially extending legs 1164 of the housing 1160 within mounting aperture 1172 of the base member 1170. The base member 1170 includes a flange 1174 that allows the base member to be coupled with an article or shoe.

Figure 11D:
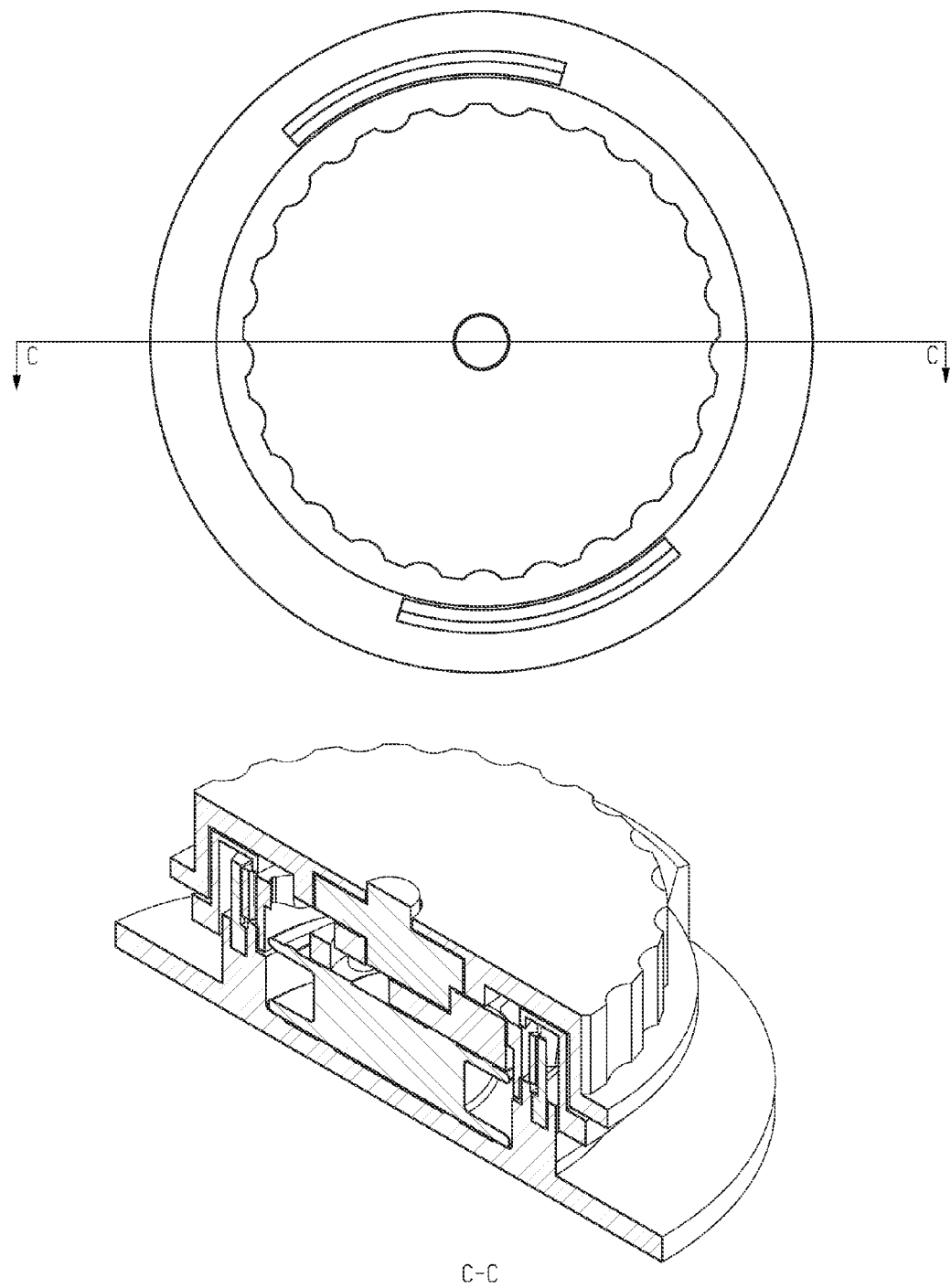
Figure 11E:
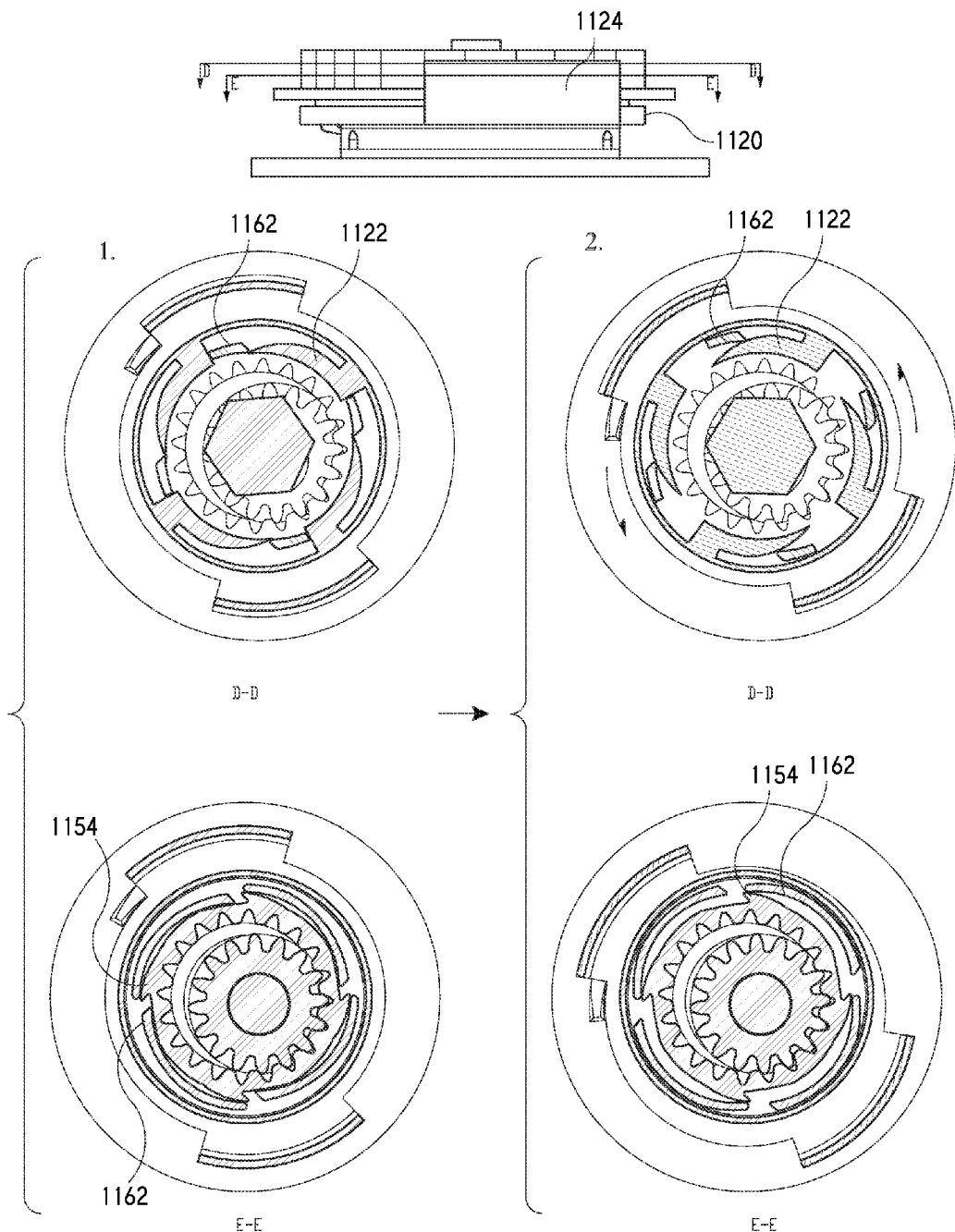

As shown in FIG. 11E, to loosen the lace, the lower knob 1120 is rotated in the second or loosening direction via grip members 1124, which causes a cam surface 1122 of the lower knob 1120 to engage a distal end of the cantilevered arms 1162 and move the arms 1162 radially outward to disengage the arms 1162 and the stop components 1154 as shown. This allows the rotation control component 1150, spool 1140, cyclodial gear 1130, and knob 1102 to rotate relative to the housing 1160 and base member 1170, which unwinds lace from the channel 1144 of spool 1140. The cycloidal gear 1130 configuration may provide approximately a 4:1 gear ratio, although other gear ratios may be achieved as desired.

FIG. 11C illustrates one of the apertures 1134 of disc 1132 (i.e., the shaded aperture) driving one of the bosses 1142 (i.e., the shaded boss) of spool 1140 as the pinion gear 1133 rotates within the annular gear 1152. The spool 1140 rotates in a direction opposite that of the pinion gear 1133. FIG. 11D illustrates a cross section view of the assembled components of reel assembly 1100.

Figure 12A:
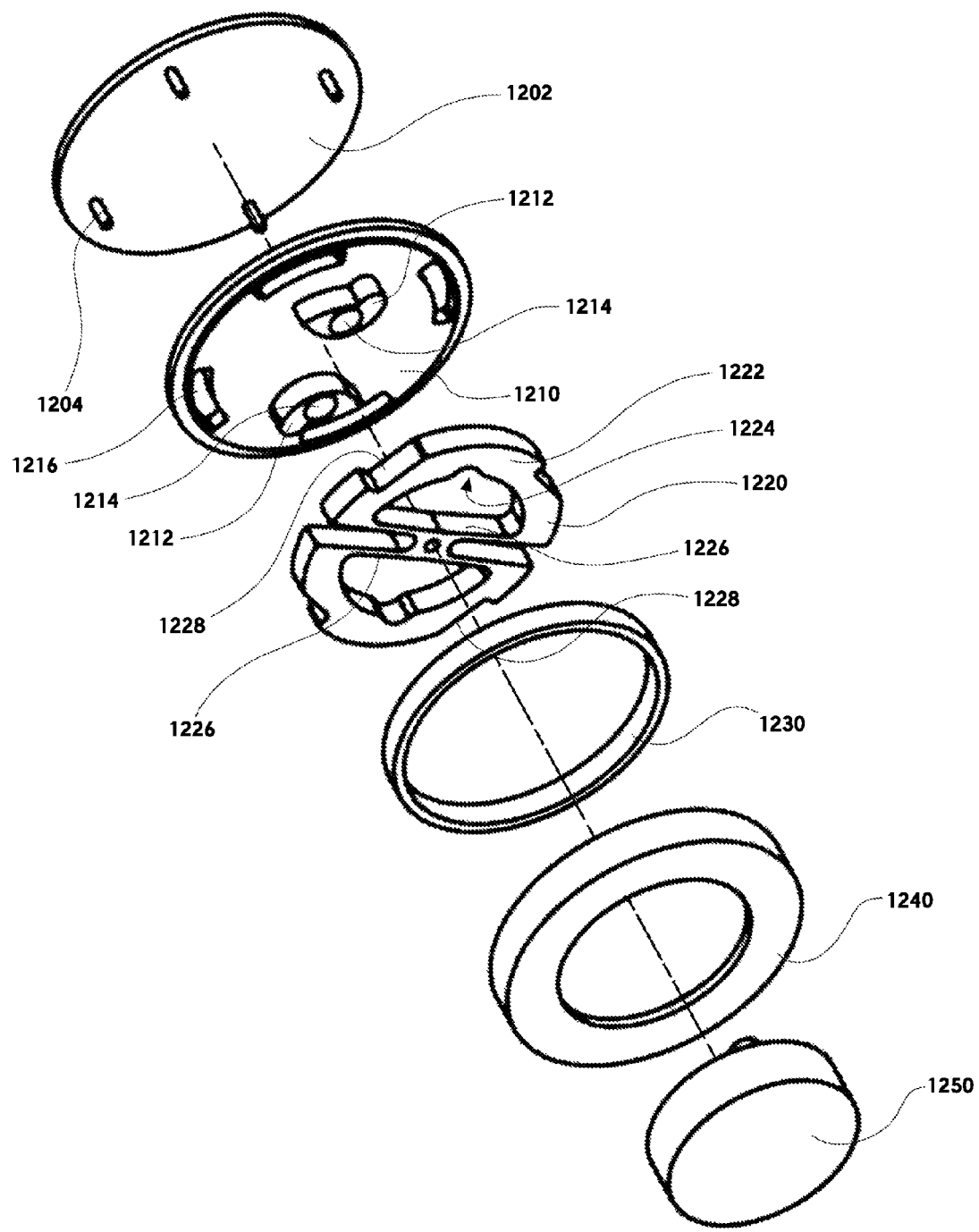
FIGS. 12A-D illustrate another embodiment of a reel assembly that may be used to close and/or tighten an article.
Figure 12B:
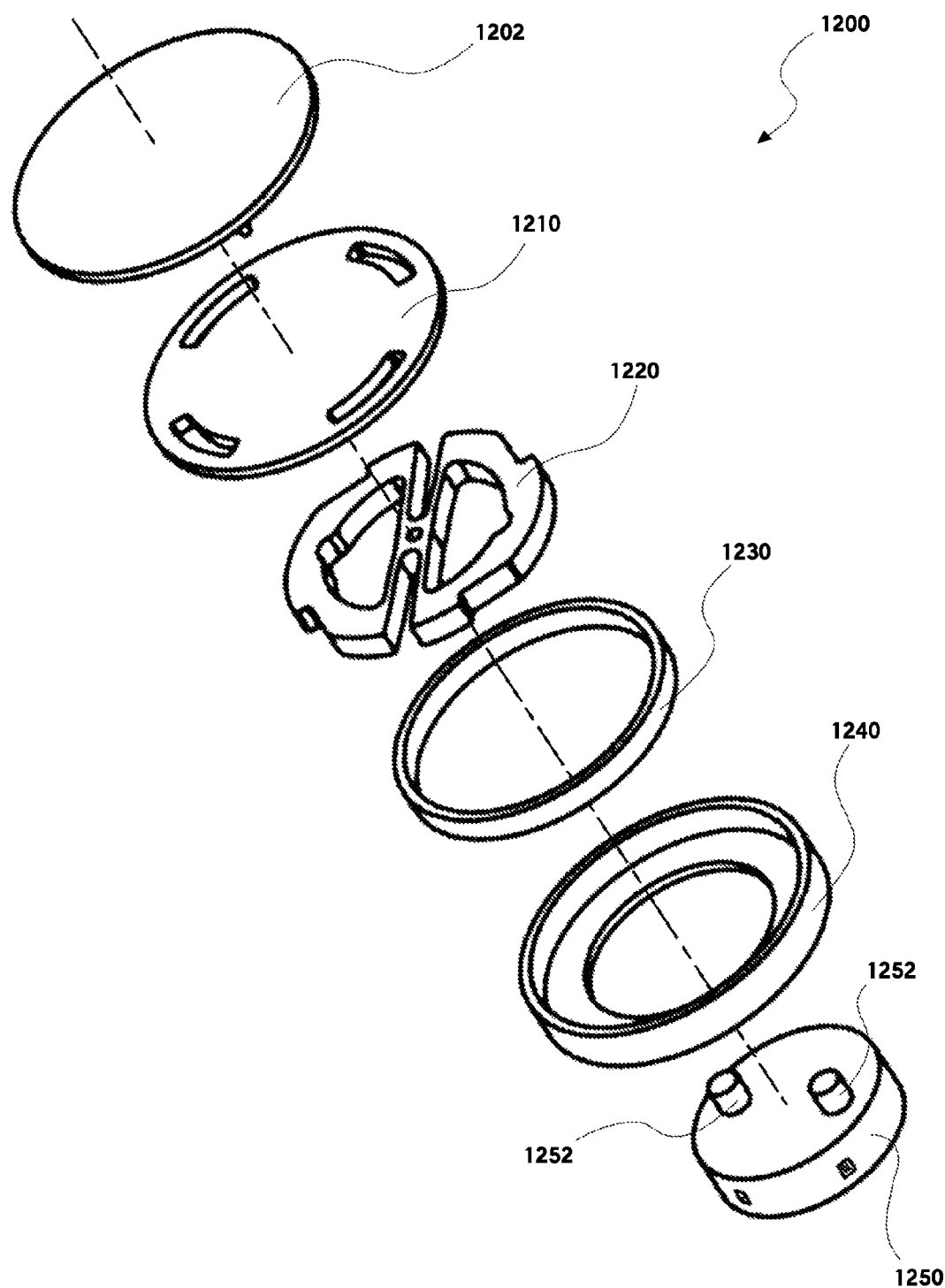

Referring now to FIGS. 12A-D, illustrated is another embodiment of a reel assembly 1200 that is relatively quiet in operation and that provide safeguards against accidental opening. FIGS. 12A and 12B illustrate exploded perspective views of the components of reel assembly 1200. Reel assembly 1200 includes an upper knob 1202 and a lower knob 1210 that may be rotated by a user to tension and/or loosen lace, and/or lock the reel assembly 1200 in an open configuration. Upper knob 1202 includes a plurality of shafts 1204 that are inserted within rectangular apertures 1216 of the lower knob 1210. Lower knob 1210 includes a pair of cams 1212 that each have an aperture 1214 within which bosses 1252 of spool 1250 are inserted.

Figure 12C:
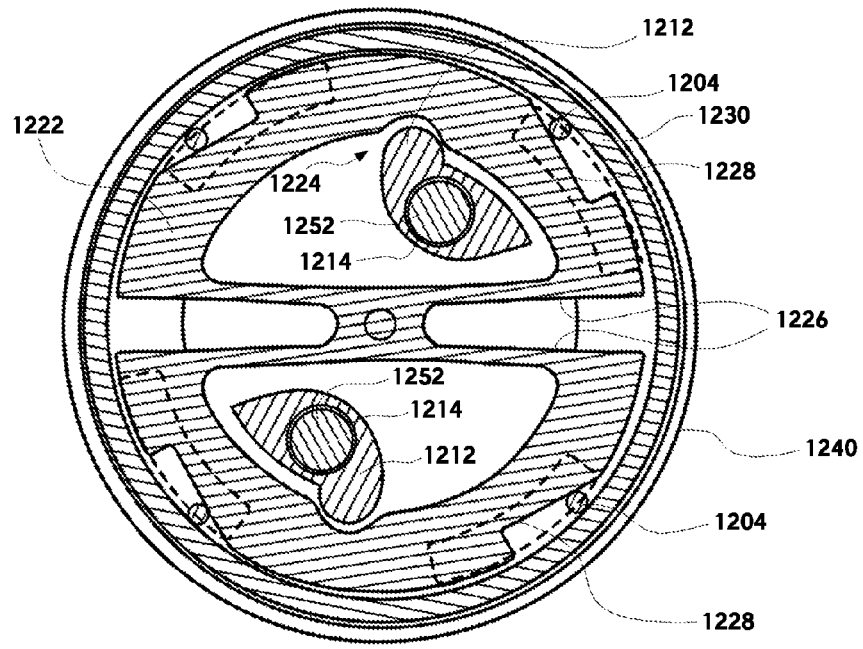

Reel assembly 1200 includes a brake shoe 1220 having a pair of circumferentially extending arms 1222 that are coupled together via spring members 1226. The cams 1212 of the lower knob 1210 are positioned within an interior region of each circumferentially extending arm 1222. The brake shoe 1220 is in turn inserted within a hub 1230 that is in turn positioned within housing 1240. As shown in FIG. 12C, as the lower knob 1210 is rotated in a tightening or tensioning direction, a loadbearing surface of the cams 1212 is positioned within a notch 1224 of the circumferentially extending arms 1222. The profile of the cams 1212 matches the inner surface of the circumferentially extending arms 1222 such that rotation of the lower knob 1210 in the tensioning direction maintains the loadbearing surface of the cams 1212 within the notch 1224 of arms 1222. The rotational force of the lower knob 1210 is transferred to the spool 1250 via contact between the bosses 1252 and aperture 1214.

Figure 12D:
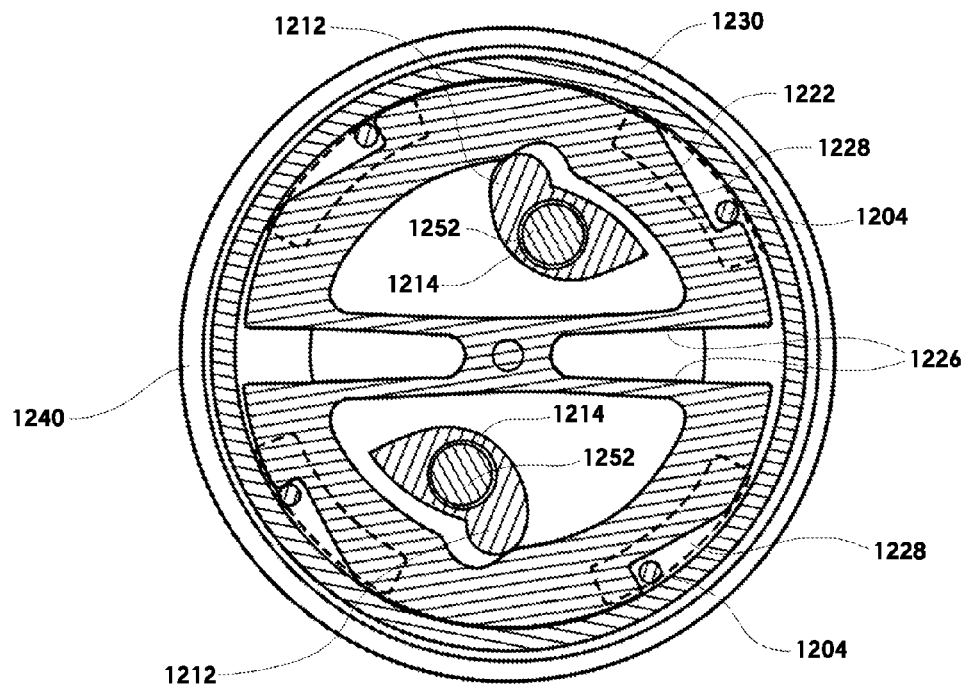

As shown in FIG. 12D, as the lower knob 1210 is released and/or rotated in the loosening direction, the loadbearing surface of the cams 1212 displaces from the notch 1224 of arms 1222 and presses against an inner surface of the arms 1222. This causes the outer surface of the arms 1222 to frictionally engage with hub 1230, which prevents or arrests rotational motion of the spool 1250 and other components of reel assembly 1200. Continued rotation of the lower knob 1210 and/or spool 1250 in the loosening direction increases the frictional engagement of the outer surface of the arms 1222 with the hub 1230. The spring members 1226 of brake shoe 1220 bias the arms 1222 axially inward such that subsequent rotation of the lower knob 1210 in the tightening or tensioning direction causes the loadbearing surface of cams 1212 to re-position within the notches 1224 and causes the arms 1222 to deflect axially inward and out of frictional engagement with hub 1230.

To lock the reel assembly 1200 in the open configuration, the lower knob 1210 is rotated in the tightening direction while the upper knob 1202 is simultaneously rotated in the loosening direction (i.e. the opposite direction). This action causes the shafts 1204 of upper knob 1202 to slide up a ramp portion 1228 of the arms 1222, which presses the arms 1222 radially inward and out of frictional engagement with hub 1230. The shafts 1204 may be locked about the brake shoe 1220 to maintain the arms 1222 in a disengaged configuration from hub 1230 and thereby allow the lace tension to be fully released. Accordingly, reel assembly 1200 provides a safeguard against accidental opening by requiring rotation of the lower knob 1210 and upper knob 1202 in opposite directions to fully loosen the lace.

Figure 13A:
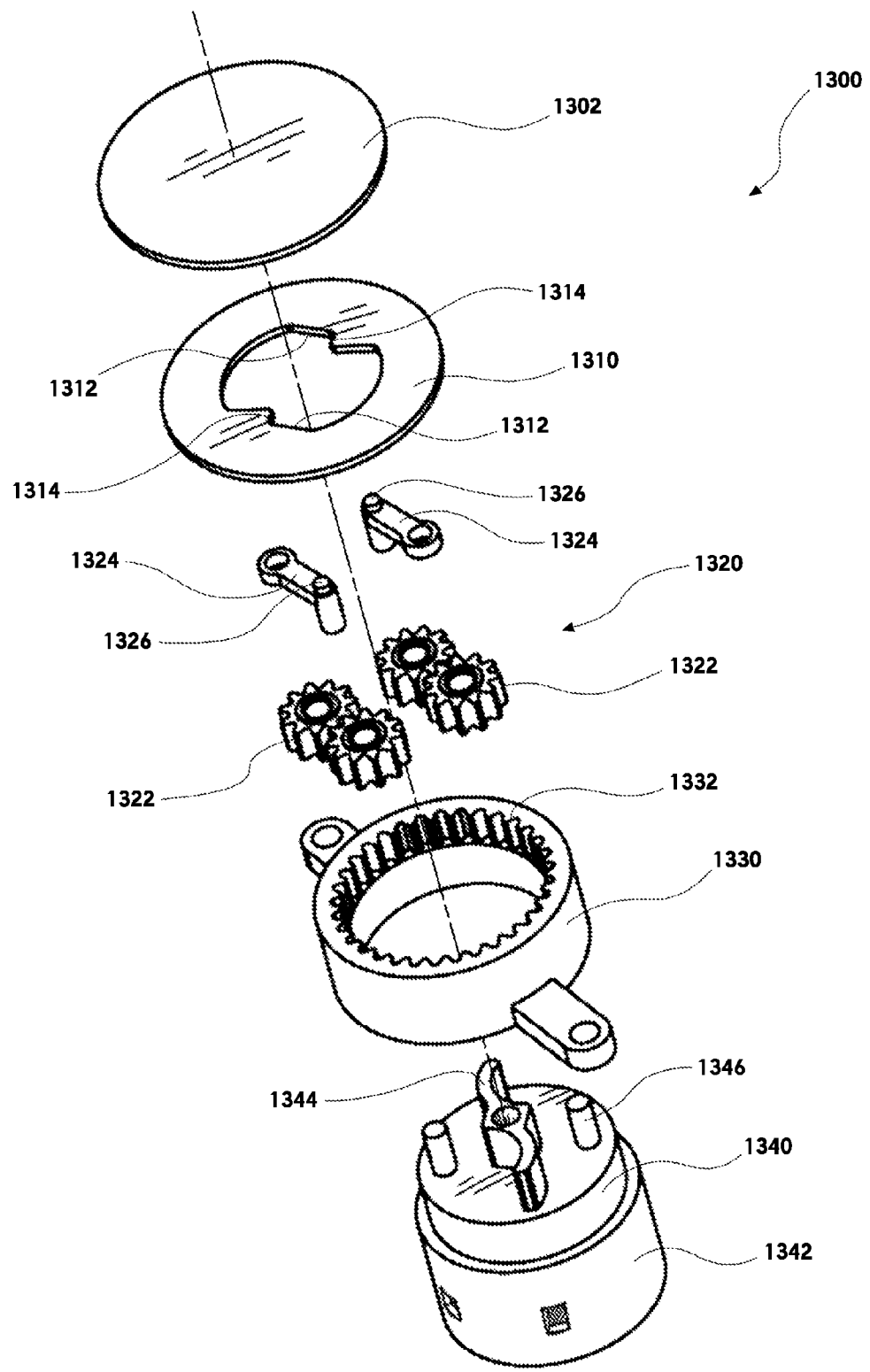
FIGS. 13A-F illustrate another embodiment of a reel assembly that may be used to close and/or tighten an article.
Figure 13B:
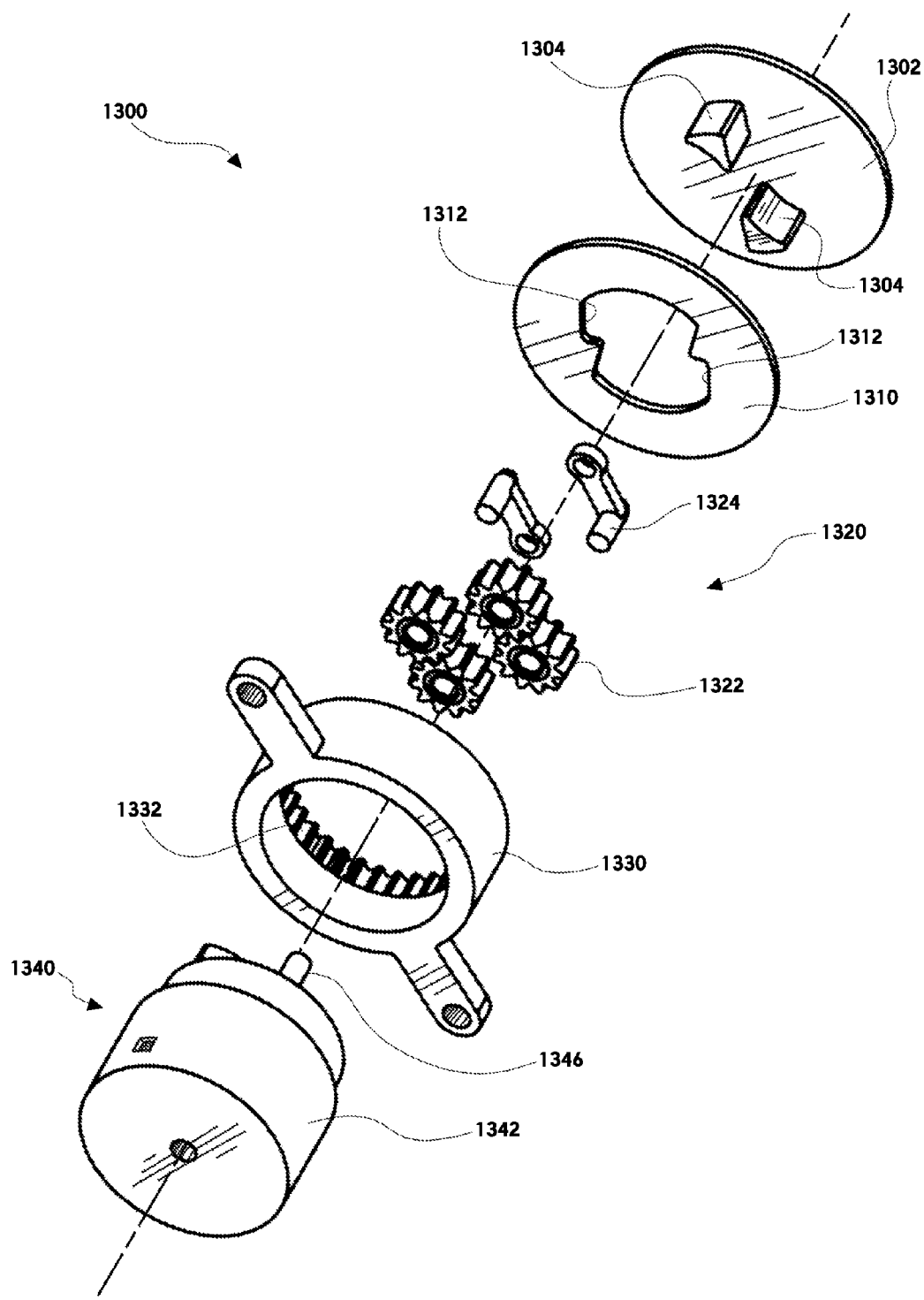

Referring now to FIGS. 13A-F, illustrated is another embodiment of a reel assembly 1300 that is relatively quiet in operation and that provide safeguards against accidental opening. FIGS. 13A and 13B illustrate an exploded perspective views of reel assembly 1300. As shown, reel assembly 1300 includes an upper knob 1302 and a lower knob 1310. Upper knob 1302 includes a pair of bosses 1304 that extend axially downward and that are used to drive or cause rotation of spool 1340. Lower disc 1310 includes a geometric aperture having a cam or ramped surface 1312 and notch 1314 that functions to lock the reel assembly 1300 in open configuration to allow the lace to be fully loosened.

Reel assembly 1300 also includes a gear mechanism 1320 that is used to lock the reel assembly 1300 in position to prevent counter rotation of the spool 1340, or stated differently, to prevent rotation of the spool 1340 in the loosening direction. The gear mechanism 1320 includes a pair of pivoting arms 1324 having an aperture at a proximal end that couples with a boss 1346 of spool 1340 and a pin at a distal end that is inserted within an aperture of one of the gears 1322 of gear mechanism 1320 (i.e., floating gear 1322*b*). The gears 1322 gear mechanism 1320 are positioned within a housing 1330 so as to contact teeth 1332 of housing 1330. As described in more detail below, the gears 1322 of gear mechanism 1320 include a floating gear 1322*b* and a fixed gear 1322*a*. Spool 1340 includes a central protrusion 1344 having a pair of arcuate surfaces about which the floating gears of gear mechanism 1320 rest as the reel assembly 1300 is being operated to tension or tighten lace. Spool 1340 also includes a body or channel 1342 within which or about which lace is wound during operation of reel assembly 1300.

Figure 13C:
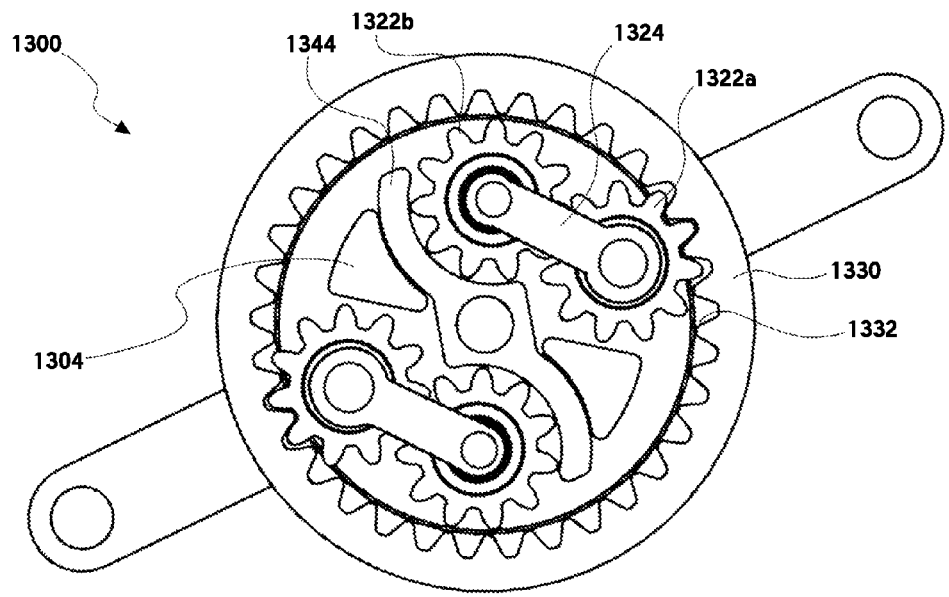

FIG. 13C shows an assembly of the components of reel assembly 1300 as the reel assembly 1300 is being operated to tension or tighten lace. As illustrated, as the upper knob 1302 is rotated in a tightening direction, the pair of bosses 1304 contact and press against a rear surface of central protrusion 1344 to drive spool 1340. As the bosses 1304 drive central protrusion 1344 and spool 1340, a floating gear 1322*b* of gear mechanism 1320 rests against the arcuate surface of central protrusion 1344. Interaction between the teeth of floating gear 1322*b* and a fixed gear 1322*a* of gear mechanism 1320 causes the floating gear 1322*b* to pivot via arm 1324 into contact with the arcuate surface of central protrusion 1344. Rotation of the fixed gear 1322*a* is caused via an interaction between the teeth of fixed gear 1322*a* and the teeth 1332 of housing 1330. In this configuration, the upper knob 1302 may be rotated as desired to tension the lace.

Figure 13D:
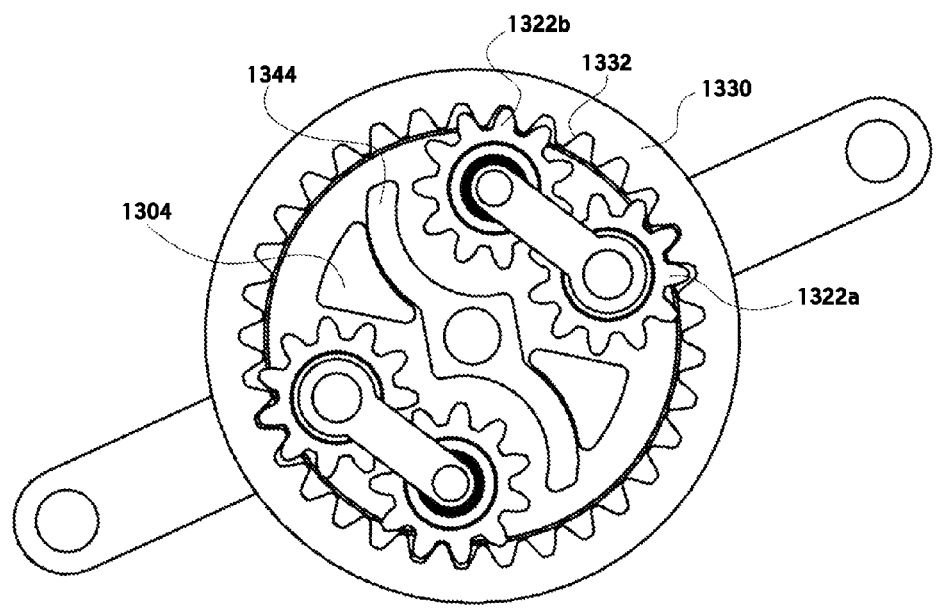

FIG. 13D shows an assembly of the components of reel assembly 1300 after the upper knob 1302 is released, or as the upper knob 1302 is rotated in the loosening direction. As illustrated, rotating the upper knob 1302 in the loosening direction causes the floating gear 1322*b* to pivot out of engagement or contact with the arcuate surface of central protrusion 1344 and into engagement with the teeth 1332 of housing 1330. Rotation of the fixed gear 1322*a* in a direction opposite that of the tightening direction and an interaction between the teeth of floating gear 1322*b* and fixed gear 1322*a* causes the floating gear 1322*b* to pivot, via arm 1324, out of contact with the arcuate surface of central protrusion 1344 and into engagement with the teeth 1332 of housing 1330. As described above, rotation of the fixed gear 1322*a* is caused via the interaction between the fixed gear 1322*a* and the teeth 1332 of housing 1330. Since the fixed gear 1322*a* and the floating gear 1322*b* rotate in opposite directions, engagement of the fixed gear 1322*a* and the floating gear 1322*b* with the teeth 1332 of housing 1330 causes the gears, 1322*a* and 1322*b*, to bind with the teeth 1332 of housing 1330 and thereby prevent further rotation of the upper knob 1302 and spool 1340. The above described gear binding process also occurs as the upper knob 1302 is released and lace tension drives or causes rotation of the spool 1340 in the loosening direction. In this manner, the reel assembly 1300 is locked to prevent further loosening of the lace.

Figure 13E:
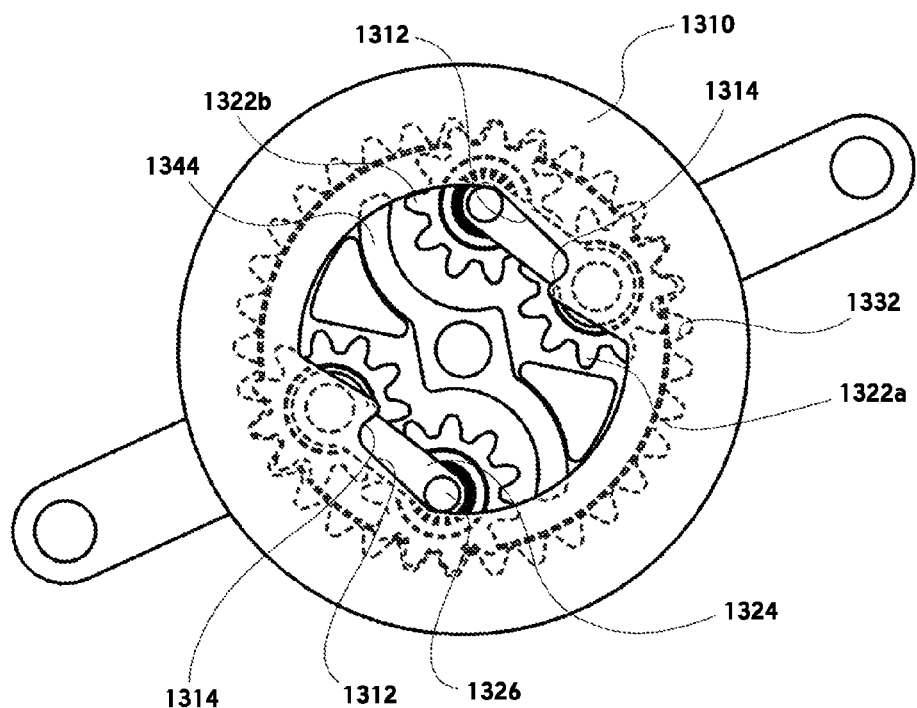

As briefly described above, the lower knob 1310 may be operated to lock and unlock the reel assembly 1300 from an open configuration in which the lace tension may be fully released. FIG. 13E illustrates the lower knob 1310 in an unlocked configuration in which the upper knob 1302 is rotatable to tension lace and in which the reel assembly 1300 is lockable by binding of the gear mechanism 1320. As shown in FIG. 13E, the lower knob 1310 is rotated so that an axially upward extending pin 1326 of arm 1324 is positioned away from a notch 1314 of the geometric aperture of lower knob 1310. With the pin 1326 positioned away from notch 1314, the floating gear 1322*b* is able to pivot into and out of engagement with the arcuate surface of central protrusion 1344 as described above to allow tensioning and locking of the reel assembly 1300.

Figure 13F:
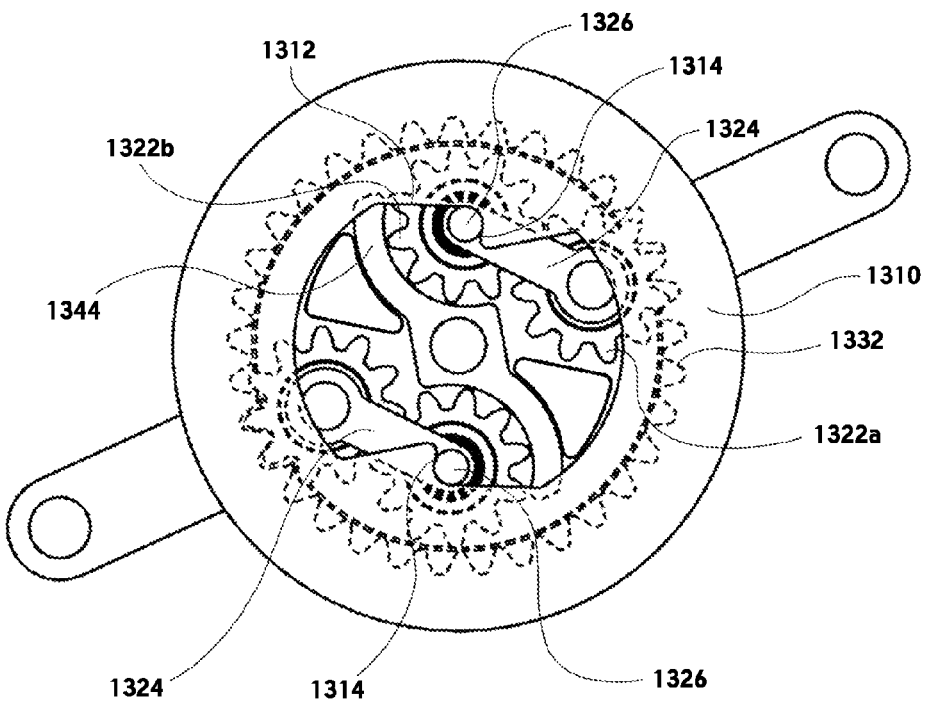

As shown in FIG. 13F, the lower knob 1310 may be rotated relative to gear mechanism 1320 so that the pin 1326 of arm 1324 slides along the cam or ramped surface 1312 of the geometric aperture and into notch 1314. With the pin 1326 positioned within the notch 1314, the floating gear 1322*b* is prevented from pivoting out of engagement with the arcuate surface of central protrusion 1344 as the upper knob 1302 is released or rotated in the loosening direction. In this configuration, the floating gear 1322*b* is unable to engage with the teeth 1332 of housing 1330 and, therefore, the gear mechanism 1320 is unable to bind and lock the spool 1340 and reel assembly 1300 as described above. In this configuration, the lace tension may be fully released. The lower knob 1310 may be rotated in an opposite direction to slide the pin 1326 away from notch 1314 and thereby "unlock" the reel assembly 1300.

To lock the reel assembly 1300 with lower knob 1310, lower knob 1310 is typically rotated in a direction opposite that of upper knob 1302. For example, upper knob 1302 is typically rotated in the tightening direction while lower knob 1310 is rotated in the loosening direction. Accordingly, reel assembly 1300 provides a safeguard against accidental opening by requiring rotation of the lower knob 1310 and upper knob 1302 in opposite directions to fully loosen the lace.

Figure 14A:
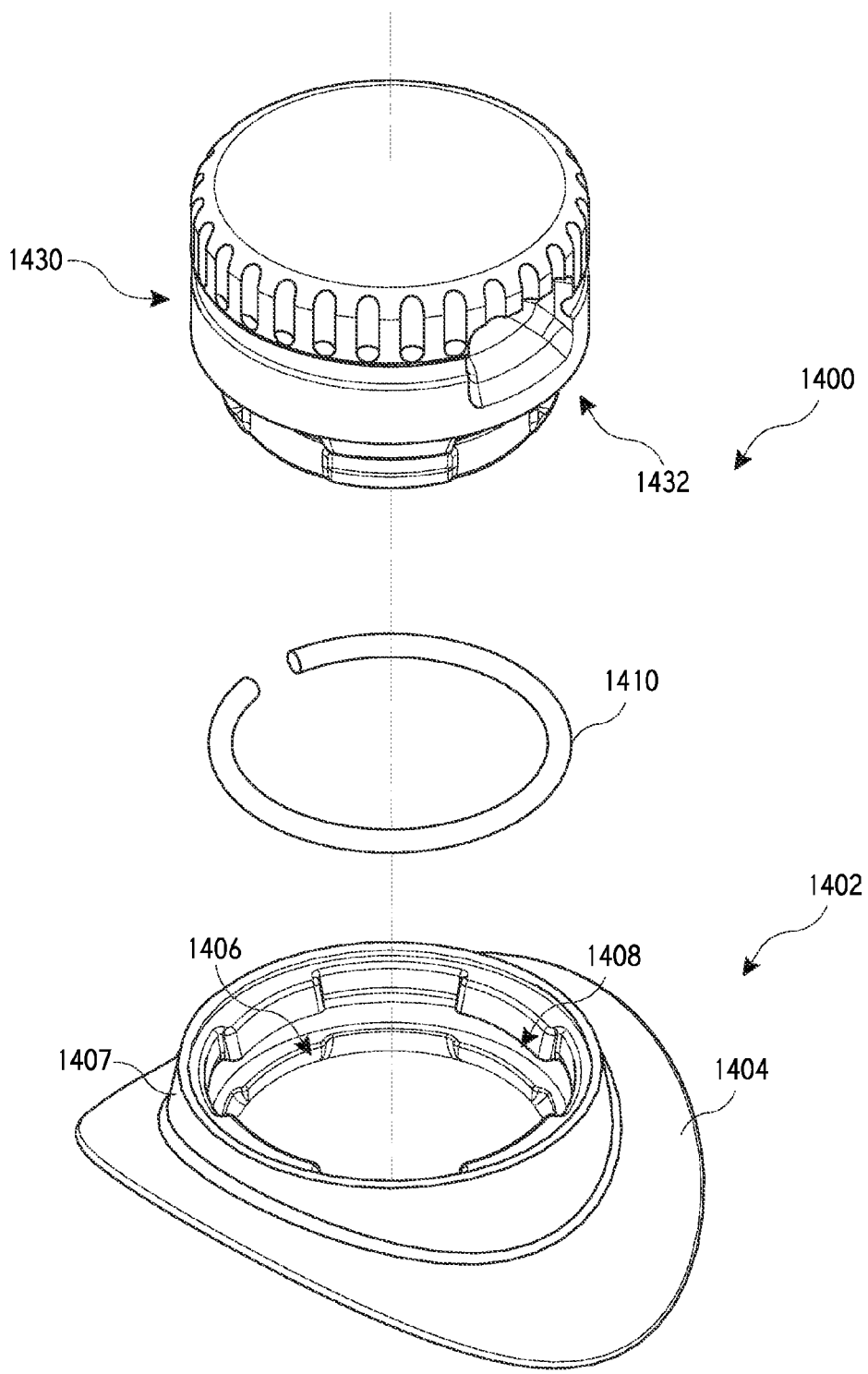
FIGS. 14A and 14B illustrate a mechanism for releasably attaching a component to an article.
Figure 14B:
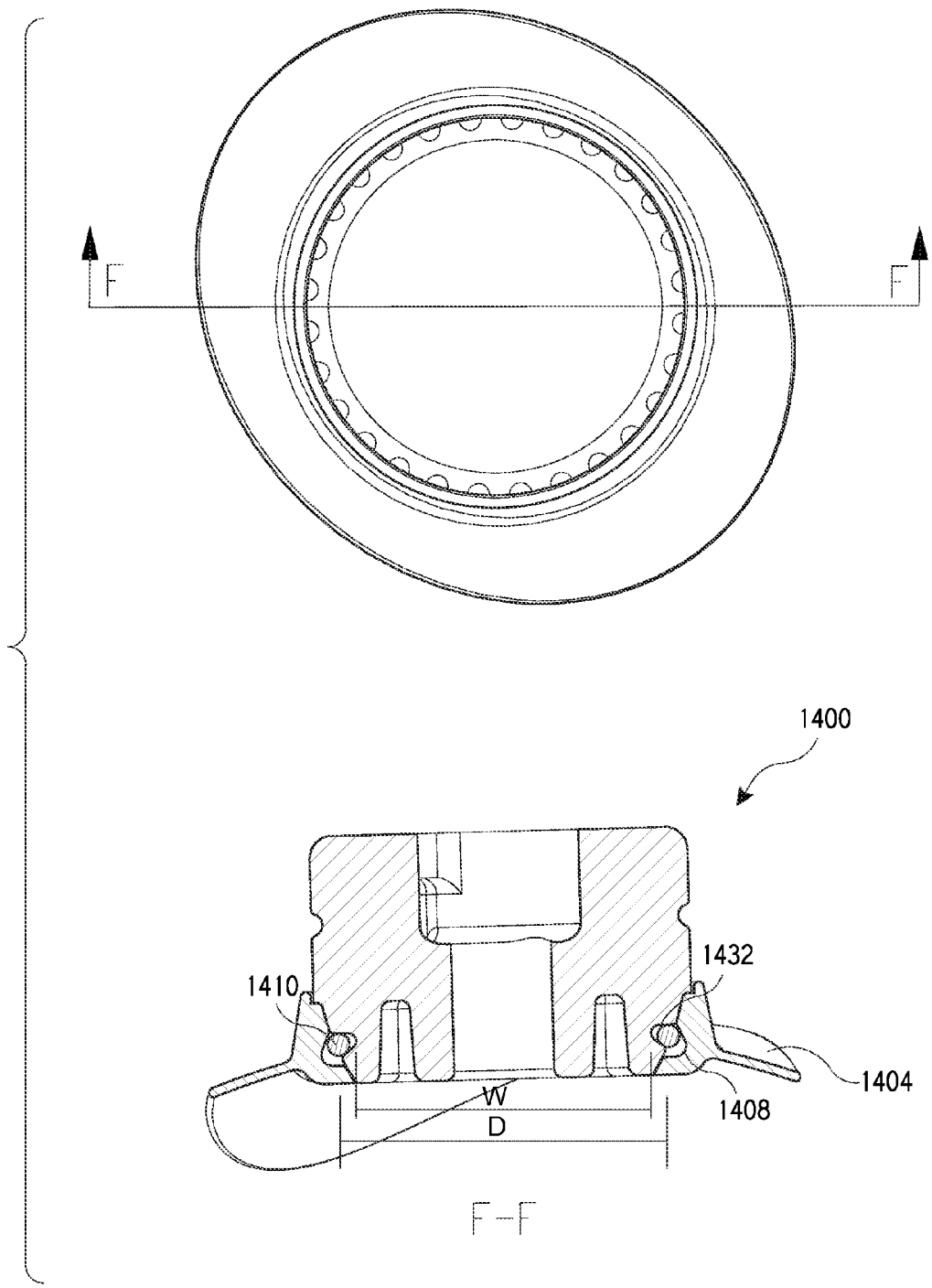

Referring now to FIGS. 14A and 14B, illustrated is a mechanism 1400 for releasably attaching a component to an article, such as a shoe. The mechanism 1400 includes a base member 1402 that is attachable to an article. The base member 1402 includes a flange 1404 that radially extends from a bottom end of the base member 1402 and around an entire outer periphery of the base member 1402, or around a portion thereof. The base member 1402 also includes an inner cavity or aperture 1406 within which a bottom end of the component 1430 (e.g., a reel assembly housing) can be inserted. A channel 1408 is formed or disposed within the inner cavity or aperture 1406 of base member 1402 and a spring component 1410 is positioned within the channel 1408. The spring component 1410 is configured to radially deflect about a bottom end of the component 1430 as the component is inserted within the inner cavity or aperture 1406. Specifically, the spring component 1410 deflects radially outward as the bottom end of the component 1430 is inserted within the inner cavity or aperture 1406 and then the spring component 1410 springs or flexes back into position to lock the bottom end of the component 1430 within the inner cavity or aperture 1406 of the base member 1402 as shown in the cross section view of FIG. 14B. The spring component 1410 allows the bottom end of the component 1430 to be removed from the inner cavity or aperture 1406 by radially flexing outward as the component 1430 is pulled axially upward. Accordingly, the spring component 1410 allows the component 1430 to be releasably coupled with the base member 1402.

In some embodiments, the channel 1408 of the inner cavity or aperture 1406 is an annular channel within which the spring component 1410 radially deflects as the bottom end of the component 1430 is inserted within the inner cavity or aperture 1406. In such embodiments, the spring component 1410 may be a split ring spring having an inner diameter that widens upon radial deflection. In some embodiments, the widening of the inner diameter of the split ring spring 1410 may be constrained by the annular channel 1408 of the inner cavity or aperture 1406. In such embodiments, an outer diameter D of the bottom end of the component 1430 may be greater than a widest inner diameter W of the split ring spring 1410 allowed by the annular channel 1408, which may cause the base member 1402 or the bottom end of the component 1430 to flex radially outward to enable insertion of the bottom end of the component 1430 within the base member's inner cavity or aperture 1406. Specifically, an annular protrusion 1407 of the base member 1402 may elastically flex or deflect as the enlarged bottom end of the component 1430 is inserted within the base member's inner cavity or aperture 1406. Because the base member 1402 (e.g., annular protrusion 1407) and/or the bottom end of the component 1430 flexes during insertion of the component 1430 within the inner cavity or aperture 1406, the coupling of the two components is greatly enhanced and thereby requires a significantly greater force to uncouple said components. As such, the component 1430 may experience large forces from external objects without uncoupling from the base member 1402.

In some embodiments, the bottom end of the component 1430 includes an annular channel 1432 within which the spring component 1410 is positioned. In other embodiments, the bottom end of the component 1430 includes a plurality of lock tabs or radially extending members about which the spring component 1410 flexes to lock the bottom end of the component 1430 within the inner cavity or aperture 1406. In some embodiments, the spring component 1410 may be a horseshoe spring, a clover spring, a closed loop spring, and the like, rather than a split ring spring.

According to one embodiment, a method for releasably attaching a component to an article includes providing a base member that includes: an inner cavity or aperture, a channel disposed within the inner cavity or aperture, and a spring component positioned within the channel. The method also includes attaching the base member with the article and inserting a bottom end of the component within the inner cavity or aperture so that the spring component radially deflects about the component's bottom end and thereby locks the bottom end of the component within the inner cavity or aperture of the base member. In some embodiments, attaching the base member with the article includes coupling a flange of the base member with the article.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A reel for tightening an article comprising:
a base member that is coupleable with the article;
a housing positioned atop the base member and removeably coupleable therewith, the housing having an interior region;
a spool positioned within the interior region of the housing and rotatable relative thereto, the spool having a central post about which a tension member is wound;
a knob member that is coupled with the spool and configured to cause the spool to rotate within the interior region of the housing in a first direction to wind the tension member about the spool's central post; and
a load holding mechanism coupled with the spool and the housing, the load holding mechanism comprising a first friction element and a second friction element that are frictionally engageable to prevent rotation of the spool in a second direction opposite the first direction to prevent unwinding of the tension member from the spool's central post, wherein:
the first friction element and the second friction element remain engaged as the spool is rotated in the first direction and the second direction;
rotation of the knob member in the first direction decreases the frictional engagement of the first friction element and the second friction element to enable rotation of the spool in the first direction, and
tension in the tension member biases the spool toward rotation in the second direction which increases the frictional engagement of the first friction element and the second friction element and thereby prevents unwinding of the tension member from the spool's central post.

2. The reel of claim 1, wherein the knob member comprises a tapered lumen through which the tension member is insertable to enable a knot to be tied in the tension member, or a mechanical fastener to be coupled with the tension member, wherein the knot or mechanical fastener engages with the tapered lumen as the tension member is retracted within the lumen to enable attachment of the tension member with the spool without disassembly of reel.

3. The reel of claim 2, wherein the housing includes a lumen through which the tension member is insertable, the lumen of the housing being alignable with the lumen of the knob member so that, upon alignment, the lumen of the housing directs the tension member through the lumen of the knob member.

4. The reel of claim 1, wherein the base member includes a spring member that is positioned within an annular groove and that releasably engages with a bottom end of the housing to removably couple the housing with the article.

5. The reel of claim 1, further comprising a release mechanism that is rotatably coupled with the housing and attached to a distal end of the second friction element, the release mechanism being rotatable relative to the housing to enable the spool to be rotated in the second direction and thereby enable unwinding of the tension member from the spool's central post.

6. The reel of claim 5, wherein the release mechanism is rotatable between a lock position and an unlock position, wherein in the lock position rotation of the spool in the second direction is prevented, and wherein in the unlock position rotation of the spool in the second direction is enabled.

7. The reel of claim 5, wherein rotation of the release mechanism in the second direction causes a corresponding rotation of the spool in the second direction to unwind the tension member from the spool's central post.

8. The reel of claim 7, wherein rotation of the release mechanism in the second direction causes an incremental release of the tension member from the spool's central post.

9. The reel of claim 1, wherein the spool is not fully enclosed by a wall or walls of the housing such that the spool and a portion of the tension member wound about the spool's post is visible, and wherein the wall or walls of the housing extend from a bottom portion of the spool to a top portion of the spool to reinforce the coupling of the spool within the interior region of the housing.

10. The reel of claim 1, wherein the first friction element comprises a hub that is coaxially aligned with and positioned within a lumen of the spool, and wherein the second friction element comprises a spring that is wound about the hub and configured to constrict about an outer surface of the hub to prevent rotation of the spool in the second direction.

11. The reel of claim 10, wherein the first friction element comprises a pair of hubs with a first one of said hubs fixedly coupled with the housing and a second one of said hubs fixedly coupled with the knob, wherein the second one of said hubs is configured to rotate relative to the first one of said hubs when frictional engagement of the spring and said pair of hubs is reduced, and wherein the second one of said hubs is rotatably locked to the first one of said hubs when frictional engagement of the spring and said pair of hubs is increased.

12. A reel for tightening an article comprising:
a housing having an interior region and a base that is attachable to the article;
a spool positioned within the interior region of the housing and rotatable relative thereto, the spool having a central post about which a tension member is wound;
a knob member that is coupled with the spool and configured to cause the spool to rotate within the interior region of the housing in a first direction to wind the tension member about the spool's central post; and
a load holding mechanism coupled with the spool and the housing, the load holding mechanism comprising a first friction element and a second friction element that are frictionally engageable to prevent rotation of the spool in a second direction opposite the first direction to prevent unwinding of the tension member from the spool's central post, wherein:
the first friction element and the second friction element remain engaged as the spool is rotated in the first direction and the second direction;
rotation of the knob member in the first direction decreases the frictional engagement of the first friction element and the second friction element to enable rotation of the spool in the first direction, and
tension in the tension member biases the load holding mechanism into increased frictional engagement of the first friction element and the second friction element and thereby prevents unwinding of the tension member from the spool's central post.

13. The reel of claim 12, wherein the knob member comprises a tapered lumen through which the tension member is insertable to enable a knot to be tied in the tension member, or a mechanical fastener to be coupled with the tension member, wherein the knot or mechanical fastener engages with the tapered lumen as the tension member is retracted within the lumen to enable attachment of the tension member with the spool without disassembly of reel.

14. The reel of claim 13, wherein the housing includes a lumen through which the tension member is insertable, the lumen of the housing being alignable with the lumen of the knob member so that, upon alignment, the lumen of the housing directs the tension member through the lumen of the knob member.

15. The reel of claim 12, further comprising a release mechanism that is rotatably coupled with the housing and attached to a distal end of the second friction element, the release mechanism being rotatable relative to the housing to enable the spool to be rotated in the second direction and thereby enable unwinding of the tension member from the spool's central post.

16. The reel of claim 15, wherein rotation of the release mechanism in the second direction causes a corresponding rotation of the spool in the second direction to unwind the tension member from the spool's central post.

17. The reel of claim 16, wherein rotation of the release mechanism in the second direction causes an incremental release of the tension member from the spool's central post.

18. The reel of claim 12, wherein the first friction element comprises a hub that is coaxially aligned with and positioned within a lumen of the spool, and wherein the second friction element comprises a spring that is wound about the hub and configured to constrict about an outer surface of the hub to prevent rotation of the spool in the second direction.

19. The reel of claim 18, wherein the first friction element comprises a pair of hubs with a first one of said hubs fixedly coupled with the housing and a second one of said hubs fixedly coupled with the knob, wherein the second one of said hubs is configured to rotate relative to the first one of said hubs when frictional engagement of the spring and said pair of hubs is reduced, and wherein the second one of said hubs is rotatably locked to the first one of said hubs when frictional engagement of the spring and said pair of hubs is increased.

20. A method for assembly a shoe with a reel based mechanism comprising:
providing a reel that includes:
a base member;
a housing having an interior region;
a spool positioned within the interior region of the housing and rotatable relative thereto, the spool having a central post about which a tension member is wound;
a knob member that is coupled with the spool and configured to cause the spool to rotate within the interior region of the housing in a first direction to wind the tension member about the spool's central post; and
a load holding mechanism coupled with the spool and the housing, the load holding mechanism comprising a first friction element and a second friction element that are frictionally engageable to prevent rotation of the spool in a second direction opposite the first direction to prevent unwinding of the tension member from the spool's central post, wherein:
rotation of the knob member in the first direction decreases the frictional engagement of the first friction element and the second friction element to enable rotation of the spool in the first direction, and
tension in the tension member biases the load holding mechanism into increased frictional engagement of the first friction element and the second friction element;
the first friction element comprises a pair of hubs positioned within a lumen of the spool and the second friction element comprises a spring that is wound about the pair of hubs and configured to constrict about an outer surface of the pair of hubs to prevent rotation of the spool in the second direction;
a first one of said pair of hubs is fixedly coupled with the housing and a second one of said pair of hubs is fixedly coupled with the knob member, the second one of said pair of hubs being configured to rotate relative to the first one of said pair of hubs when frictional engagement of the spring and said pair of hubs is reduced, and the second one of said pair of hubs being rotatably locked to the first one of said hubs when frictional engagement of the spring and said pair of hubs is increased; and
coupling the base member with the article.

21. The method of claim 20, wherein the housing is integrally formed with the base member.

22. The method of claim 20, wherein the housing is removably coupleable with the base member.

23. The method of claim 22, wherein the base member includes a spring member that is positioned within an annular groove and that releasably engages with a bottom end of the housing to removably couple the housing with the article.

* * * * *